United States Patent
Casper et al.

(10) Patent No.: US 7,255,333 B2
(45) Date of Patent: Aug. 14, 2007

(54) STRIP DIFFUSER

(75) Inventors: Thomas J. Casper, Waukesha, WI (US); Mark A. Schoenenberger, Cedarburg, WI (US); Brad D. Laubenstein, Fort Washington, WI (US); James A. Reilly, Shrewsbury, MA (US); Joseph G. Krall, Grafton, WI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/639,774

(22) Filed: Aug. 13, 2003

(65) Prior Publication Data

US 2004/0124550 A1 Jul. 1, 2004

Related U.S. Application Data

(60) Provisional application No. 60/408,284, filed on Sep. 6, 2002, and provisional application No. 60/402,715, filed on Aug. 13, 2002.

(51) Int. Cl.
*B01F 3/04* (2006.01)

(52) U.S. Cl. .............. 261/122.1; 261/124; 261/DIG. 70

(58) Field of Classification Search .............. 261/122.1, 261/124, 122.2, DIG. 70; 210/220, 221.2
See application file for complete search history.

(56) References Cited

U.S. PATENT DOCUMENTS

| | | | |
|---|---|---|---|
| 2,212,841 A | | 8/1940 | Maxwell |
| 3,063,689 A | * | 11/1962 | Coppock ..................... 239/602 |
| 3,083,953 A | | 4/1963 | Langdon et al. |
| 3,432,154 A | * | 3/1969 | Danjes ..................... 261/122.2 |

(Continued)

FOREIGN PATENT DOCUMENTS

| AT | 391 126 | | 2/1990 |
|---|---|---|---|
| CA | 2 482 435 | | 11/2003 |
| DE | 3224177 | * | 12/1983 |

(Continued)

OTHER PUBLICATIONS

"Strip Aerators", sales brochure, Aerostrip Corporation, 3–1999.

"Aerostrip Membrane Diffusers", Common questions and answers, Aqua Consult, 1996–1997.

Print out of Pfleiderer Brochure, date of Publication Unknown.

Print out of Pfleiderer Website, printed Apr. 20, 2005 (Orig, Date of Publication Unknown).

Epa Design Manual, "Fine Pore Aeration Systems" EPA/625/1-891023.

Pfleiderer, "NewAir Diffuser", Spring of 2002, photograph identified herein as Photo A, exhibited at the IFAT Trade Show, Germany.

(Continued)

*Primary Examiner*—Scott Bushey
(74) *Attorney, Agent, or Firm*—Robert R. Priddy; Randall G. Erdley; Walter Ottesen

(57) ABSTRACT

Membrane strip diffusers are disclosed, useful for example in aerating wastewater in activated sludge plants. These diffusers have membranes, diffuser bodies and gas conduits elongated in the same general direction. Such conduits may be attached to or formed integrally with the diffuser bodies. Gas chambers form beneath the membranes when they inflate, and these are separate from but communicate with the gas conduits, e.g., through passageways distributed along the lengths of the membrane supports. Preferably, the passageway flow cross-sections are small, thus tending toward uniform distribution of gas along the membrane's length. Ways to edge- and end-seal the membranes to the diffuser bodies are also disclosed.

95 Claims, 22 Drawing Sheets

U.S. PATENT DOCUMENTS

| | | | |
|---|---|---|---|
| 3,768,788 A | | 10/1973 | Candel |
| 3,953,553 A | | 4/1976 | Thayer |
| 3,954,922 A | | 5/1976 | Walker et al. |
| 3,992,491 A | | 11/1976 | Ihrig et al. .................... 261/87 |
| 4,029,581 A | | 6/1977 | Clough, Jr. et al. |
| 4,060,486 A | * | 11/1977 | Schreiber .................... 210/220 |
| 4,606,867 A | * | 8/1986 | Eguchi .................... 261/122.1 |
| 4,629,126 A | | 12/1986 | Goudy, Jr. et al. |
| 4,631,134 A | | 12/1986 | Schussler |
| 4,734,191 A | | 3/1988 | Schussler |
| 4,960,546 A | | 10/1990 | Tharp |
| 4,961,854 A | | 10/1990 | Wittmann et al. |
| 5,000,884 A | | 3/1991 | Bassfeld |
| 5,013,493 A | | 5/1991 | Tharp |
| 5,015,421 A | * | 5/1991 | Messner .................. 261/122.1 |
| 5,032,325 A | | 7/1991 | Tharp |
| 5,093,047 A | | 3/1992 | Zeppenfeld |
| 5,098,581 A | | 3/1992 | Roediger .................... 210/758 |
| 5,133,862 A | | 7/1992 | Cannan et al. |
| 5,133,876 A | * | 7/1992 | Tharp |
| 5,158,715 A | * | 10/1992 | Jager |
| 5,192,467 A | * | 3/1993 | Strunc et al. |
| 5,330,688 A | * | 7/1994 | Downs |
| 5,352,391 A | * | 10/1994 | Heck ...................... 261/122.2 |
| 5,378,355 A | * | 1/1995 | Winkler |
| 5,458,771 A | * | 10/1995 | Todd |
| 5,672,270 A | * | 9/1997 | Yoshimura |
| 5,681,509 A | | 10/1997 | Bailey ......................... 261/87 |
| 5,846,412 A | * | 12/1998 | Tharp |
| 5,851,447 A | * | 12/1998 | Tyer |
| 5,868,971 A | * | 2/1999 | Meyer |
| 5,868,972 A | | 2/1999 | Galich et al. ............ 261/122.1 |
| 6,193,220 B1 | * | 2/2001 | Kelly |
| 6,244,574 B1 | * | 6/2001 | Downs |
| 6,344,138 B1 | | 2/2002 | Del Guerra .................. 210/168 |
| 6,406,005 B1 | * | 6/2002 | Lawson et al. .......... 261/122.1 |
| 6,808,165 B1 | | 10/2004 | Sperber, Jr. et al. .......... 261/87 |
| 2002/0003314 A1 | * | 1/2002 | Cantz ......................... 261/124 |

FOREIGN PATENT DOCUMENTS

| | | | |
|---|---|---|---|
| DE | 3441731 | | 5/1986 |
| DE | 3710739 | * | 10/1988 |
| DE | 3716744 | * | 12/1988 |
| DE | 4240300 | * | 6/1994 |
| DE | 4309686 | | 9/1994 |
| DE | 200 07 347 U1 | | 8/2000 |
| DE | 10218073 | | 11/2003 |
| EP | 0 625 484 | | 11/1994 |
| EP | 0 947 471 | | 10/1999 |
| EP | 0947473 | | 10/1999 |
| EP | 0 947 473 | | 10/1999 |
| WO | WO 98/21151 | | 5/1998 |
| WO | WO 99/67014 | | 12/1999 |
| WO | WO 03/091169 | | 11/2003 |

OTHER PUBLICATIONS

Pfleiderer, "NewAir Diffuser", Spring of 2002, photograph identified herein as Photo B, exhibited at the IFAT Trade Show, Germany.

Pfeiderer, "NewAir Diffuser", Spring of 2002, photograph identified herein as Photo C, exhibited at the IFAT Trade Show, Germany.

Lakeside Eqpt, Corp., "Lakeside's Newair Fine Bubble Aeration", sales brochure, copyright date 2003, Lakeside Equipment Corporation, Bartlett, IL, USA.

* cited by examiner

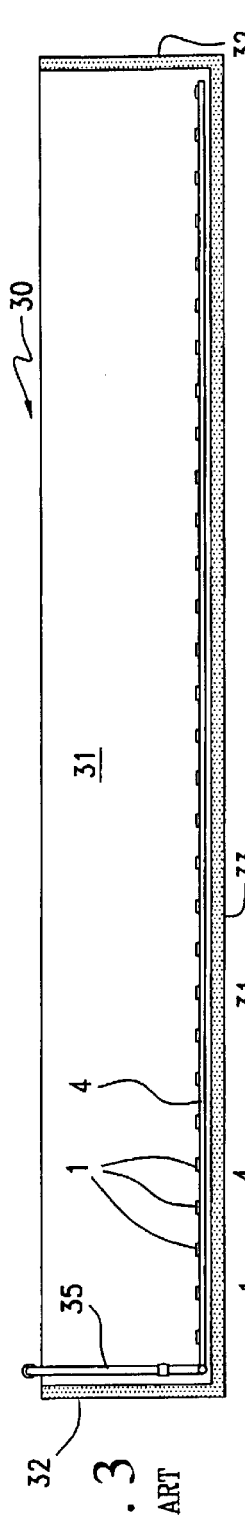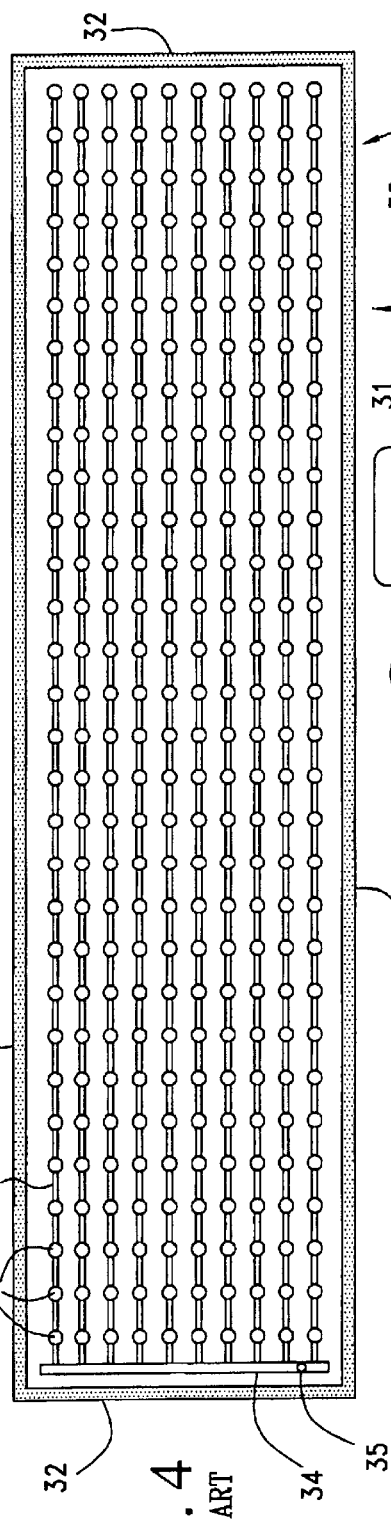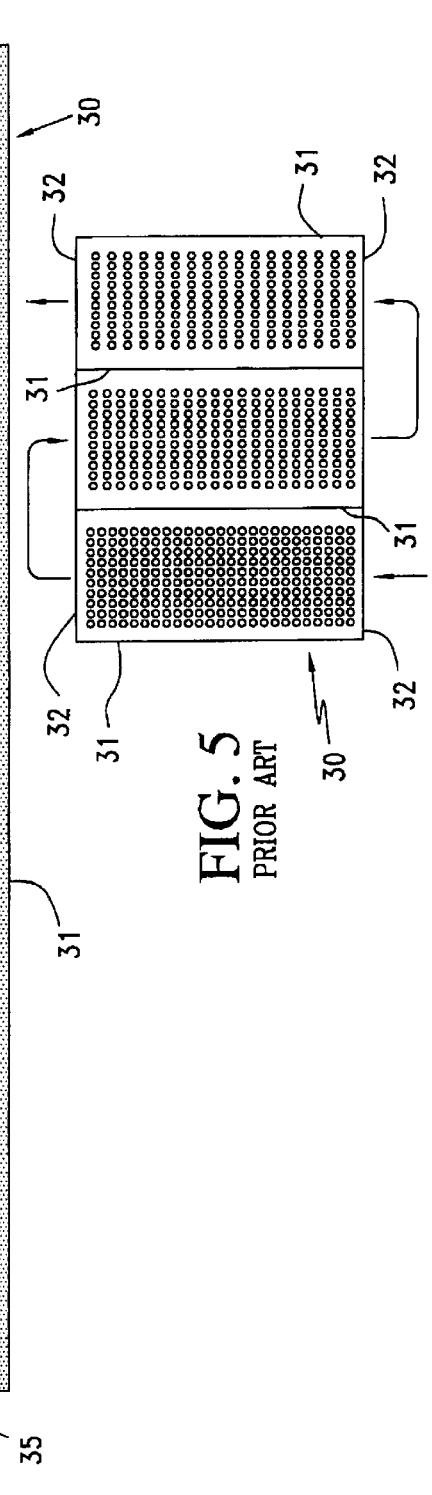
FIG. 3 PRIOR ART
FIG. 4 PRIOR ART
FIG. 5 PRIOR ART

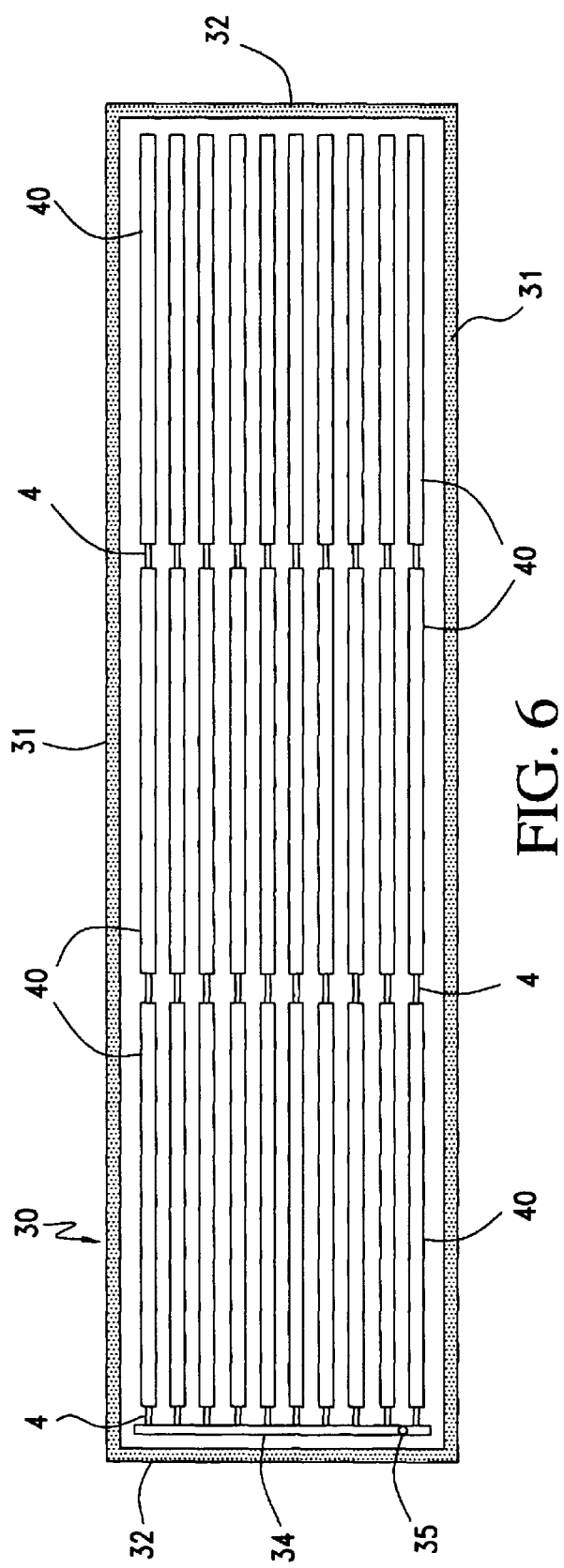
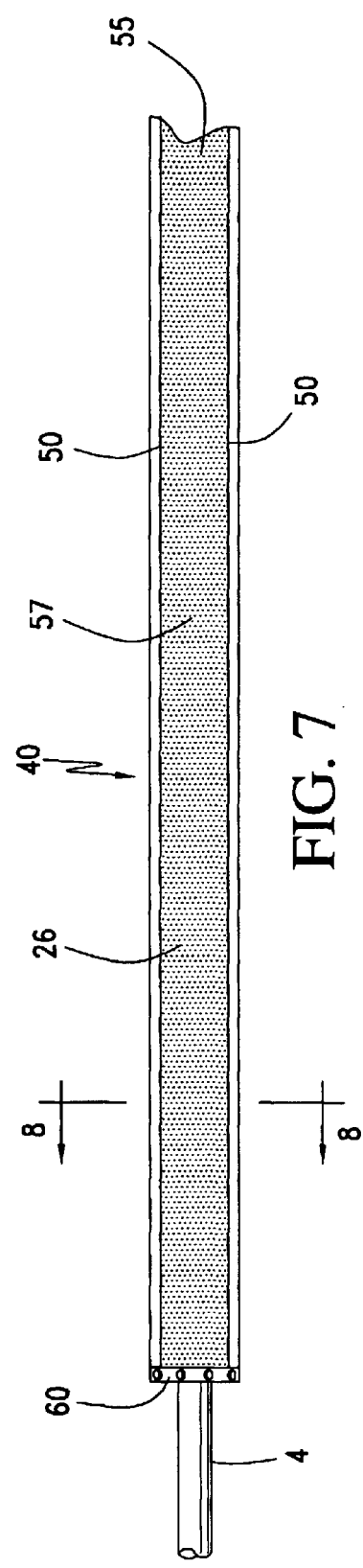
FIG. 6
FIG. 7

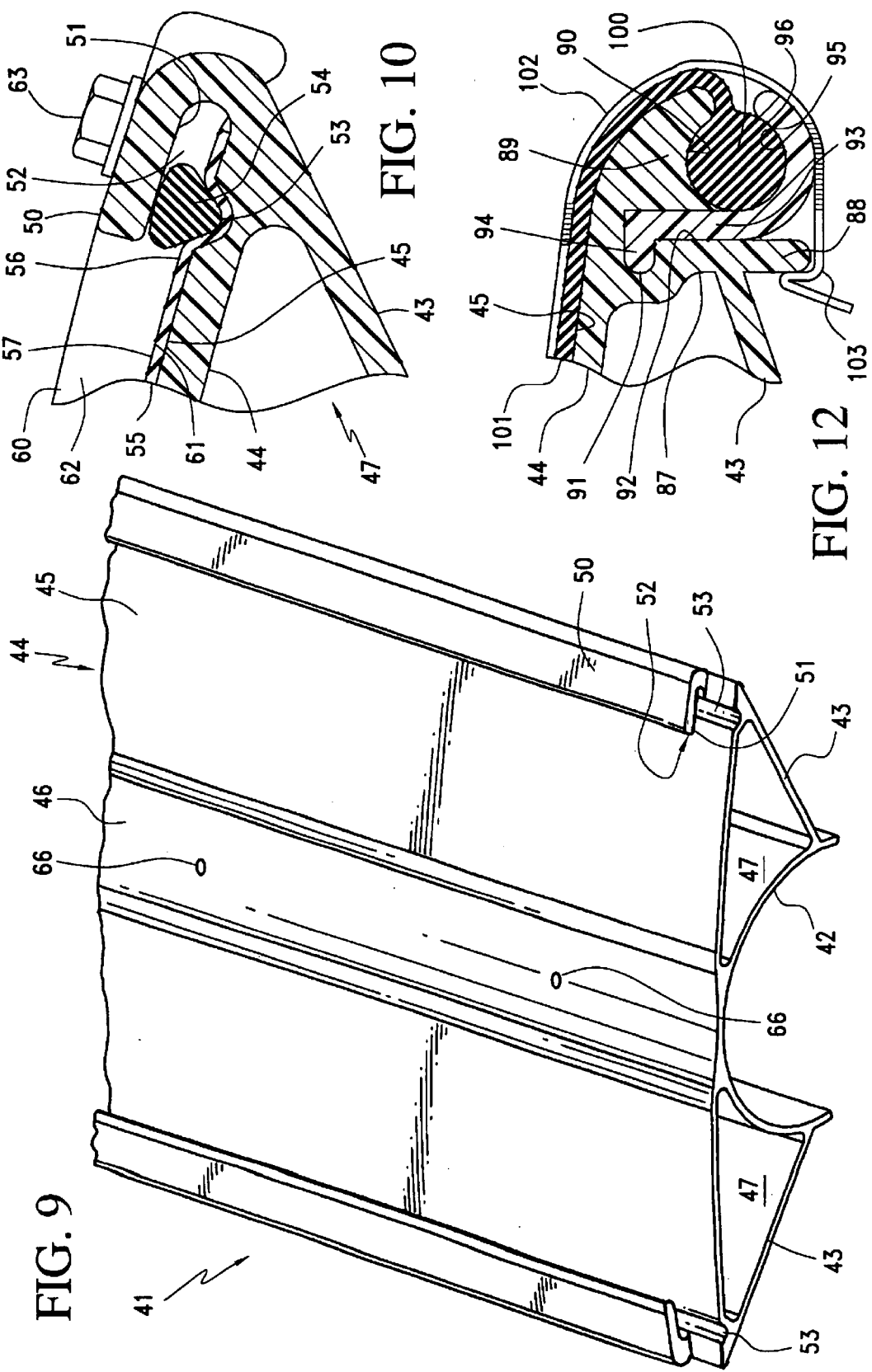

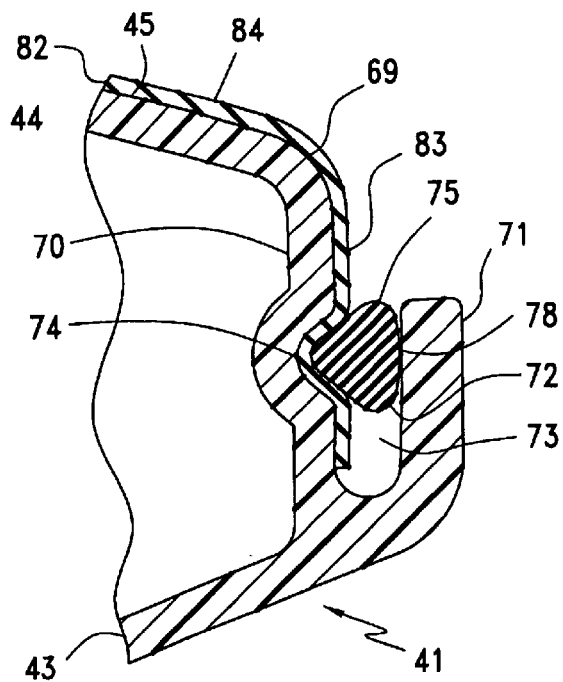
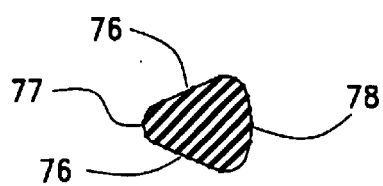
FIG. 11(a)
FIG. 11
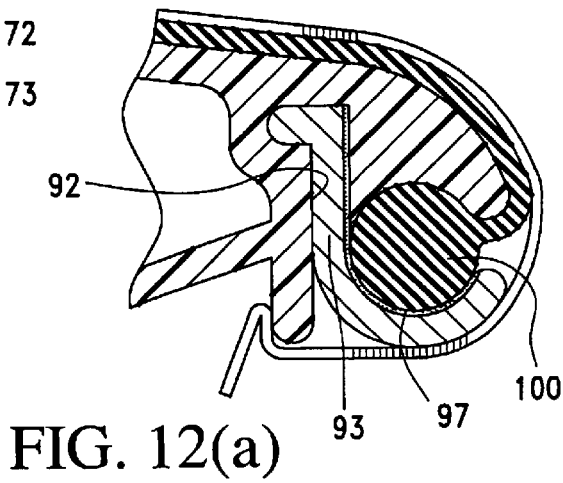
FIG. 12(a)
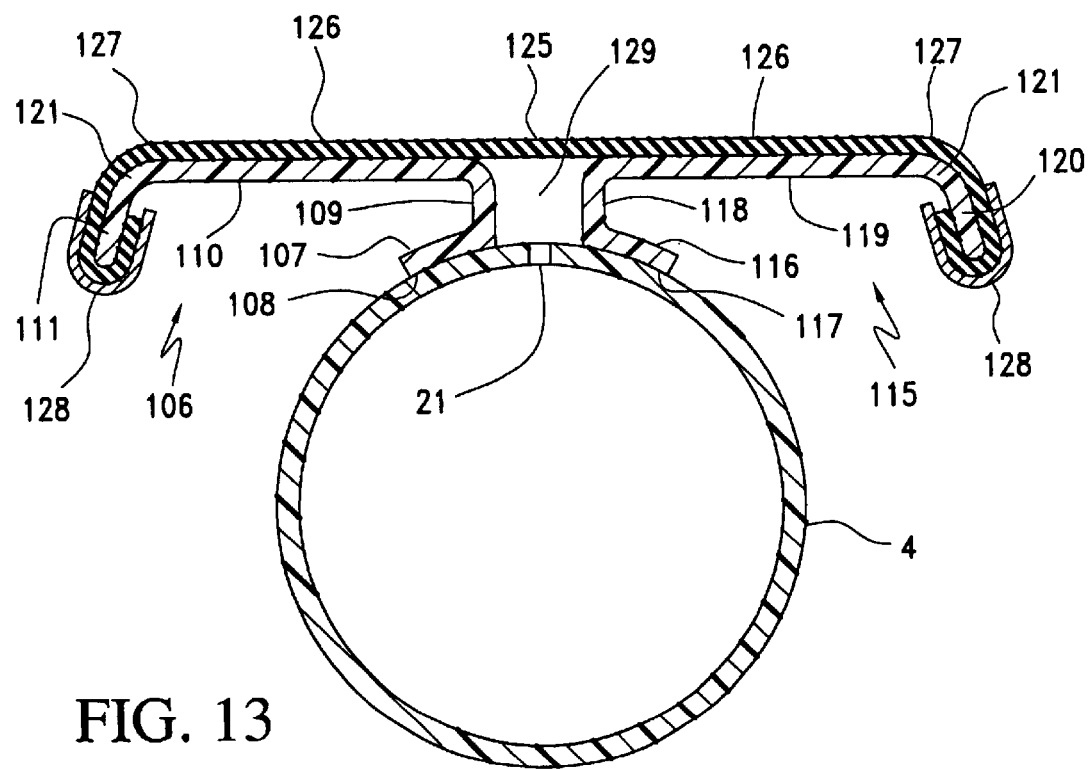
FIG. 13

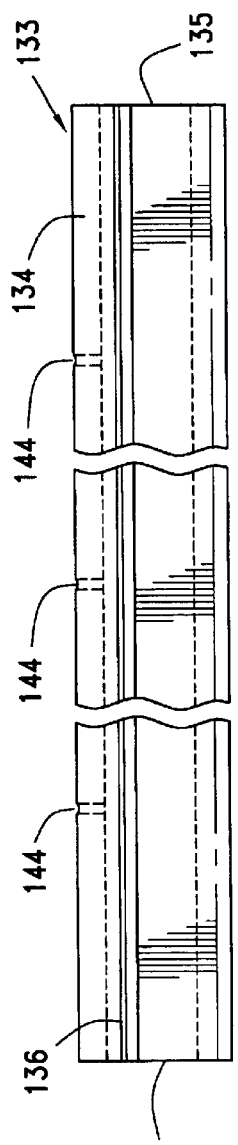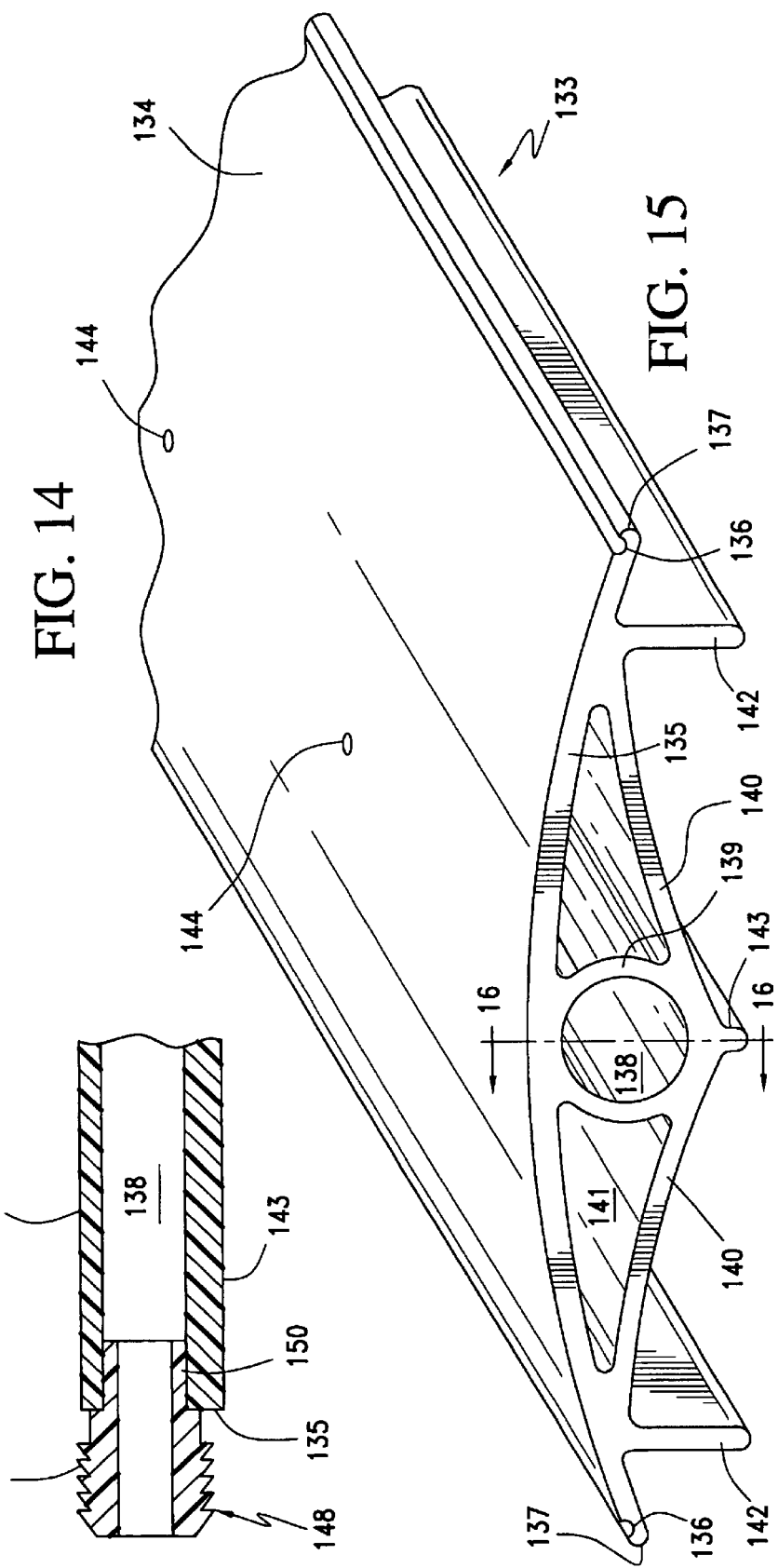

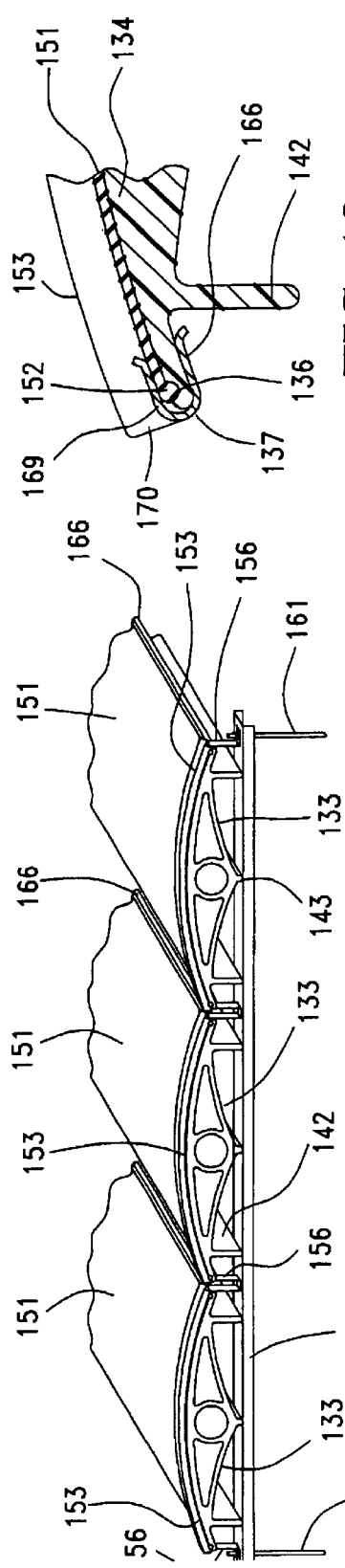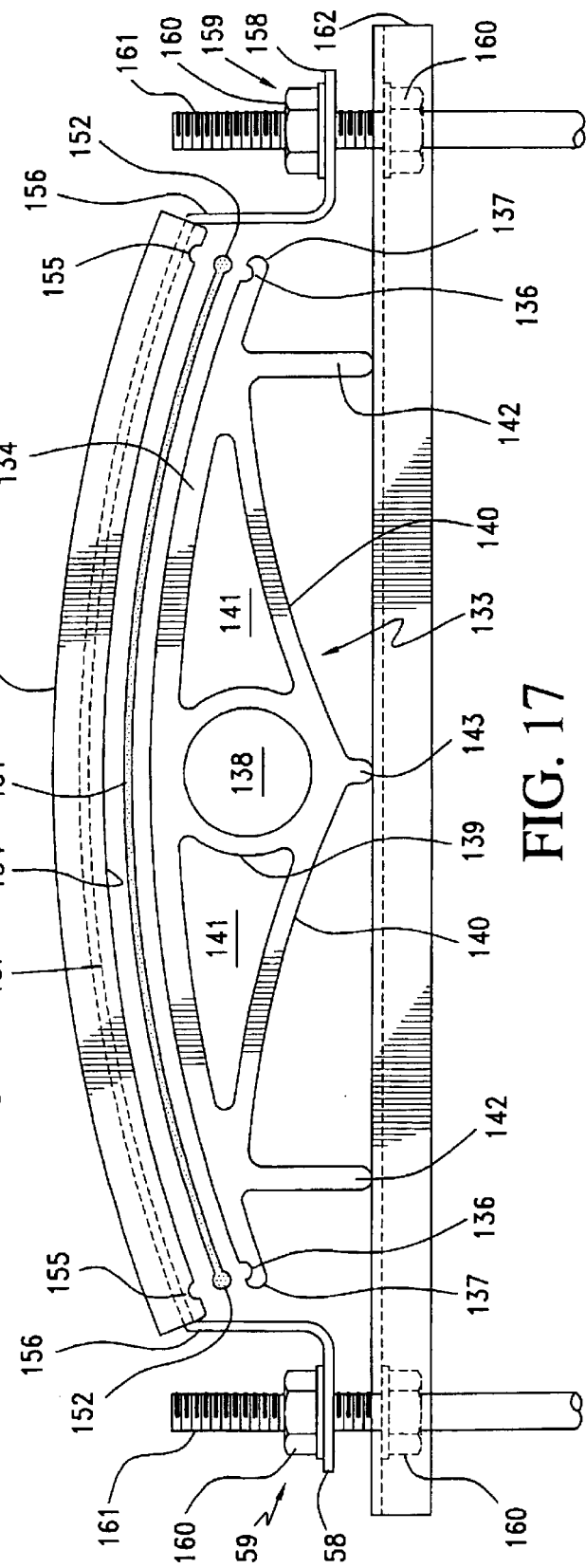

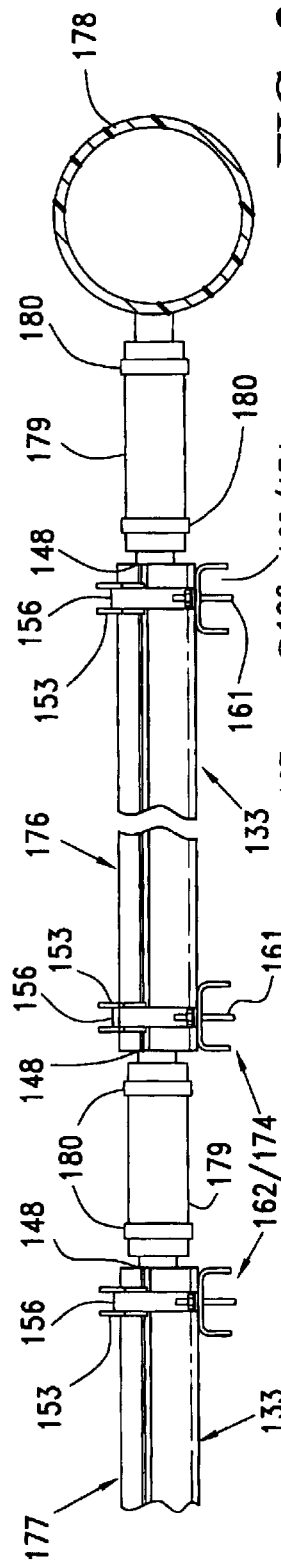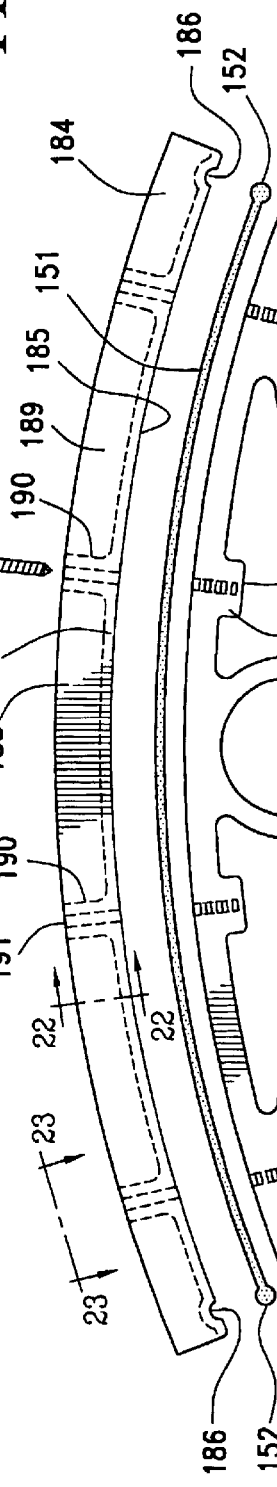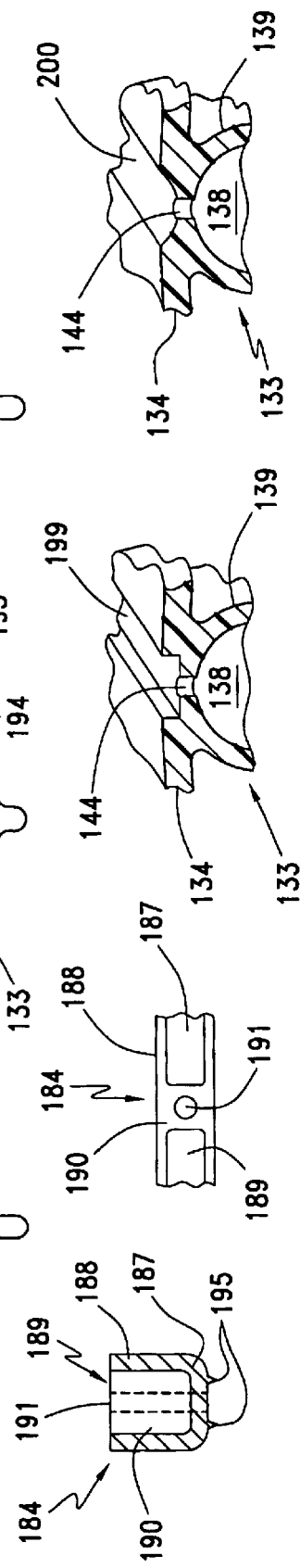

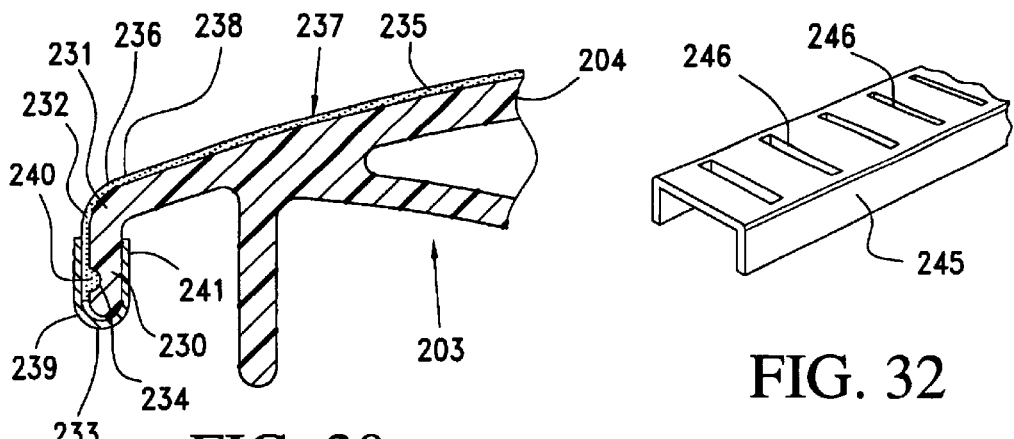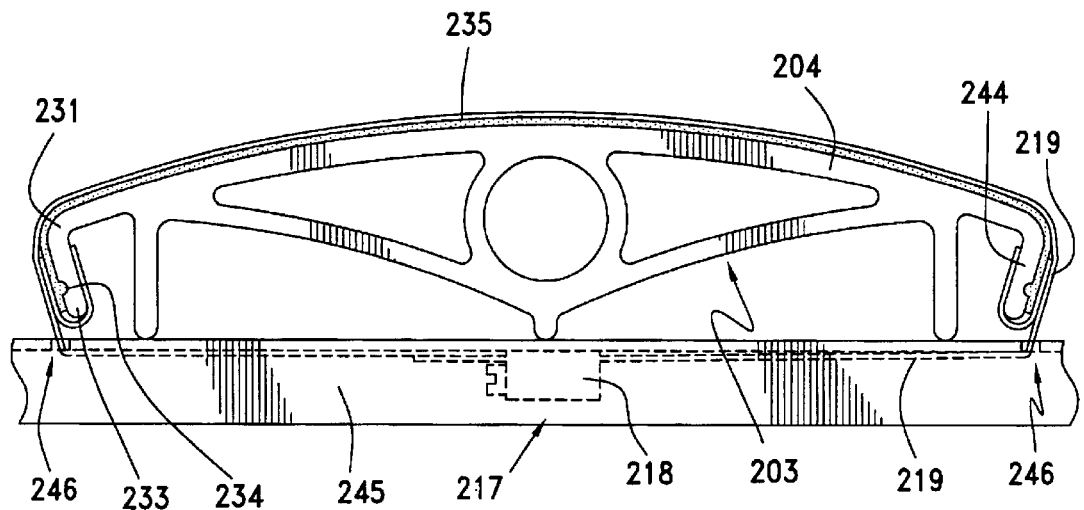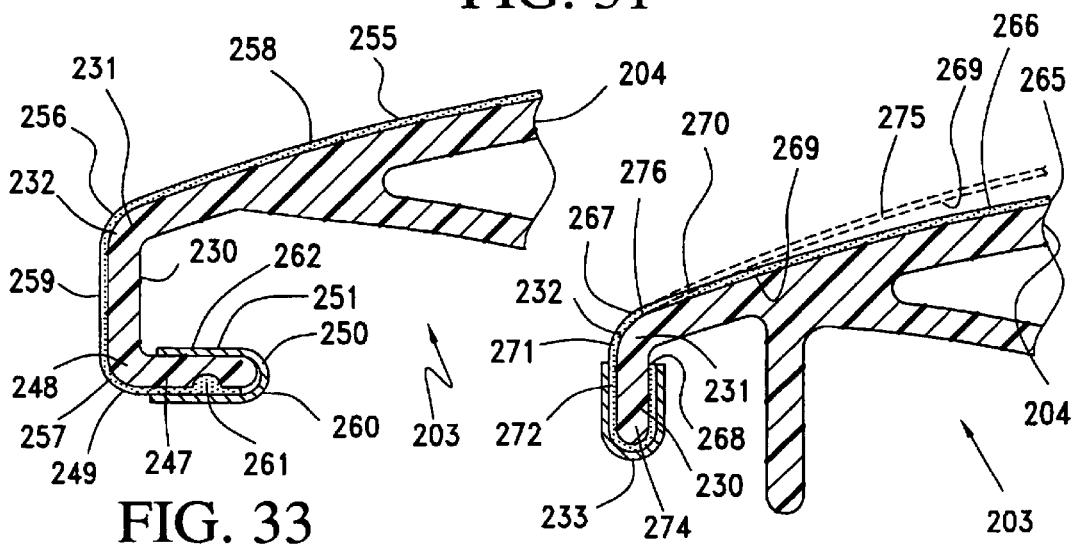

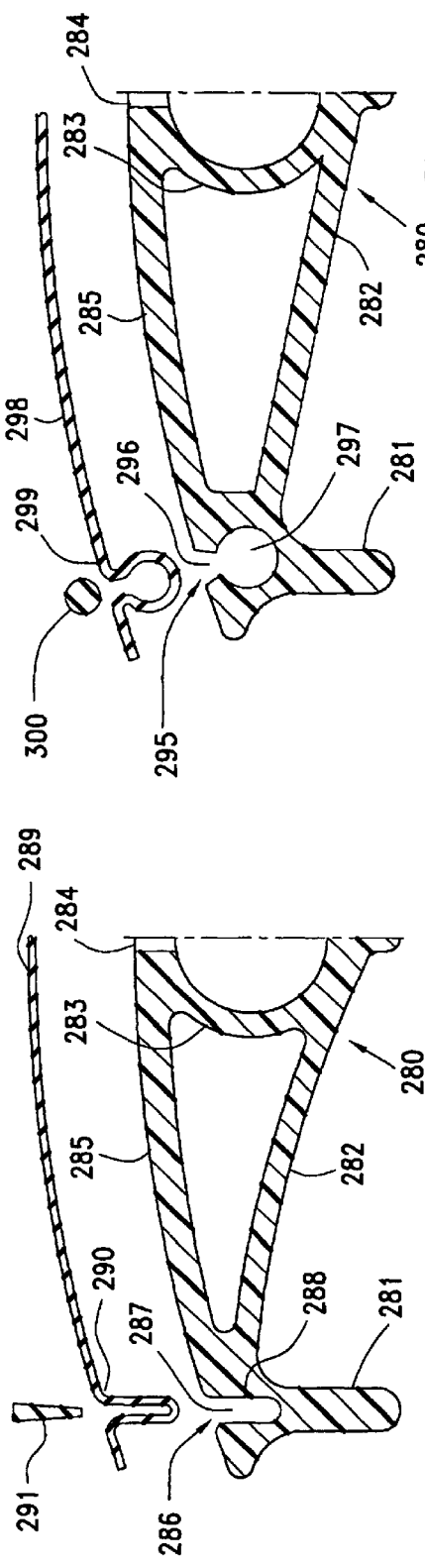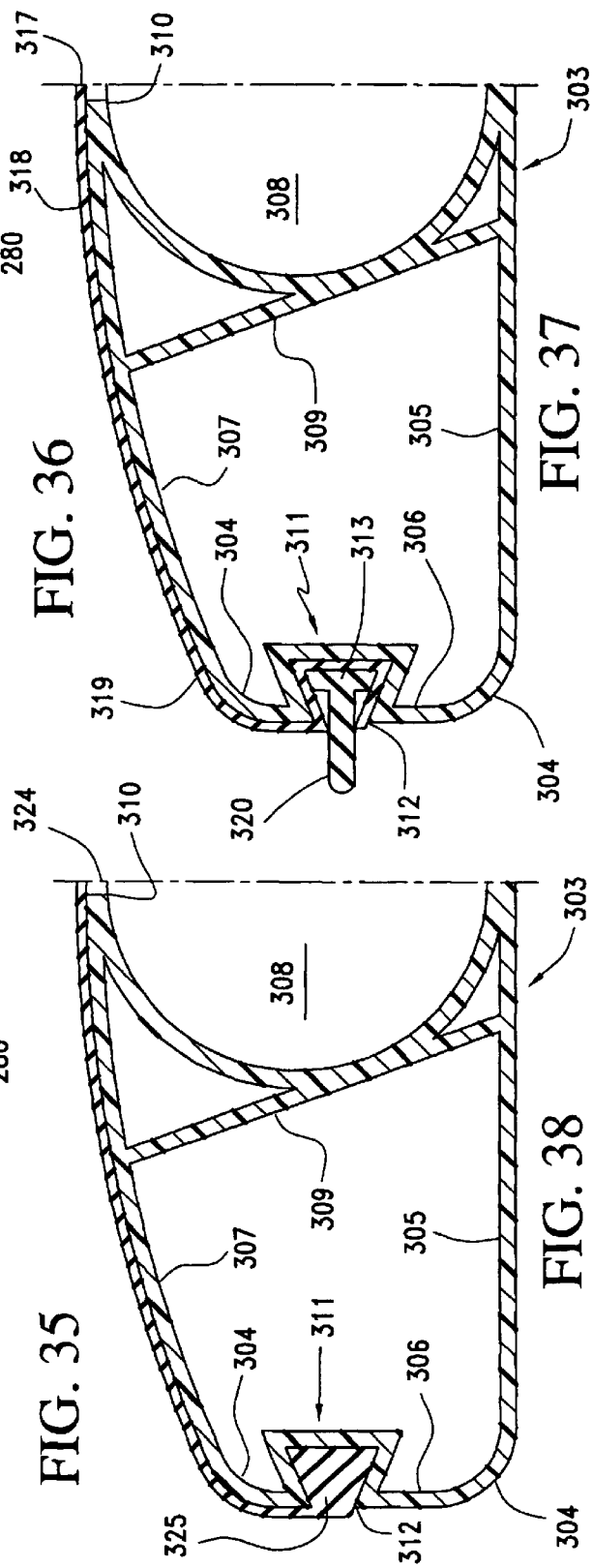

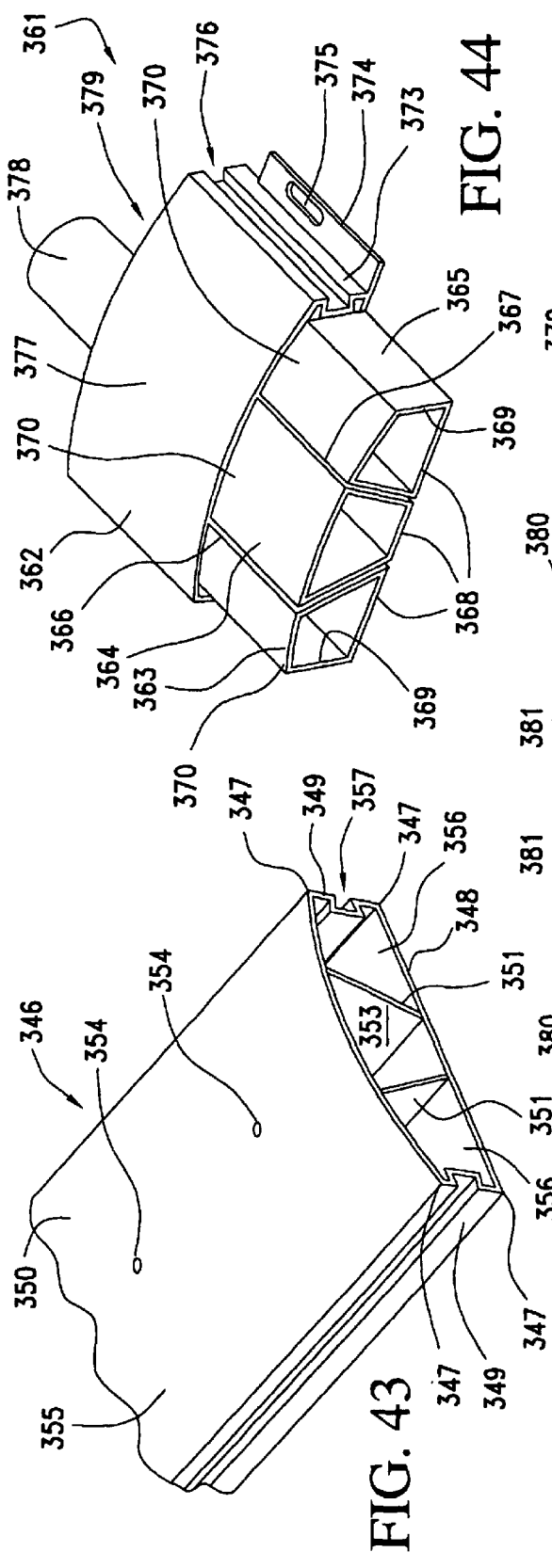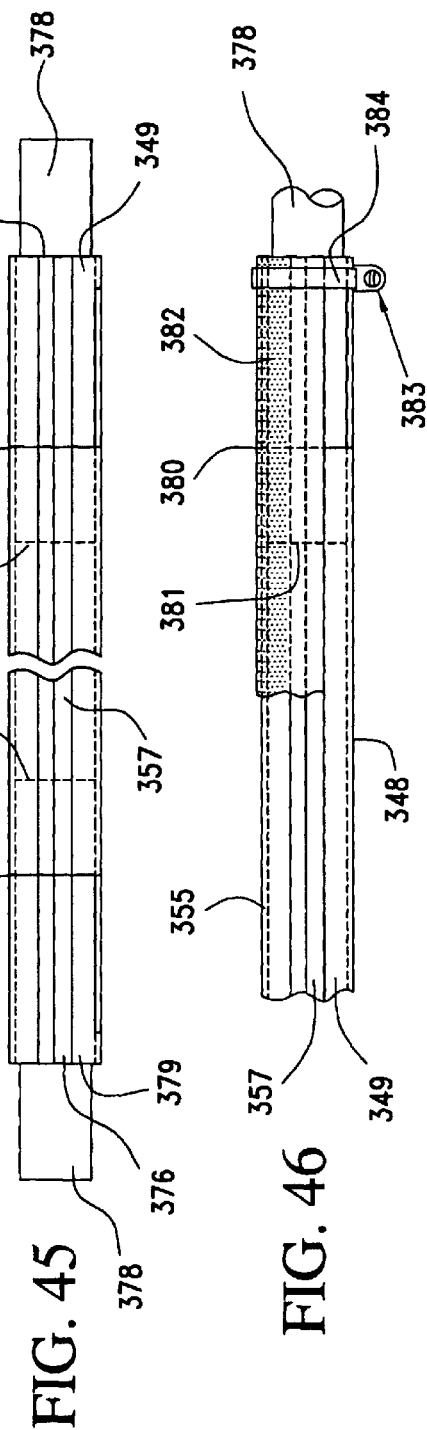

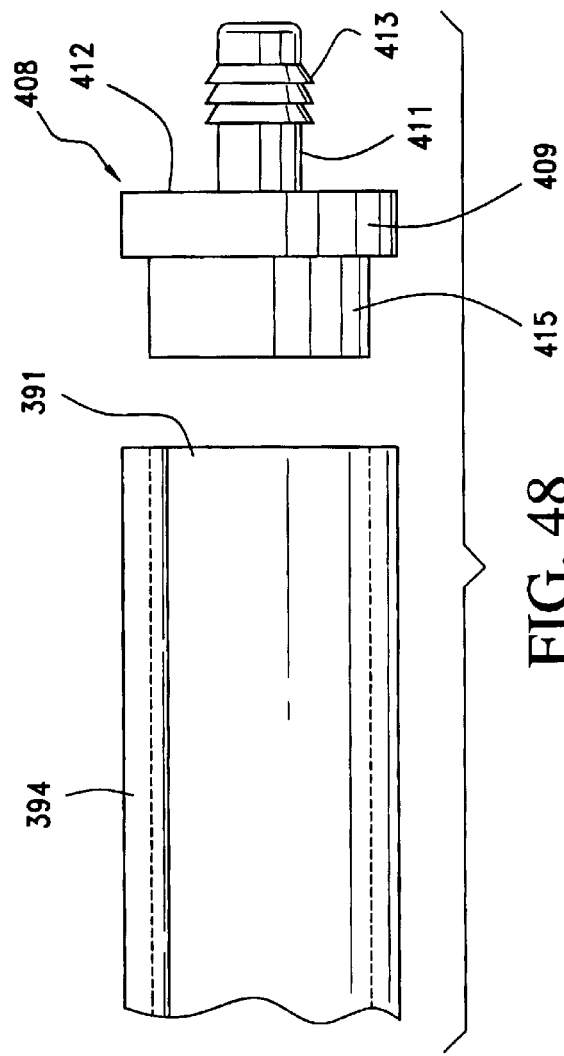
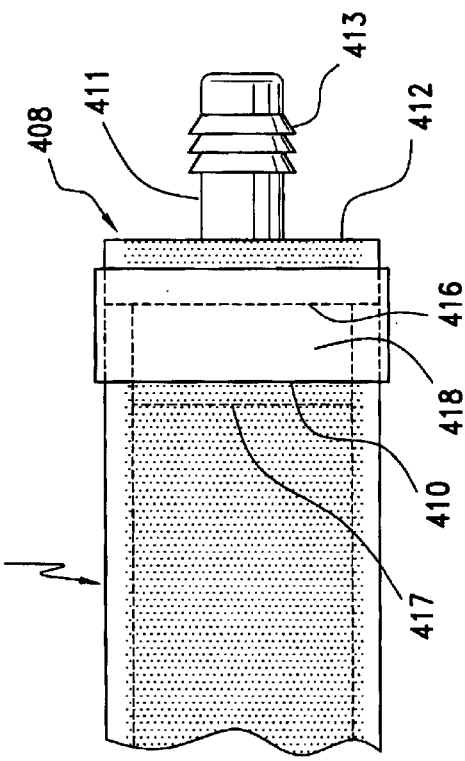
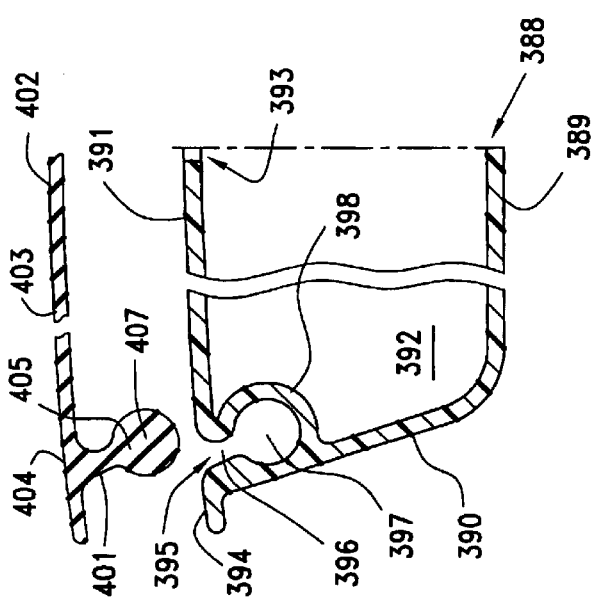
FIG. 48
FIG. 49
FIG. 47

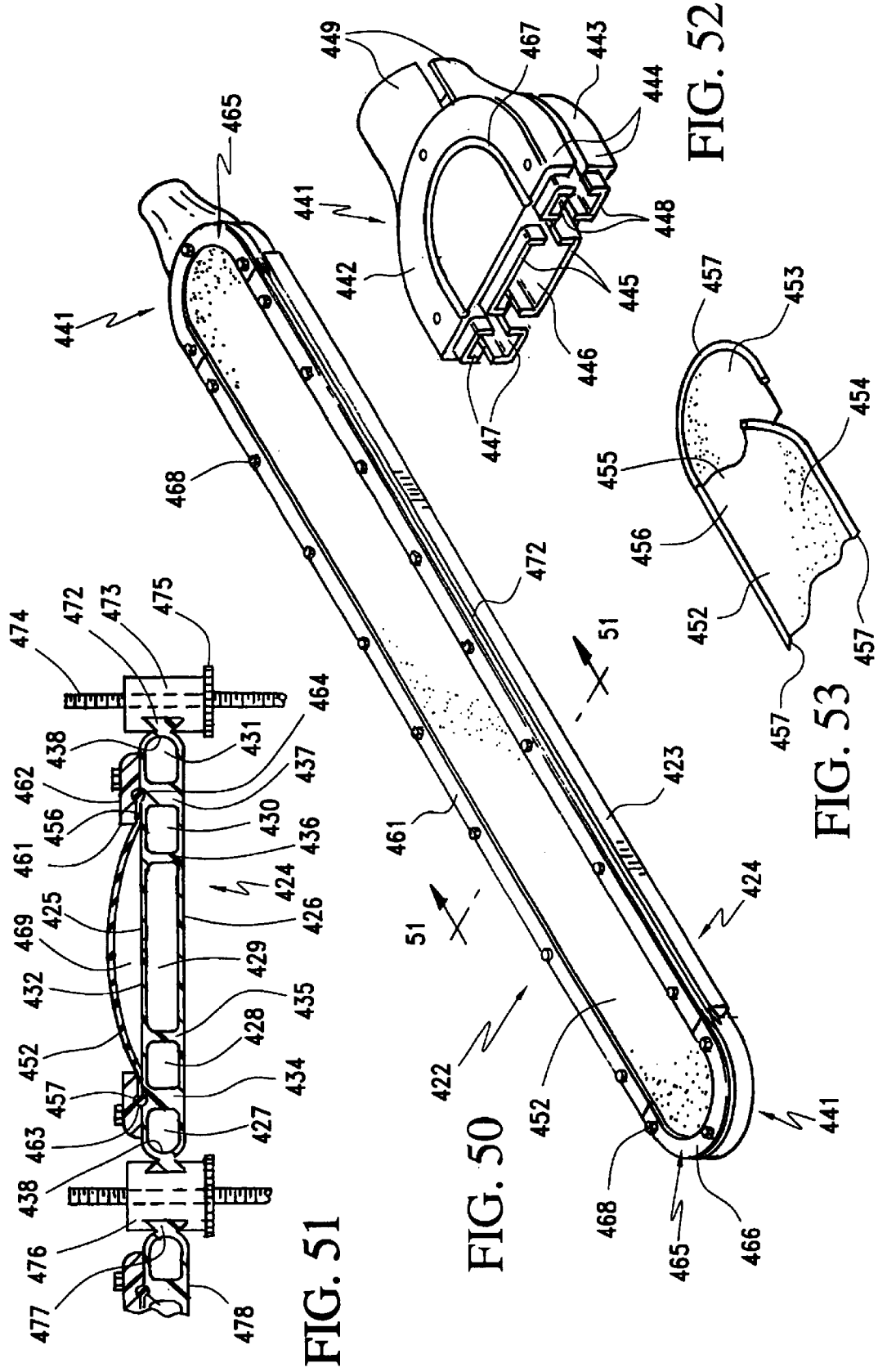

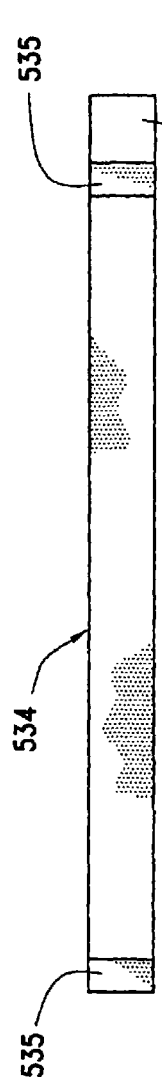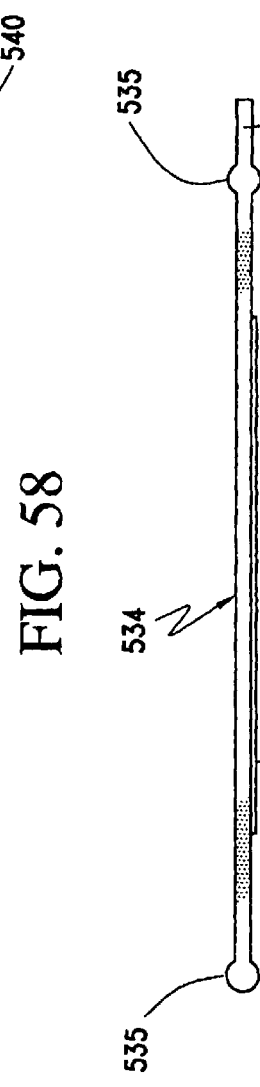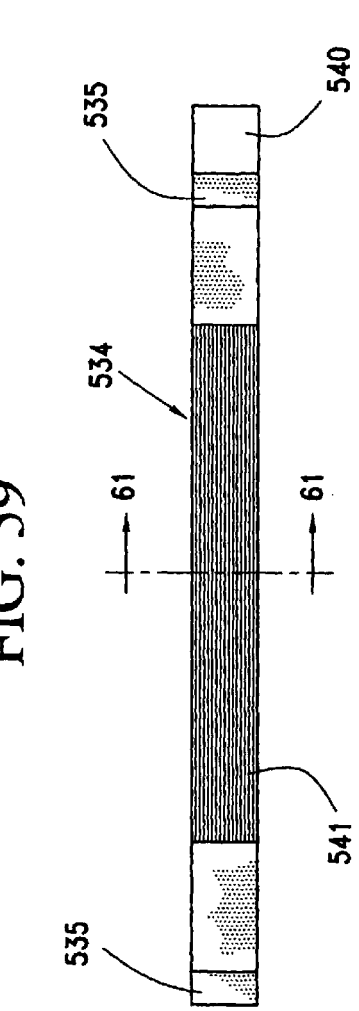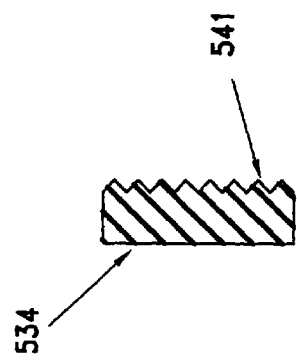
FIG. 58
FIG. 59
FIG. 60
FIG. 61

STRIP DIFFUSER

CROSS-REFERENCE TO RELATED APPLICATIONS

Benefit is hereby claimed of the filing dates of U.S. Provisional Patent Applications Nos. 60/402,715 and 60/408,284, filed respectively on Aug. 13, 2002 and Sep. 6, 2002 in the names of T. Casper, et al., and both entitled STRIP DIFFUSER.

TECHNICAL FIELD

The present invention relates to membrane strip diffusers, to the diffusion of gases into liquids through membrane strip diffusers and to plants for such purpose. More particularly, it relates to membrane strip diffusers for wastewater treatment and to wastewater treatment plants including such diffusers.

BACKGROUND OF THE INVENTION

In treatment of domestic and industrial wastewater, aeration is one of the processes commonly used to promote biological consumption and removal of dissolved and suspended waste material. Aeration devices, called diffusers, are mounted at submerged locations in a man-made or natural wastewater impound, such as a tank or lagoon. Air and/or other treatment gas, in most instances composed of or containing some form of oxygen, is supplied to the diffusers in bulk and is discharged from them as multitudes of tiny bubbles. As these bubbles rise buoyantly through the wastewater, oxygen in the bubbles dissolves into the wastewater. Oxygen supports the life processes of bacteria, supplied to the wastewater in the treatment process, and these bacteria consume the waste. Other treatment gases (including vapors), and sometimes liquids, not necessarily containing oxygen, may be passed through the diffusers for a variety of purposes, such as for cleaning them.

Payments for electricity consumed by compressors or blowers that supply air and/or other treatment gas to the diffusers is one of the largest costs, if not the largest cost, of operating a wastewater treatment plant. Accordingly, much effort has been expended, by those working in this art, to enhance the efficiency of diffuser systems, including not only the diffusers themselves but also arrangements of and ways of operating diffusers within the plants. Moreover, efforts have been made to simplify, "ruggedize" and therefore reduce the capital and maintenance costs of diffuser systems. These efforts have led to a stream of improvements in wastewater treatment plant and diffuser design.

One popular type of diffuser that has been the focus of continuing research and development effort is the membrane diffuser. A membrane diffuser generates tiny gas bubbles by passing treatment gas into wastewater under pressure through a myriad of minuscule pores extending through relatively thin but tough rubbery material in the form of, for example, tubes, rectangular sheets, or disks that are of circular outline in plan view. These pored rubbery media, dubbed membranes, are typically secured in gas-tight relationship, e.g. by a clamping arrangement, to a suitable holder, referred to as a diffuser body.

FIGS. 1–5 depict one particularly popular type of membrane diffuser system which has been available from Sanitaire Division of ITT Industries and its predecessors for more than a decade. FIGS. 1–2 show that in such systems there is a diffuser 1 which includes a body 2 having a saddle-shaped lower wall 3 secured to the upper surface of a gas supply conduit 4 of circular cross-section. The body also includes an inclined conical wall 5, the upper, inner edge of which includes a shelf 6, upon which rests support plate 7. Surrounding plate 7 is a vertical sidewall 10 of the body, an upward extension of shelf 6 having threads 11 on its outer surface. A threaded ring 12 having inwardly projecting flange 13 is installed on threads 11. Membrane 14 includes a central portion 15 and, at its periphery, an integral O-ring portion 16 which is held in sealing engagement with the underside of flange 13, the inner surface of sidewall 10 and a step 17 formed in a peripheral upper edge of plate 7.

In the operation of such a diffuser, treating gas flows from the interior 20 of gas supply conduit 4 through an orifice 21 in the crown of the conduit, acting as a flow regulator. The treating gas enters the diffuser through gas inlet port 22 in lower wall 3 of the body and then passes through a plenum 23 within the body, through a gas passage 24 in support plate 7, through a gas chamber 25 formed between the upper surface of support plate 7 and the lower, gas influent surface of membrane 14, which is inflated when gas is flowing through the diffuser, and finally through perforations 26 in the membrane.

FIGS. 3–5 to illustrate the installation of such diffusers in a wastewater treatment plant. These figures portray schematically a wastewater treatment tank 30 having sides 31 (only one of which is shown), ends 32 and bottom 33. With the aid of conventional stands (not shown) secured to tank bottom 33, a number of the previously mentioned gas supply conduits 4 are mounted close to the bottom in a parallel array. Large numbers of diffusers 1 are mounted at spaced intervals along the gas supply conduits 4, and those conduits are connected through manifold 34 and downcomer pipe 35 to a source of treatment gas under pressure, such as one or more blowers or compressors (not shown).

In many wastewater treatment plants, the wastewater passes through a series of tanks, for example as illustrated in FIG. 5. The density of diffusers, that is, the number of diffusers, and thus the amount of diffuser discharge area per unit of tank bottom area, can be varied from tank to tank or within a given tank, depending on the requirements of the wastewater and of the particular type of treatment being performed. In certain instances, portions of the tank may have no diffusers installed, thereby facilitating, for example, in an aeration plant, the creation of anoxic zones. As persons skilled in the art will readily understand, there are many different ways of laying out the diffusers and gas supply conduits in wastewater treatment plants, and the subject matter depicted in these figures represents merely a sample rather than a comprehensive illustration of prior practice.

The diffusers illustrated in FIGS. 1–5, when viewed in plan view, are of circular outline, and are thus referred to as membrane disk diffusers. The particular diffusers illustrated above provides very high performance in terms of system durability and OTE (oxygen transfer efficiency) and, as such, have achieved wide acceptance in many countries throughout the world.

Numerous other membrane diffuser designs have developed, including membrane tube diffusers, based on tubular membranes, and panel diffusers, based for example on rectangular sheets of membrane material. Typically, they permit a modest degree of inflation of portions of the membrane surfaces by the pressurized treatment gas. Because of the clamping of disk and sheet membrane edges, inflation occurs inward of those edges. Membrane disk diffusers may or may not be restrained against inflation at their centers. With the rectangular sheet membranes of panel diffusers, the area of the membrane and the resultant potential for inflation are often considerably larger than in the disks. Thus, some type of overlying grid member with relatively large openings in it is usually included in the diffuser body and held against the upper surface of the membrane to control the extent to which it inflates.

Whether as a result of unexpected power failures or intentional shut-off for process reasons, membrane diffusers can undergo interruption of gas flow, resulting in deflation of the membranes. In view of their submergence and the great weight of the wastewater bearing down on the membranes, membrane diffuser bodies ordinarily include some sort of membrane support beneath the membrane to prevent it from being damaged or displaced under the weight of the wastewater when the membrane is no longer supported by gas pressure. When gas is flowing and the membrane is under pressure and at least partially inflated, a space or gas chamber exists between the upper surface of the support and the lower surface of the membrane.

Another category of membrane diffuser that has evolved is the strip diffuser. For example see U.S. Pat. Nos. 4,029,581 and 5,868,971; U.S. Published Patent Application US2002/0003314 A1; International (PCT) Published Application WO 98/21151; and Offenlegungschrift (German Published Application) DE 42 40 300 A1. The term strip is appropriate for these diffusers because their membranes and gas discharge surfaces generally have a length to width ratio larger than that found in the typical panel diffuser. For example, length to width ratios of about 4:1 or more, and in some cases considerably larger, can be found in strip diffusers.

Where there is this greater length to width ratio, it is possible to provide the diffuser with considerable aeration area while limiting its width. Diffuser area, utilized properly, can be a factor in attaining desired or increased levels of OTE (oxygen transfer efficiency), with resultant conservation of electricity during processing of a given amount of wastewater. Strip diffusers hold promise of a convenient way of increasing the mass transfer rate of oxygen into wastewater while maintaining OTE levels at least approximately consistent with disk diffusers. Also, in many instances it is possible to limit the width of the membrane in a strip diffuser to a sufficient extent that an overlying grid member and its attendant manufacturing costs can be dispensed with. On the other hand, in common with panel diffusers, strip diffusers include membranes and diffuser bodies which include membrane supports.

Strip diffusers are believed to represent a promising approach for further reducing the capital costs, including those of installation, and the operating costs, of biological wastewater treatment plants involving aeration. It is believed that there is room, and a need for, further improvements in strip diffusers, and the subject matter of the present disclosure and claims is aimed at fulfilling this need.

SUMMARY OF THE INVENTION

It is believed that one or more of the foregoing needs is satisfied in part by the present invention, which includes a number of aspects and embodiments to be described below.

According to one aspect, the invention includes a strip diffuser comprising a flexible membrane. This membrane has: a length to width ratio of at least about 4, more preferably at least about 6, still more preferably at least about 8, and most preferably at least about 10; gas influent and gas discharge surfaces; and gas discharge pores extending from said gas influent surface through said membrane and through said gas effluent surface across at least a portion of said gas discharge surface. Also, the diffuser has a diffuser body including a longitudinally-extending membrane support member with a length to width ratio of at least about 4, more preferably at least about 6, still more preferably at least about 8, and most preferably at least about 10. Moreover, the diffuser has, as an integral or attached feature, a longitudinally-extending gas supply channel that, when viewed in transverse cross-section, comprises circumferentially closed gas flow confining wall means. At least a portion of the wall means extends beneath and provides structural bracing for the support member along at least a major portion of the length of the support member. Such wall means comprises one or more walls in addition to the support member. The respective lengths of the membrane, support member and channel extend in the same general direction, and the support member and the membrane, at least when the diffuser is operating, define a longitudinally-extending gas chamber between them.

A number of other features, when combined with the foregoing, represent additional aspects of the invention. These various combinations, referred to hereinafter as embodiments, represent inventions in their own right.

For example, the above-described diffuser may comprise a plurality of gas-injection passages, spaced longitudinally along the gas supply channel and extending from the interior of the gas supply channel through the membrane support member.

In certain preferred embodiments, these gas-injection passages are of sufficiently small flow cross-section to generate, during operation of said diffuser, sufficient pressure drop across said passages to contribute measurably to enhanced uniformity of distribution of gas flow among the respective passages, thus constituting flow regulating orifices.

In a refinement of any of the foregoing embodiments, the membrane has a gas discharge surface that, when the membrane is operating, is held by the diffuser body substantially within an envelope that, when viewed in a transverse cross-section of the body and membrane, has a base line that connects two points at which the gas chamber is widest horizontally, vertical side lines perpendicular to the base line at each of said points, and a top line, running parallel to, above and at a distance from the base line of about ¼, more preferably about 3/16 and still more preferably about ⅛, of the distance between the side lines. In a preferred version of this refinement, the base line connects two points at which the support member and a gas influent surface of the membrane contact one another at the edges of the gas chamber.

According to any of the prior embodiments, the diffuser comprises a flexible membrane of sheet material having sides and ends with longitudinal edges along its sides and wherein the gas discharge pores extend from said gas influent surface through said sheet.

In any embodiment, the support member may be substantially wider, preferably at least about 1.5, more preferably at least about 2 and still more preferably at least about 2.5 times wider, than the gas supply channel, when both are viewed in transverse cross-section.

Preferably, in any of the foregoing embodiments, the diffuser body is of extruded material.

In any preceding embodiment, gas supply channel may comprise longitudinally extending confining wall means in addition to but integral with the membrane support member.

The gas supply channel may, in any preceding embodiment, comprise longitudinally extending confining wall means formed separately from but secured directly or indirectly to the membrane support member.

In another more detailed form of strip diffuser representing a second aspect of the invention, the diffuser comprises a flexible membrane of sheet material having gas influent and gas discharge surfaces, sides and ends with longitudinal edges along its sides, a length to width ratio of at least about 4, more preferably at least about 6, still more preferably at least about 8, and most preferably at least about 10, and gas discharge pores in at least a portion of its gas discharge surface. There is a diffuser body of extruded material including a longitudinally-extending membrane support member with a length to width ratio of at least about 4, more preferably at least about 6, still more preferably at least about 8, and most preferably at least about 10. There is also a longitudinally-extending, circumferentially closed gas supply channel, at least a portion of which extends beneath and provides structural bracing for the support member along at least a major portion of the length of the support member, and which comprises, as viewed in transverse cross-section, wall means in addition to the support member. The respective lengths of the membrane, support member and channel extend in the same general direction, and the support member and the membrane, at least when the diffuser is operating, define a gas chamber between them. A plurality of gas-injection passages, spaced longitudinally along the gas supply channel, extend from the interior of the gas supply channel through the membrane support member, said gas-injection passages being of sufficiently small flow cross-section to generate, during operation of said diffuser, sufficient pressure drop across said passages to contribute measurably to enhanced uniformity of distribution of gas flow among the respective passages, thus constituting flow regulating orifices. When the membrane is operating, the membrane gas discharge surface is held by the diffuser body substantially within an envelope that, when viewed in a transverse cross-section of the body and membrane, has a base line that connects two points at which the gas chamber is widest horizontally, vertical side lines perpendicular to the base line at each of said points, and a top line, running parallel to, above and at a distance from the base line of about ¼, more preferably about 3/16 and still more preferably about ⅛, of the distance between the side lines.

A number of optional more detailed embodiments of this second aspect represent additional inventions in their own right. Among them are the following.

The gas supply channel may comprise longitudinally extending confining wall means in addition to but integral with the membrane support member.

The gas supply channel may comprise longitudinally extending confining wall means formed separately from but secured directly or indirectly to the membrane support member.

Another embodiment, identified as a sealing embodiment, is based on the second aspect but has additional features, the diffuser body having first and second longitudinal sides, and, at each of said sides, a fixed, first longitudinally-extending concave seal-engaging surface. Within a portion of the body adjacent each of said sides, there is a longitudinally-extending first, female securing member that appears as walls surrounding an open portion in the transverse cross-section of the body. There is also a second, male securing member comprising a second longitudinally-extending concave seal-engaging surface, and said second securing member further includes a portion which is insertable into the first securing member, and has a shape adapted to cooperate with the shape of the first securing member, when inserted therein, to hold the first and second concave surfaces in fixed positions, said first and second longitudinally-extending concave seal-engaging surfaces facing one another when the second securing member is inserted in the first securing member. The membrane of this embodiment includes, along each of its longitudinal edges, a sealing member having a shape and size adapted to sealingly engage with said first and second concave seal-engaging surfaces.

There are a number of optional preferred forms of this sealing embodiment. For example, the first and second longitudinally-extending concave seal-engaging surfaces may respectively face downward and upward.

In another of these optional but preferred sealing embodiments, the support member has an upper surface and the first longitudinally-extending concave seal-engaging surface is in a portion of the body that includes an extension of the support member upper surface and reaches outwardly and downwardly from that upper surface.

In any sealing embodiment, the second securing member, when viewed in transverse cross-section, may resemble, at least in part, the shape of the letter "J".

Moreover, the first securing member may comprise a slot extending longitudinally in the body, and the second securing member includes a portion that is insertable by longitudinal sliding motion into said slot. In a preferred version of the embodiment just described, means are provided to reduce friction during said sliding motion between: (a) any one or more surfaces of the second securing member and (b) any one or more areas of the first securing member and/or of the sealing member. Such means may be one or more layers, for example fluent, semi-solid or solid layers or solid members, of low friction material. Such layers are interposed between adjoining portions of said surfaces and of said areas and may optionally be adherent to portions of said surfaces or areas. Optionally, in any sealing embodiment, the second securing member extends through substantially the entire length of the slot.

In any form of sealing embodiment, the first and second longitudinally-extending concave seal-engaging surfaces may be arcuate surfaces and the sealing members of the membrane may include O-ring seals extending along longitudinal edges of the membrane.

There is a group of so-called "depression embodiments" which may basically include the features of any previously-described aspect or embodiment, preferably the first aspect, and which may include additional features. In the depression embodiments, a plurality of gas-injection passages are spaced longitudinally along the gas supply channel and extend from the interior of the gas supply channel through the membrane support member, the membrane support member has an upper surface for supporting the gas influent surface of the membrane when the diffuser is not in operation, a depression extends longitudinally in said upper surface, and at least a portion of the gas-injection passages have outlets positioned to communicate with the interior of said depression.

In a number of optional depression embodiments, a plurality of said outlets open into said depression.

In any depression embodiment, the depression, as viewed in transverse cross-section, may comprise rectilinear surfaces and/or an arcuate surface and/or surfaces of other shapes.

Moreover, in any depression embodiment, the depression may be sufficiently narrow in the transverse direction and the membrane may be sufficiently resistant to stretching in the transverse direction, so that the membrane does not collapse against such outlets when the gas effluent surface of the installed diffuser is under hydrostatic pressure but the diffuser is not in operation, whereby the gas influent surface of the membrane does not block said outlets during startup of the diffuser.

In any depression embodiment, the depression may extend longitudinally in the upper surface of the support member, membrane end-sealing and securing members may be are positioned at the ends of the membranes, and the membrane end-sealing and securing members may include convex portions which, as viewed in transverse cross-section, are sufficiently compatible in profile to the depression for exerting downward pressure on the membranes within the depression, thereby inducing transverse tension in the membrane at said ends for assisting in sealing the membrane at its ends.

Any of the previously described embodiments may be supplied with or without membrane end-sealing and securing members positioned at the ends of the membranes.

Particularly preferred end sealing arrangements, useful in any embodiment of the invention, employ urging the membrane toward the support with a band of elastomeric material, extending across the membrane at its end. Optionally, the sealing action of this band may be assisted by adhesive bonding of the underside of the membrane to the upper surface of the support and/or by a supplemental band, e.g., of metal, installed across the upper surface of the elastomeric band.

Preferably, any of the foregoing embodiments are supplied with longitudinal membrane edge-sealing and securing members extending lengthwise of said support members and membranes, and membrane end-sealing and securing members positioned at the ends of the membranes.

Particularly preferred optional forms of any foregoing embodiment comprise longitudinal membrane edge-sealing and securing members extending lengthwise of said support members and membranes, and have first surfaces in contact with said membrane and second surfaces not in contact with said membrane, and membrane end-sealing and securing members positioned at the ends of the membranes. At least portions of said end-sealing and securing members bear against the second surfaces of the edge-sealing and securing members. These are referred to below as securing embodiments.

In any securing embodiment, the end-sealing and securing members may optionally bear against the edge-sealing and securing members in a direction toward the membrane support member upper surface.

Another securing embodiment option has the end-sealing and securing members, in the installed diffuser, bearing at least in part downwardly against the edge-sealing and securing members.

There are "protrusion embodiments" which are optional modifications of any of the above embodiments. In one example of these, the diffusers have protrusions from one or more surfaces of the membrane at its longitudinal edges that extend along the length of the membrane and also have grooves having transverse cross-section complementary to the protrusions on a surface or surfaces that is/are part of the support member or extensions thereof. The protrusions and grooves cooperate to at least assist in securing and/or sealing the membrane to said surface of the support member or extension thereof.

In another protrusion embodiment, the membrane support member has longitudinal edges and there are protrusions from a surface of the support member or of extensions thereof, said protrusions extending along the length of said support member or extensions, and the protrusions contact and compress the membrane in the vicinity of such contact to at least assist in securing or sealing the membrane to a surface of the support member or extensions thereof.

According to a number of "skirt embodiments", which may be based on any of the previous embodiments, the membrane support member comprises an upper surface and extensions in the form of longitudinally extending skirts that depend from the sides of said upper surface, these skirts respectively having membrane-contacting surfaces that are inclined downwardly from portions of the upper surface which they adjoin, preferably by at least about 30 degrees, more preferably at least about 45 degrees, and still more preferably at least about 60 degrees. A number of optional and preferred modifications of the skirt embodiments are described below.

The membrane support member may have an upper surface portion adjoining the skirt which, in the installed diffuser, is generally horizontal.

The skirt, in the installed diffuser, may be generally upright.

Optionally, the membrane support member has an upper surface portion adjoining the skirt which, in the installed diffuser, is generally horizontal, and the skirt, in the installed diffuser, is generally upright.

According to a further option, the upper surface and the membrane-contacting surfaces of the skirts are connected with one another through transition surfaces that, as viewed in transverse cross-section, provide gradual change in direction between the connected surfaces. For example, the transition surfaces may be generally curved.

In yet another skirt embodiment, the skirts have outer membrane-contacting surfaces, and the membrane support members comprise further extensions in the form of longitudinally running strips attached to the skirts, which strips, as viewed in transverse cross-section, have undersurfaces that are angled relative to the membrane-contacting surfaces of the skirts, and are positioned below that portion of the membrane support member in which the support member upper surface is located.

Another aspect of the invention includes gas diffusion systems for distributing gas in the form of bubbles into a liquid. These systems may comprise a tank having a bottom and upwardly extending sides for holding the liquid, a pipe grid, located substantially below the intended level of the surface of the liquid in the tank. The grid may include one or more manifolds and one or more branch conduits that are in communication with the manifold(s) to receive flowing gas therefrom and that have circumferentially closed wall means to receive, confine and convey said flowing gas. The system further comprises plural diffusers respectively comprising extruded diffuser bodies respectively including longitudinally-extending membrane support members having a length to width ratio of at least about 4, more preferably at least about 6, still more preferably at least about 8, and most preferably at least about 10, having the long dimensions of the respective support members oriented in the same general direction as the lengths of the branch conduits, and having longitudinally-extending gas-confining wall means in addition to the membrane support members, in this embodiment, branch conduits constitute gas supply conduits of the diffuser bodies to supply flowing gas to the diffusers. Throughout a substantial portion of their respective lengths, the membrane supports and the supply conduits have a connective relation such that the membrane supports either may be integral with the supply conduits or may be formed separately from but are joined with the supply conduits in any suitable manner. Flexible membranes, secured to the diffuser bodies, respectively have gas influent and gas discharge surfaces, sides and ends with longitudinal edges along its sides, and a length to width ratio of at least about 4, more preferably at least about 6, still more preferably at least about 8, and most preferably at least about 10, and gas discharge pores in at least a portion of its gas discharge surface. The support members and membranes form, at least when the diffusers are in operation, longitudinally-extending gas chambers that represent gas spaces in addition to the spaces in the interiors of the branch conduits and provide gas to the gas discharge pores. Plural gas-injection passages are present in the diffuser at longitudinally spaced positions along the branch conduits, extend through the wall means of the branch conduits, provide communication between the interiors of the branch conduits and the gas chambers, and a plurality of gas chambers are each served by a plurality of said passages spaced along the lengths of those chambers.

In such a system, the liquid may be wastewater, which may contain suspended solids, the gas may be oxygen-containing gas and the tank may be an aeration tank of a wastewater treatment plant.

The system preferably comprises a plurality of branch conduits connected to one or more manifolds, with a plurality of said branch conduits each including a plurality of said diffusers. The longitudinally-extending gas-confining wall means may represent portions of the branch conduits of the pipe grid.

Yet another embodiment of the system may comprise longitudinal membrane edge-sealing and securing members extending lengthwise of said support members and membranes and membrane end-sealing and securing members positioned at the ends of the membranes, at least portions of said end-sealing and securing members bearing against said edge-sealing and securing members.

In another optional but preferred embodiment, the end-sealing and securing members bear inwardly against said edge-sealing and securing members.

In still another optional but preferred embodiment, the end-sealing and securing members bear downwardly against said edge-sealing and securing members.

Other embodiments, described below, are believed to represent additional inventions.

ADVANTAGES

It is an advantage of certain embodiments of the invention that strip diffusers can be formed with bodies that are initially formed separately from conduits on which they will eventually depend for their supply of treatment gas. An advantage of this is that when the body and conduit are united, for example in the body fabricator's plant, the conduit strengthens the body. However, it is possible to form these bodies in such a way that they will be compatible with any of many forms of plastic conduit of differing size and resin type that are reasonably priced, widely available, staple articles of commerce. Thus, another advantage of bodies formed separately from conduit is that it allows diffuser manufacturers to supply, and also allows the contractors who erect diffuser grid systems to purchase, bodies without pipes that can be mated by the contractors with locally obtained pipes. This reduces the physical volume of those parts which must be shipped from the plant of the diffuser manufacturer to the installation site, which can involve domestic or international shipment over great distances, thus reducing shipping costs. Also, the prices charged to the contractors need not include the cost of the pipes, and the contractors may thus be able to reap a larger share of the profit on overall system costs, to the extent these are based on the value incorporated in the installation through acquisition of pipe and through assembly of bodies to pipes.

However, the invention also includes other unique embodiments of strip diffusers. In some of these embodiments, a gas supply conduit is an integral part of the diffuser. This eliminates a potential source of labor at the diffuser manufacturer's plant or the installation site, in that diffuser bodies need not be secured to the gas supply conduits at either location. Solvent welding, a method favored in practice for securing plastic parts at installation sites, has some disadvantages which are thus avoided. The cost of and need for either solvent welding or sonic welding, which are suitable methods for uniting the separately formed pipes and bodies of some embodiments of the invention in manufacturing facilities, are avoided when pipes and bodies are integrally formed.

Unlike certain prior art strip diffusers, the integral-pipe and separate-pipe embodiments of the invention respectively provide, as made at the factory, or as installed, a confined gas flow path which is separate from that in the gas chamber immediately beneath the membrane, a path which is divided from the chamber which includes the gas influent surface of the membrane. Where there are plural, e.g., two or more, gas-transmitting connections between the confined flow path and the chamber, it is possible for the chamber and membrane to be fairly long and yet still receive and discharge treatment gas throughout most and preferably all of the length of the membrane. This can potentially reduce manufacturing and installation cost as compared with state-of-the-art membrane strip and membrane disk diffusers.

Let us consider for a moment plant designs involving plural strings of diffusers, which strings are connected to a common manifold and in which at least a portion and preferably a majority of the strings contain plural strip diffusers, such as in designs corresponding in principle to that of FIG. 6. The presence in individual diffusers of plural gas-transmitting connections between their gas chambers and the confined flow paths within their integrally- or separately-formed gas supply conduits can be particularly beneficial in promoting discharge of treatment gas along most or all of the lengths of the membranes in the diffuser strings.

Moreover, in certain particularly preferred embodiments of the invention there are gas-transmitting connections between the confined flow path and the chamber that include orifices of restricted flow cross-section that are arranged at spaced intervals along the diffuser's length. If sufficiently restricted, these orifices can afford an opportunity for enhanced uniformity of distribution of treatment gas along the length of the chamber. This may in turn provide a resulting possibility of enhanced diffuser efficiency over certain prior art disk and/or strip diffusers. This potential benefit may be of particular value in plants having plural strings containing plural diffusers, including plural strings of this type fed from a common manifold, as discussed in the preceding paragraph and illustrated in FIG. 6.

Whether the conduit is formed separately from or integrally with the membrane body, the pipe can contribute considerable mechanical strength and stability to the resultant combination. Some prior art strip diffuser systems include gas supply conduits that run perpendicular to the lengths of the bodies. As compared to these, the preferred embodiments of the present invention have gas supply conduits, whether separately formed or integral conduits, the longest dimensions of which run in the same general direction as the lengths of the bodies and membranes. The extent to which these preferred diffusers of the present invention extend laterally from the locus at which the bodies are connected with the gas supply conduits need not be so great as in the perpendicularly-oriented diffusers. As a consequence, these preferred embodiments, at their extreme lateral portions, do not represent nearly as long lever arms by which destructive forces may be imposed on the connections between conduits and their separately formed or integral bodies, whether imposed, e.g., by currents within an operating wastewater treatment tank or inadvertently by persons working in the tank.

Bodies and membranes of disk diffuser systems are conventionally made by batch-type forming operations, such as die molding. On the other hand, the present invention affords an opportunity for making membranes and/or bodies, and optionally integral gas supply pipes, by continuous methods, for example any of the various types of extrusion, with attendant production economies.

Diffuser systems constructed according to the invention can, in certain embodiments, be easily assembled in factories for condensed shipment. Systems according to the invention can also offer the advantage of easy and quick installation in wastewater treatment plants and other facilities.

The invention lends itself well to installation of strip diffusers in series comprising two or more diffusers installed in end-to-end relationship and to the creation of modular product lines.

When products according to the invention are formed by extrusion, it then becomes quite convenient to custom-design aeration systems to variable lengths.

Strip diffusers according to the invention, at least in their most preferred embodiments, may offer levels of oxygen transfer efficiency that are high enough, when coupled with their potentially high gas discharge area per unit floor area, to provide a lower, and thus better, cost to benefit ratio than membrane disk diffusers.

All embodiments of the invention will not necessarily have all of the above advantages, nor the same combinations of advantage. Moreover, users, manufacturers and other persons skilled in the art may identify, through the present disclosure and/or through experience with the invention, some embodiments that inherently include advantages not discussed above.

BRIEF DESCRIPTION OF THE DRAWINGS

FIGS. 1–5 disclose prior art.

FIG. 1 is a view, partly in section, of a known disk diffuser.

FIG. 2 is an exploded view, in perspective, of the diffuser of FIG. 1.

FIG. 3 is a schematic, longitudinal cross-section of a wastewater treatment tank containing many diffusers like that of FIGS. 1 and 2.

FIG. 4 is a schematic plan view of the tank of FIG. 3.

FIG. 5 is a schematic plan view of a series of three tanks similar to that of FIGS. 3 and 4, arranged for sequential flow of wastewater and having progressively diminishing diffuser density.

FIG. 6 is a schematic plan view of a wastewater treatment tank containing strip diffusers in accordance with the invention.

FIG. 7 is an enlarged, partial top view of a portion of one of the strip diffusers of FIG. 6.

FIG. 9 is a perspective view of the body of the diffuser of FIG. 8.

FIG. 10 is an enlarged portion of FIG. 9, in transverse cross-section, also showing the diffuser membrane and a filling strip which is part of the edge securing and sealing arrangement of the diffuser.

FIG. 11 is a partial transverse cross-sectional view of a modified form of the diffuser and edge securing and sealing arrangement of FIG. 10.

FIG. 11(*a*) is a transverse cross-section of the filling strip of FIGS. 10 and 11 in an uncompressed condition.

FIG. 12 discloses yet another edge securing and sealing arrangement in transverse cross-section.

FIG. 12(*a*) is a modified version of the edge securing and sealing arrangement of FIG. 12 to which a low friction member has been added.

FIG. 13 is a transverse cross-section of another form of strip diffuser according to the invention.

FIG. 14 is a side view, foreshortened, of the body of yet another form of strip diffuser.

FIG. 15 is a perspective view of the strip diffuser body of FIG. 14.

FIG. 16 is a sectional view taken on section line 16—16 of FIG. 15.

FIG. 17 is an exploded transverse cross-section of the diffuser body of FIGS. 14–15, also showing a diffuser supporting rack, a membrane, and an end clamping and sealing arrangement.

FIG. 18 is a transverse cross-section of a portion of the diffuser of FIG. 17 showing an edge securing and sealing arrangement therefor.

FIG. 19 is a perspective view of an array of diffusers of the type illustrated in FIGS. 17–18.

FIG. 20 is a foreshortened side view of a series of diffusers of the kind shown in FIGS. 17–18 or 17–19, connected end-to-end in series.

FIG. 21 is an exploded end view of a modification of the diffuser of FIGS. 17–18 or 17–19, showing an alternative form of end clamping and sealing arrangement FIG. 22 is a sectional view taken along section line 22—22 of FIG. 21.

FIG. 23 is a partial top view of the clamp of FIG. 21 between reference lines 23—23 of FIG. 21.

FIG. 24 is a perspective view and partial section of a modified form of a diffuser body according to FIGS. 17–18 or 17–19 having gas passageways arranged in a channel.

FIG. 25 is a perspective view and partial section of a yet another modified form of a diffuser body similar to that of FIG. 24 but having a channel with a different cross-section.

FIG. 30 is a partial transverse cross-section of a modified version of the diffuser of FIG. 26 having downwardly extending skirts at the sides of its support member.

FIG. 31 is an end view of a diffuser similar to that of FIG. 30 in which the skirts are inclined inwardly, and also shows an end clamping and sealing arrangement and supporting rack.

FIG. 32 is a partial view, in perspective, of the rack of FIG. 31.

FIG. 33 is a further modification to the diffuser of FIG. 30 in which the skirts support inwardly directed flanges.

FIG. 34 is similar to FIG. 30, except that phantom lines show the membrane in inflated condition.

FIG. 35 is a half transverse cross-section of yet another modification of the diffuser of FIGS. 17–18 or 17–19 showing an alternative edge securing and sealing arrangement.

FIG. 36 is a half transverse cross-section of still another modification of the diffuser of FIGS. 17–18 or 17–19 showing another alternative edge securing and sealing arrangement.

FIG. 37 is a half transverse cross-section of an alternative form of diffuser according to the invention with a different form of edge securing and sealing arrangement involving a "T"-shaped insert.

FIG. 38 is a half transverse cross-section of a diffuser similar to that of FIG. 37 having another form of edge securing and sealing arrangement with membrane protrusions and complementary grooves on the membrane body that are of dovetail cross-section.

FIG. 43 is a perspective view of yet another form of diffuser body in accordance with the invention.

FIG. 44 is a view, in perspective, of an end fixture that can mate with the diffuser body of FIG. 43.

FIG. 45 is a foreshortened side view of an assembly of the body of FIG. 43 mated with two of the end fixtures of FIG. 44.

FIG. 46 is a partial side view of the assembly of FIG. 45 to which a membrane and an end clamping and sealing arrangement have been added.

FIG. 47 is a foreshortened, exploded half transverse cross-section of a diffuser with still other forms of body and membrane and another edge securing and sealing arrangement.

FIG. 48 is a partial, exploded top view of the diffuser of FIG. 47 and an end fitting that can be mated with the diffuser body.

FIG. 49 is a partial top view, assembled, of the parts shown in FIG. 48, and yet another end securing and sealing arrangement.

FIG. 50 is yet another embodiment of a strip diffuser according to the invention.

FIG. 51 is a transverse cross-section of the diffuser of FIG. 50 taken on section line 51—51 of FIG. 50, along with a supporting arrangement for that diffuser and for a second diffuser (only a portion of which is shown) to form an array of multiple diffusers.

FIG. 52 is an exploded view, in perspective, of an end fixture of the diffuser of FIG. 50.

FIG. 53 is a partial perspective view of a membrane useful in the diffuser FIG. 50, a portion of the membrane being broken out to show an illustrative method for its fabrication.

FIG. 58 is a top view of the strap of FIG. 57.

FIG. 59 is a side view of the strap of FIG. 57.

FIG. 60 is a bottom view of the strap of FIG. 57.

FIG. 61 is a sectional view taken along section line 61—61 of FIG. 60.

VARIOUS AND PREFERRED EMBODIMENTS

Figures 1, 2:
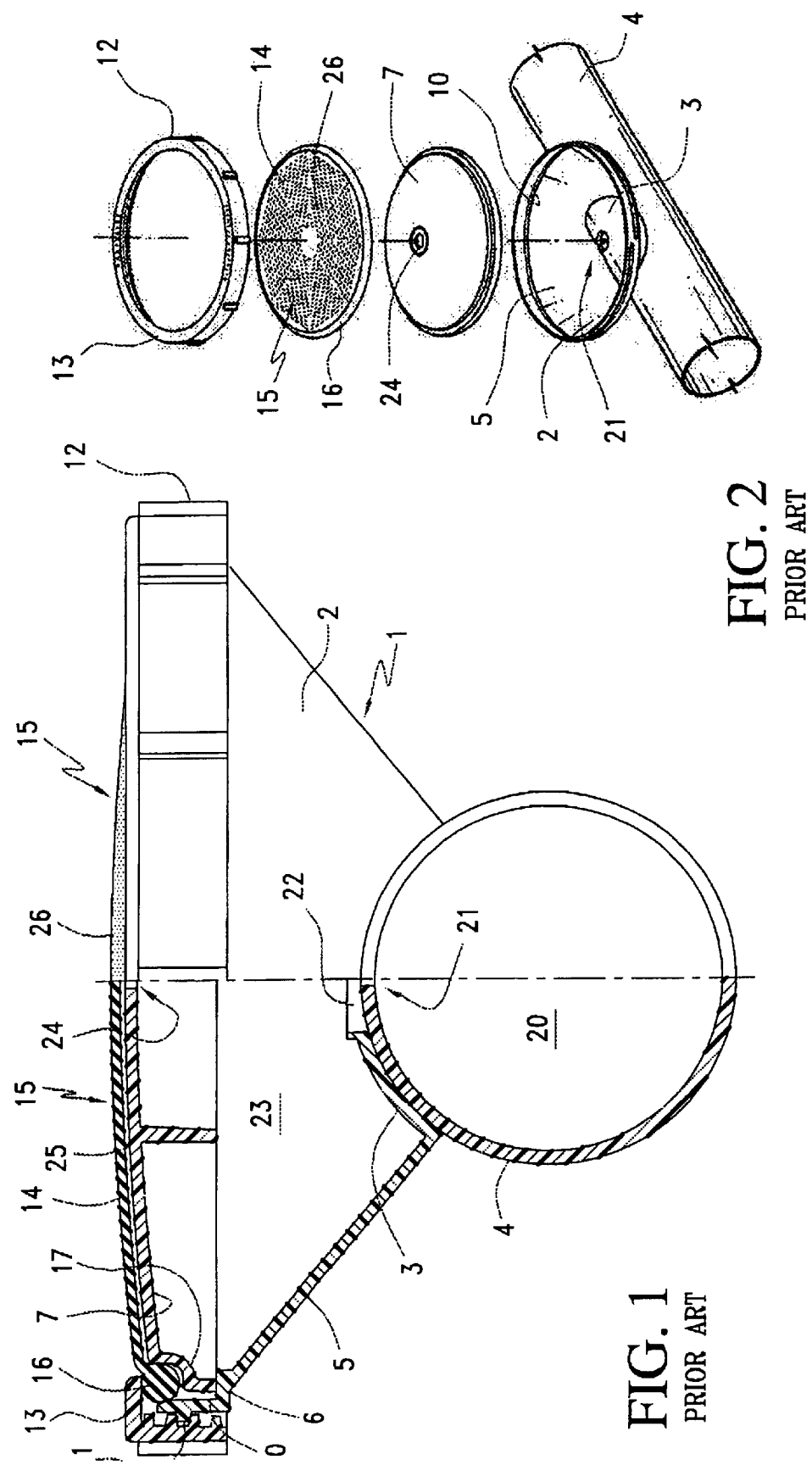

Where the description and claims herein refer to apparatus or process elements in the singular, this is also intended to include the plural, where such is feasible in light of the nature of those elements. Subject to the same condition, mention of such elements in the plural is intended to include the singular.

The invention is useful in diffusion systems, i.e., systems intended to discharge fine bubbles of gas, and possibly some added liquids and/or vapors, into bodies of liquids, which bodies may include solids or other gases, through membrane diffusers.

Thus, the invention is applicable to any process requiring introduction of fine bubbles of gas into liquid, for example, simple discharging of gas into liquid for any purpose which does not necessarily involve chemical reaction between the gas and liquid, for example gas stripping, gas dissolving, floatation processes, prevention of freezing and fish farming. This invention may also be used in charging gas into liquid in support of any kind of chemical reaction with and/or within the liquid, for example neutralizing, acidifying, basifying, killing bacteria, e.g., in potable water treatment and/or supporting bacterial action, for example, in fermentation (e.g., yeast production) and in biological wastewater treatment of any kind, e.g., phosphorous removal, nitrogen removal, aerobic and/or anaerobic digestion of suspended or dissolved waste, especially by the activated sludge process.

A particularly preferred embodiment is wastewater treatment processes involving, at least in part, aeration, in which gas is discharged into wastewater containing suspended and dissolved solids and in which at least a portion of the gas so discharged is oxygen-containing gas such as air.

The liquid under treatment may include any process material that requires such treatment. Among these are aqueous liquids such as for example wastewater, potable water, pickle liquor and other liquids. The solids that may be present in the liquid involved in the gas treatment may include for example ores, silt and other sediments, bacteria and other living creatures. Virtually any gas may be discharged through the diffusers and/or may be present in the liquid receiving gas from the diffusers. These include oxygen-containing/yielding gases such as oxygen, air, oxygen-enriched air and ozone, and other "gases" (including vapors) such as chlorine, nitrogen, steam and other forms of water vapor.

According to one embodiment, the gas discharged from the diffusers may contain a mist of entrained tiny droplets or vapors. Such droplets or vapors may for example be composed of a normally liquid material, such as alcohols, other solvents and/or hydrochloric, acetic or formic acid, and optionally may be present for the purpose of alleviating or preventing clogging of the diffusers.

Diffusion systems include among their basic components any suitable gas source to supply gas to be discharged from the diffusers. This may for example include a tank, a gas generator or the atmosphere.

A gas propulsion system, which may be of any type, and which induces the gas to flow under pressure toward the diffusers from which it is discharged, is in most cases also provided. This may for example include positive displacement compressors or, preferably, centrifugal blowers.

Where needed, there will be gas purification equipment, such as gas supply filters (e.g., inlet gas filters to clean atmospheric air entering blowers) and/or outlet filters (e.g., oil filters at compressor outlets to catch oil thrown off by compressors).

Such systems will ordinarily include a liquid impound of any type, for example, a natural body of water such as a lake or pond. More typically, the water impound will be man-made, such as a lagoon, e.g., with one or more floating grids each comprising multiple diffusers, which grids may be anchored and/or removable. In most instances, and preferably, these impounds will be tanks of metal or, preferably, of concrete.

Gas will be conducted from the gas propulsion system to the liquid impound through delivery piping. Such piping usually includes above- or below-ground yard piping, that conveys gas from the gas propulsion system to a tank. Yard piping may be of synthetic resin but preferably of stainless steel. The delivery piping also ordinarily includes downcomers, which may be of synthetic resin but are preferably of stainless steel, and convey gas from the yard piping down through the liquid surface to a submerged grid system.

Grid systems will ordinarily include manifolds, of synthetic resin or stainless steel from which emanate diffuser gas supply conduits. While the manifolds and gas supply conduits may be of stainless steel, they are preferably of synthetic resin. A preferred form of gas supply conduit is formed of rigid PVC and complies with the properties of ASTM D3915, cell 124524.

A particularly preferred embodiment is floor-mounted grid diffuser systems, in which stands of metal (such as stainless steel) or other material are attached to the floor of a tank and support synthetic resin manifolds and supply conduits horizontally a short distance above the floor with the gas supply conduits running generally perpendicular to the manifolds and generally perpendicular to one another and to the liquid surface. However, the invention may be employed in virtually any other kind of arrangement, for example swinging rack-mounted diffuser systems, in which a diffuser-supporting rack may be lifted from the impound, usually a tank, for servicing of the diffusers, or, by way of further illustration, diffuser systems in which at least portions of the gas supply conduit may be fixedly embedded in the floor of a tank.

As is typical in diffuser systems, whether of the floor-mounted type or otherwise, diffusers for discharging gas bubbles into the liquid in the impound are associated with the gas supply conduits and are distributed through at least portions of the impound. In common with known strip diffusers, the diffusers of the present invention comprise structural members, which may be referred to as the body of the diffuser. The bodies typically include elongated membrane support members, and means to receive gas into the diffusers and to deliver the gas to a gas influent surface of the membrane. In the present invention, at least portions of the gas supply conduits and at least portions of the diffuser bodies are associated with one another in one or more novel ways.

One of the novel features of the invention is the directional relation of membrane supports to the supply conduits. Their long dimensions extend in the same general direction. Throughout a substantial portion of their respective lengths, the membrane supports and the supply conduits have a connective relation such that the membrane supports either may be integral with the supply conduits or may be formed separately from but are joined with the supply conduits in any suitable manner. The number relation of membrane support members to supply conduits may be, respectively, one to one, plural to single, single to plural and plural to plural. One may provide any desired spatial relation between the membrane supports and the supply conduits. For example, the supports may be mounted above, e.g., on the crown of the conduit, and/or below, e.g., at base of the conduit, and/or to the side (e.g., extending laterally), e.g., cantilevered from the conduit.

Bodies may be designed with a wide variety of overall shapes, as viewed in transverse cross-section. Extrusion of the body affords considerable freedom in selecting cross-sections. Preferably, a single membrane support member is arranged symmetrically relative to the central axis of, and above, an integral gas supply conduit or attachment member, e.g., a saddle arrangement, to which a conduit may be attached after the body is formed. In certain embodiments of the above type, the space to either side of the conduit or attachment member is open, or, preferably, is partially closed by bracing webs extending between the conduit or attachment member and outward portions of the support, e.g., near its longitudinal edges.

However, in other embodiments, the support is the upper surface of a box cross-section. In one form, the so-called "covered pan" design, the "box" has a completely open interior, and the entire interior of the body is the gas supply conduit. Yet other types of "box" designs have internal bracing. In some cases the bracing, along with adjacent portions of the support and the bottom of the box, define a gas passage representing a gas supply conduit; in other cases the conduit is a member. In these embodiments, the conduit may be integrally formed with but have a distinctly separate identity from the bracing.

Non-symmetrical designs are possible. For example, the membrane support member, viewed as specified above, is not arranged symmetrically relative to the central axis of the gas supply conduit, e.g., "side-saddle" arrangements in which the support member is partially or fully offset to the side of the conduit. Designs with plural supports and membranes mounted on a single gas supply conduit, e.g., two or three supports and membranes mounted in a balanced array on a single gas supply conduit may be used. Designs with plural conduits and plural sets of supports and membranes are also contemplated.

In any of the embodiments of the invention, the membrane support member may take a wide variety of forms. As viewed in transverse cross-section, it may be "monolithic", signifying that it is formed in a single solid layer. Optionally, it may comprise spaced upper and lower layers with "bracing" between them of truss, honey-comb or other configuration. These layers may vary in thickness and may include reinforcing fill between them to enhance their rigidity.

That portion of the support member surface which actually supports the membrane may have different shapes, as viewed in transverse cross-section. In a given support member, such portion may be substantially planar or substantially arcuate, or may include sections of planar and arcuate character. The surface may be relatively plain or complex. For example, protrusions, grooves, channels or other convex or concave surface features may be present for any useful purpose, e.g., for assisting in sealing, and/or securing, the membrane to the support. For the same or other purpose(s), these surface features may be shaped to engage features of complementary shape on the membrane.

Preferably, the membrane-supporting surface portion of the membrane support member has a substantially arcuate surface with any suitable radius of curvature. This arcuate surface may be of variable or constant radius. Preferably it has one or more long radius or radii throughout at least about 70%, more preferably at least about 80%, still more preferably at least about 90% and most preferably substantially all of the transverse distance interval over which the membrane is supported when not in operation. Within this major part, the radius/radii is/are preferably at least about 8, more preferably at least about 10, still more preferably at least about 12, and, in a particularly preferred embodiment, approximately 18 inches.

At least one and possibly more potential benefits can flow from having an arcuate membrane support. When the support has an arcuate upper surface, it can facilitate better securing/sealing of the membrane. A support member with an arcuate overall shape, increases the dimension of that member along its "y" axis, thus increasing the stiffness or longitudinal axis bending modulus of the part. This in turn improves the longitudinal bending resistance and strength of the diffuser body as a whole.

Other components may be included in or appended to the membrane support members for any suitable purpose. For example, legs or skirts may depend from one or more locations, such as at the longitudinal edges of the support member, to strengthen the body and/or assist in securing or sealing the membrane to the body. Such legs or skirts may be oriented substantially vertically or may be inclined inwardly, i.e., toward a central axis of the body, or outwardly, i.e., away from such axis. Skirts or extensions of them may also be turned inward and substantially horizontal.

The angle between the membrane contacting surfaces of the skirts and the adjoining portions of the membrane support upper surface is preferably a downward angle of at least about 30 degrees, more preferably at least about 45 degrees and still more preferably at least about 60 degrees.

The skirts and/or the extensions thereof may also include surface features for assisting in sealing, and/or securing the membrane to them. For the same or other purpose(s), these surface features may be shaped to engage features of complementary shape on the membrane.

If the membrane will extend in the above-described manner from an upper surface of the support member, which could be substantially horizontal, onto a skirt or other side portion, which could be substantially vertical, it is preferred that there be a transition surface extending from the upper surface to the side surface and extending longitudinally along the sides of the support surface. As viewed in transverse cross-section, this transition surface may be smooth, e.g. arcuate, or stepped, e.g., polygonal, with or without ridges or other surface features such as could be used to assist in sealing. Preferably, both the support surface and transition surfaces are arcuate. Also, the transition surface radius is preferably a fraction of the support surface radius, e.g., about ¼ or less, preferably about ⅐ or less and still more preferably about 1/10 or less of the radius of the adjacent portions of the upper surface of the support member.

Still other body configurations and components, not illustrated or discussed herein, may be employed without departing from the spirit of the invention.

The diffuser body may be made with or without reinforcement, e.g., oriented or unoriented fibers, mesh or cloth embedded in a synthetic resin from which the body is formed. Diffuser bodies useful in the invention may be made by any suitable process, such as lay-up, spray-up, injection molding and extrusion processes. It is an advantage of the invention that the above-described directional relation of the gas supply conduit and the membrane support member renders these bodies amenable to formation by extrusion, for example, conventional extrusion, pultrusion, e.g., in the form of PFG (pultruded "fiberglass") and co-extrusion (e.g., as in extrusion in the same part from plural materials forming an outer high strength layer and a lower strength, less costly core).

Any synthetic resin providing appropriate strength and durability may be used to form the diffuser body, for example PVC (polyvinylchloride, preferred for extrusion), polyester (preferred for pultrusion), ABS (acrylonitrile-butadiene-styrene), ABS with PVC skin and ABS with ABS skin. Some illustrative but not limiting properties for PFG resins include: flexural modulus, $2-2.8 \times 10^6$ psi; tensile strength (1,200,000+ psi); and temperature resistance (heat deflection), >350 F. Other resins may be used. The resins may contain a variety of additives, such as fillers (e.g., $TiO_2$), plasticizers, free-radical inhibitors and UV stabilizers.

Extrusion represents a particularly convenient way of forming certain combinations of diffuser body elements useful in virtually any type of strip diffuser arrangement but particularly useful in above-floor devices. More particularly, extrusion facilitates providing in a strip diffuser a longitudinal gas supply conduit that is at least in part and preferably substantially entirely integral with the diffuser body.

Also facilitated is furnishing the combination of an elongated gas supply conduit and an elongated membrane support member, which gas supply conduit is integral with the support member over at least about half, preferably at least about ¾ and more preferably at least approximately the entire length of the support. Each of these ranges includes the possibility that part of the support could be cut away to render the conduit somewhat longer than the support and/or other body components at one or both ends of the body. Most preferably, the conduit and support are the same length.

Extrusion also facilitates furnishing an elongated gas chamber between an elongated diffuser membrane and an elongated support member of a diffuser body, which chamber overlies a diffuser body segment having a gas supply conduit within it that runs at least about half, preferably at least about ¾, more preferably approximately the entire length of the chamber. Thus, it is convenient to form by extrusion the body of a diffuser in which there will be a gas chamber having a length similar to that of a gas conduit, e.g., gas supply conduit, in the diffuser body.

When forming a diffuser by extrusion, it is unnecessary to have a gas supply conduit separate from the diffuser within a distance interval traversed by the body segment, thus reducing or eliminating the need for contractors to acquire pipe in local markets.

With extrusion, the gas chamber and the gas supply conduit may be elongated in generally the same direction.

In a diffuser having an extruded body, the gas chamber may extend in an uninterrupted fashion throughout a distance corresponding to at least a major portion of the length of the gas conduit. However, the length of the chamber may exceed the length of the gas conduit or vice versa, for example when a portion of the length of either is cut away after extrusion.

Extrusion is also a convenient way of forming diffuser bodies which include a plurality of gas supply conduits for each membrane support member. If necessary or desirable, two or more of these conduits may have their own sets of gas injection passages communicating with the gas chamber of a diffuser. Plural gas supply conduits afford opportunities for supplying a membrane with different gases, vapors or liquids, whether simultaneously or at different times, through the several conduits. For example, one such conduit could supply aeration process gas continuously or intermittently to the gas chamber, while another conduit in the same diffuser could supply cleaning fluid to the same chamber, continuously or intermittently, for cleaning the membrane. Or the several conduits may each be used to supply the same gas, or the same mixture of gas or gases with entrained liquid(s) and/or vapor(s), to the same membrane at the same or different times. Moreover, one or more of the plural conduits may be flooded to at least partly counter any buoyancy in the diffuser.

Moreover, extrusion is also a convenient way of forming diffuser bodies which do not include gas conduits, and which, after formation, are attached to or otherwise connected with gas supply conduit, as will be illustrated herein. A number of examples are described herein with the aid of the accompanying drawings.

Bodies of diffusers according to the invention also include gas injection passages of any suitable shape or form, extending from the interior of the gas supply conduit through the membrane support member. They may, but need not be, located at longitudinally spaced intervals along the gas supply conduit; for example, they may be located on the horizontal centerline of the support, and/or they may be located along one or more lines other than the centerline, whether extending parallel or at one or more angles to the centerline, or on no line, e.g., they may be randomly distributed.

These passages transmit gas from the interior of the gas supply conduit to the gas chamber. Injection passages may have flow cross-sections that are of any suitable shape, for example, round, oval or rectangular, and may be fixed or variable in shape and/or size. If fixed, these passages will ordinarily be formed by hot or cold punching or drilling after extrusion of the structure of the body. If variable, the passages may be provided with variable-opening valves, such as flappers or elastomeric "duck-bills" at their outlets.

Where the conduit and support are non-integral, the gas injection passages may traverse in some embodiments both a wall of the conduit and a wall constituting the support. Portions of the passages passing through these two different walls may have widely differing flow cross-sections. Where the conduit and wall are integral, and where parts of them, when viewed in transverse cross-section, are defined by a single, common wall segment, these passages may traverse only a single wall segment rather than two.

In a particularly preferred embodiment, the gas-injection passages are of sufficiently small flow cross-section to generate, during operation of the diffuser, sufficient pressure drop across the passages between the gas supply conduit and the chamber to contribute measurably to enhanced or substantial uniformity of distribution of gas flow among the respective passages, thus constituting flow regulating orifices. In general, the more uniformly gas flow is distributed among the pores of a membrane strip diffuser by gas injection passages distributed at spaced intervals over at least a major portion of the length of the gas chamber, and preferably by passages of sufficiently small flow cross-section to effect a high degree of uniformity of flow distribution among such passages and among the pores, the more efficient the transfer of gas to the liquid.

Optionally, the body may include one or more channels formed in the membrane-supporting surface of the membrane support member for assisting in startup of the diffuser when the membrane is collapsed against the support under a hydrostatic head. When such a channel is provided, it is positioned so that gas injection passages open into it. The channel may be of any suitable transverse cross-section, such as rectangular or arcuate, and may be formed in any suitable manner, such as by being part of the shape of the upper face of the support when the latter was originally formed, e.g., extruded, or by being milled into that surface after initial formation of the body. It is recommended that the channel be of sufficient width so that gas delivered by the injection passages through the channel to the underside of the membrane will have access to a sufficient amount of membrane area so that pressure exerted on the underside of the membrane will generate enough force on the membrane to lift it free from its non-operating position on the support, against its own elasticity and the hydrostatic head of overlying liquid. Provision of such channels may also facilitate, e.g., provide space within which to install at the outlets of the passages, check valves that, with the membrane in non-operating position, can close in the absence of gas flow and can also open upon commencement or restoration of gas flow.

The bodies may be of any desired width, consistent with having a length to width ratio consistent with strip diffusers. For example, widths of at least about four or at least about six inches are contemplated, as are of up to about ten or about twelve inches or more. Generally, it is considered good practice to select widths at which the membrane has little if any tendency toward "bagging", i.e., failing to elastically retract sufficiently in non-operating condition to lie smoothly, without humps, against the membrane support member upper surface.

One of the major advantages of forming diffuser bodies by extrusion is that they may be easily and economically formed in any desirable length.

Preferably, the bodies are made in lengths of at least about 6, or more preferably at least about 8 or still more preferably at least about 10 feet, and preferably in lengths of up to about 16, or more preferably up to about 20, or still more preferably up to about 24 feet, or longer.

The elongated membranes are basically composed of rubbery solid polymeric material, although they may also contain organic or inorganic solids, e.g., carbon black, and liquids, e.g., plasticizers. Such polymeric materials may include polymers of natural or synthetic origin and blends thereof. Homo-, co-, block- and graft-polymers having synthetic and/or natural components are contemplated. Among the various types of synthetic polymers, which are preferred, are elastomers selected from among the EPDMs (ethylenepropylene-diene, preferred), silicone rubbers, thermoplastics of the Santoprene (™) type and urethanes, Buna-N, neoprene, and nitriles. These materials are described as "rubbery", in that, whether natural and/or synthetic, they have the property of elastic recovery after deformation, e.g., elongation under stress, and the term rubbery is thus intended to include, for example, thermoset and/or thermoplastic elastomers.

Elastomeric membranes for use in the invention may be molded, but are preferably extruded as a single layer which may include but preferably is free of reinforcing fibers. Optionally, membranes may comprise molded or extruded layers of rubbery material with or without fiber reinforcement within or between the layers, for example woven or non-woven material, e.g., cloth or netting, containing natural and/or synthetic fiber, such as cotton, polyester, polypropylene, glass or Kevlar (™) fiber.

Surface features may be provided on the membranes to assist in securing and/or sealing them to the diffuser bodies, as will be described in greater detail below. Such features may be applied during initial molding or extrusion, such as by extrusion onto the edge of a running length of membrane stock, or may applied after initial molding or extrusion, such as by gluing onto the edge of previously molded membrane stock, or may be applied in other ways.

While it is possible for there to be some variation in the shape of the membranes, as viewed in plan view, strip diffuser membranes will usually have straight, parallel sides. The ends of the membranes may have varying shapes, such as semi-circular and squared-off ends.

Preferably, the membranes have a length to width ratio of at least about 4, more preferably at least about 6, still more preferably at least about 8, and most preferably at least about 10. Lengths in the range of about 4 to about 40, more preferably about 4 to about 20, still more preferably about 5 to about 15, and most preferably about 5 to about 10 feet are contemplated. Widths in the range of about 4 to about 12, more preferably about 6 to about 12 and more preferably about 8 to about 10 inches, are contemplated. Their thickness is preferably in the range of about 0.0625 to about 0.125, more preferably about 0.07 to about 0.11 and still more preferably about 0.08 to about 0.1 inches. However, it should be understood that these dimensions are merely illustrative. Also, the thickness of a given membrane may vary from one location to another, for example, to enhance the uniformity with which gas is discharged from its pores, or to strengthen a portion of the membrane. For example, the membrane thickness may smoothly increase from about 0.8 inches at its margins to about 0.1 inches along its centerline.

Through basic polymer design, selection of processing steps and conditions and formulation with selected additives, persons skilled in the art are able to adjust the properties of these polymers with respect to resilience, e.g., tensile modulus, durometer, creep, cut growth, additive retention stability, e.g., resistance to leaching out of plasticizers or other components, chemical resistance to oxygen, ozone or other chemicals as needed and other properties.

One EPDM composition for the membranes of the present invention is an extrusion mix composed, by weight, of about 50% Uniroyal EPSYN 2506 thermosetting EPDM polymer, about 25% of N774 medium particle size carbon black filler, about 15% of SUNPAR 2280 plasticizer oil which is of high molecular weight to resist leaching out, and about 10% of a conventional curing package, including for example peroxide- or sulfur-based curatives, all of which are mixed together in a screw pump mixer.

After extrusion, the membrane may be cured in any conventional way, such as in an oven at, e.g., about 350° F., in a salt bath at, e.g., about 390° F. or in a microwave oven at an oven temperature of, e.g., 200–250° F.

Illustrative, non-limiting examples of the properties of the cured elastomer include: modulus of elasticity, about 500 psi; tensile modulus, about 1200 psi per ASTM D 412; percent elongation at break, about 350% per ASTM D 412; ozone resistance per Test A of ASTM D 1171; a Durometer of about 58; and a specific gravity of about 1.25 or less.

Another extrudable EPDM rubber, useful in membranes of the present invention, is EPDM Rubber Product No. E70-6615-2B by Elbex Corp. of Kent, Ohio, U.S.A., which is believed to contain, by weight, 45–63% of elastomeric compound EPDM, 30–40% of reinforcing fillers, 5–10% of plasticizers and 2–5% of vulcanizing and miscellaneous other agents. This material is understood to have the following properties:

| PHYSICAL PROPERTIES | COLOR-BLACK ASTM TEST METHOD | TYPICAL VALUE |
|---|---|---|
| Durometer, Shore A | D2240 | 58 |
| Tensile, psi | D412 | 1550 psi |
| Elongation, % | D412 | 350% |
| Compression Set, % | D395 (22 Hrs @ 70° C.) | 25% |
| Heat Aging | D573 (70 Hrs @ 70° C.) | |
| Change In Hardness (Dur.) | | 61 (+3 pts) |
| Change in Tensile, % | | 1426 psi (−8%) |
| Change in Elongation, % | | 290% (−20%) |
| Ozone Resistance | D1149 (72 Hrs @ 50 pphm) | No Cracks |
| Water Resistance (Vol.) | D471 (70 Hrs @ 100° C.) | +1% |
| Low Temp. Brittleness | D2137 (−40° C.) | Pass |

SPECIFICATIONS: ASTM D2000 M4BA610, A13, B13, C12, EA14, F17
LOW OIL CONTENT: MAX. 12%
The above values were obtained on standard test slabs and buttons.

The membrane material, in sheet form, is punched to form pores through which the gas is discharged. These pores may be of any suitable shape as viewed in plan view, e.g., round, rectilinear (e.g., slits, which are preferred), star- or cross-shaped or other shape. Pores may be distributed over the gas discharge surface of the membrane in any suitable random or ordered pattern, which may include centrally or non-centrally located non-slitted areas, e.g., to perform a valving function to be described further below.

The pores may be formed in any manner, such as by cold-needle or hot-needle punching, the latter believed to be advantageous for use with Santoprene (™) elastomers and similar products and with urethane-based elastomers. However, it is believed that the best pore-forming methods for the preferred EPDM membranes are the punching of slits, e.g., a multitude of short, straight-line cuts with a steel rule die or, preferably, by shear-punching. As compared to round holes, slits appear to have advantages in respect to degree of clogging resistance, ability to change opening size as gas pressure changes, ability to close at least to some extent when there is no air flow, reproducibility of results in pore formation, ease of adjustment of DWP, ease of adjusting the punching pattern and economy of the punching operation.

Presently preferred perforation practice includes shear-punching slits that are spaced apart longitudinally from one another, end to end, along rows. These rows are multiple straight lines that are parallel to one another and to the long dimension of the membrane, are laterally spaced from one another and are distributed across the width of the membrane. The slit length and longitudinal end to end spacing are preferably 0.03 inch and 0.05 inch respectively. Lateral spacing between the rows is preferably about 0.15 inch. Slits in adjacent rows are staggered from one another. In a preferred illustrative and non-limiting example, the membrane is about 12" wide, has an unpunched area of uniform width of about one inch centered upon and extending along its centerline to act as a check-valve, and has, along each side of the unpunched area, punched areas with a uniform width of about 3½ inches, having slits therein that are positioned and sized as above described, and unpunched margins along its longitudinal edges that are each about 2 inches in width.

One may provide any suitable mechanical arrangement to secure and seal the membrane to the diffuser body at the ends of the membrane and along its longitudinal edges. Among the many arrangements that may be used in sealing the ends of membranes are various types of clamping devices of metal, rubber and/or plastic, such as clamping bars, clips, band clamps, screw tighteners, U-shaped clips and other types of clamps, which may have surface protrusions to assist in securing and/or maintaining a seal. Metallic clamping bars of U-shaped cross-section, clamped over the ends of the membrane are of particular interest. The ends may also be sealed with tape, adhesively bonded to the membrane and support member, and tape seals may be used in combination with any type of mechanical clamping member.

Many different arrangements may be used in sealing the longitudinal edges of the membranes to the diffuser bodies. These include various types of clamping devices of metal and/or plastic, such as clamping bars or flanges, U-shaped clips and other types of clamps, which may have surface protrusions to assist in securing and/or maintaining them in place. Metallic clips, crimped onto the edges of the membrane and the edge of the membrane support are of particular interest. As with the ends, the edges may also be sealed with tape, adhesively bonded to the membrane and support member, and tape seals may be used in combination with any type of mechanical clamping member.

These and a number of other exemplary embodiments of end and edge securing and sealing arrangements are disclosed in the drawings and in the text below, and many other arrangements may be used without departing from the spirit of the invention.

The membrane and portions of the body which are in contact may have configurations of any suitable type to cooperate effectively with each other in holding and sealing them together. For example, there may be complementary shaped grooves in the body that engage shaped members in the membrane. On the other hand, there may be protrusions on the body, with or without cooperating grooves in the membrane. These types of configurations may in certain circumstances be sufficient, in and of themselves, to secure and seal the membrane in place on the body, or may be utilized in combination with the end and edge securing and sealing arrangements discussed above.

Membranes may be held in grooves in the body with the aid of locking/jamming members integral with or separate from the membranes. Examples of integral locking members include compressible or non-compressible bulb-shaped protrusions, circular edge portions and dove-tail edge portions. Illustrative separate locking/jamming members include members of "T" shaped cross-section and of triangular, box/diamond, rounded or other shape, whether hollow or non-hollow, as well as rod-type inserts, strip-type inserts, e.g., with serrated face(s), and spline cords. Many other configurations may be used. It is preferred and, depending on the mechanical properties of the membrane, it may be essential, that the design of the locking/jamming members be free of sharp edges, corners or other potential stress risers.

Preferably the geometry of the body-membrane connection is such that gas pressure on the gas influent surface of the membrane and the resultant stretching of the membrane will increase the sealing pressure at the interface between the membrane and the body. Embodiments of this type are illustrated in the drawings and discussed below.

One or more of the above-described configurations may for example be used for securing and sealing along longitudinal edges of membranes. In certain embodiments, membranes may have protrusions formed in their gas influent surfaces at a substantial distance inward from the membrane edges. For example, consider a multi-bay diffuser. In it, one membrane extends longitudinally but also extends laterally over a body that includes a plurality of side-by-side bays, having connecting members to join them to one another along their edges but each having its own membrane support surface and gas supply conduit. For example, in a three bay diffuser of this type, one may provide a membrane securing/sealing groove in each of the two connecting members between the central bay and its two neighbors, and a groove along the outer edge of each of the two outer bays. The membrane of this embodiment will have four protrusions positioned in registry with the four grooves just described, and two of the protrusions will be located a substantial distance inward from the membrane edges. Such arrangements permit considerable width in a diffuser without excessive vertical deflection of the inflated membrane.

The invention may be employed in virtually any type of facility in which membrane diffusers are useful, especially in wastewater treatment plants.

Diffusers according to the invention may be connected to gas supply manifolds, and in series with one another, with any suitable form of connection, whether of a flexible or rigid nature. A flexible connection may, for example, be formed by providing a diffuser with an outwardly projecting barb fitting cemented, threaded or otherwise sealed into an end of the diffuser gas supply conduit, and by clamping a hose to the barb fitting. The other end of the hose may be clamped to another barb fitting on a manifold or on another diffuser. A rigid connection does not require a barb fitting. Instead, for example, a rigid nipple may be cemented, threaded or otherwise sealed into an end of a gas supply conduit. A similarly equipped manifold or second diffuser may be connected through any suitable form of coupling with the first-mentioned nipple, for example the type of coupling disclosed in U.S. Pat. No. 5,714,062 to W. Winkler and W. Roche. Where rigid connections are used, stands or other devices to support the diffusers may be secured to these connections.

Such diffusers are versatile in that they are useful in plants that vary widely in their ratios of aeration area to floor area ("packing factor"), which may, e.g. be >25% or >30% up to about 60%, and which vary widely in plant loading.

They may be used conveniently, as illustrated above, in plants where there are oxygen demand gradients and significant variations in flux rate.

Embodiments can be made with varying DWP (dynamic wet pressure), with good efficiency and with excellent uniformity of distribution of gas over the gas effluent surface of the membrane.

Moreover, the invention can be used in hybrid systems with the strip diffusers disclosed herein along with other types of diffusers and/or mixers in the same tank.

With the membrane support extending in the same direction as the gas supply conduit, that support derives strength from the conduit in a way not possible with prior art strip diffusers having membranes and membrane supports extending transversely to the conduit.

Among the diverse embodiments that are contemplated are those that have a DWP of about 10 to about 18 inches (at 2 SCFM) and exhibit up to about 0.5" membrane deflection @ a gas flow through the membrane in the range of about 1 to about 4 SCFM, and/or DWP of about 10 to about 18 inches which can sustain up to about 100 psi media tensile stress.

A number of specific embodiments will now be described with the aid of the accompanying drawings. These are intended to illustrate and not limit the scope of the appended claims.

DESCRIPTION OF PREFERRED EMBODIMENTS ILLUSTRATED IN THE FIGURES

FIGS. 6–13

Figure 8:
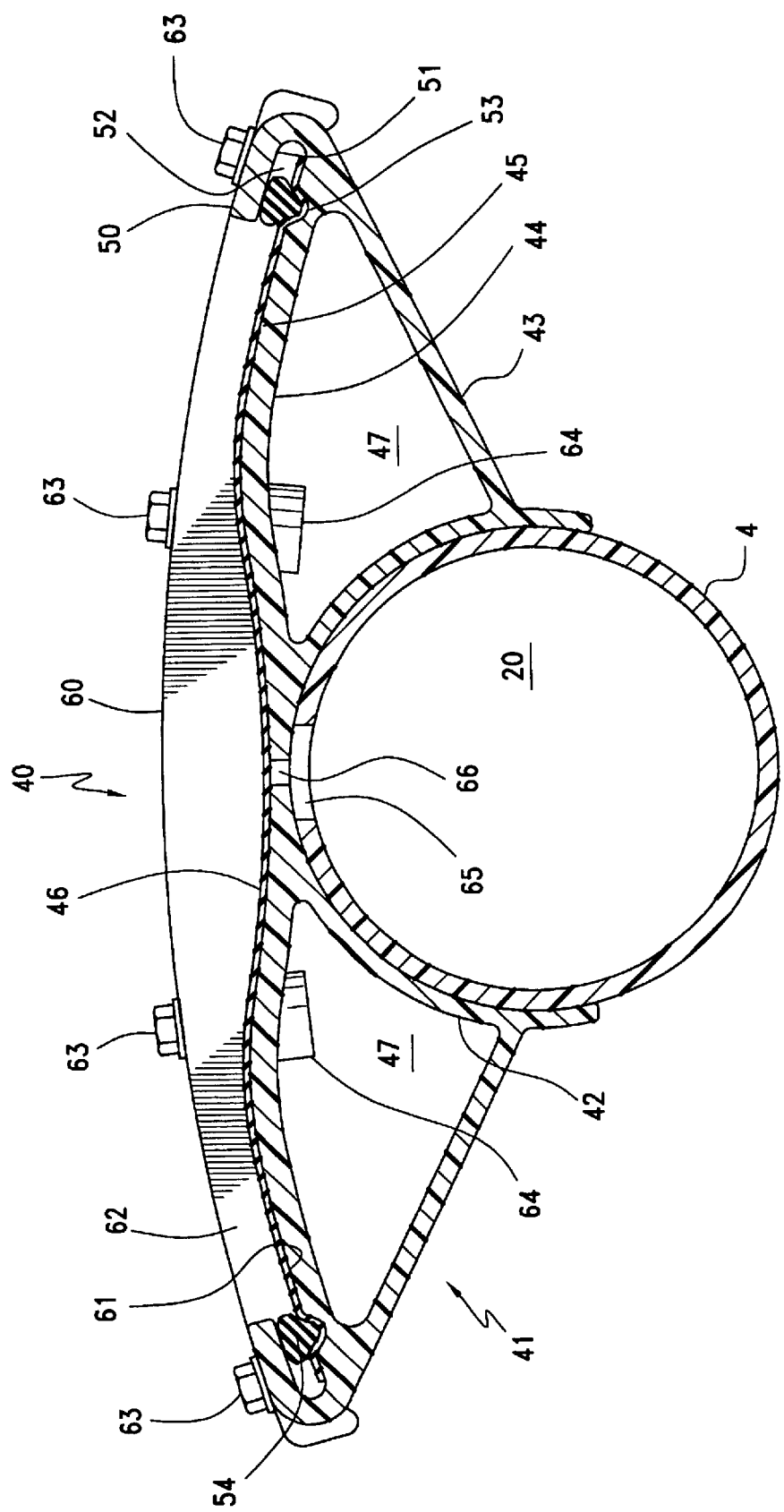
FIG. 8 is a sectional view, taken along section line 8—8 of FIG. 7.

FIGS. 6 through 10 illustrate strip diffusers 40, representing an improved form of strip diffuser contemplated by the present invention, installed in a tank similar to that illustrated in FIG. 4. These diffusers are mounted atop gas supply conduits 4 and are elongated in the same general direction as those conduits. FIG. 7 is an elongated portion of one of the diffusers 40 and a portion of an associated gas supply conduit. FIG. 8 is a transverse cross-section of the diffuser of FIG. 7 which, in a preferred embodiment, is representative of all of the diffusers in tank 30. The respective diffusers have a body 41 with a saddle-shaped lower wall 42 which rests atop and is secured to the crown of gas supply conduit 4 by any acceptable method such as solvent welding, ultrasonic welding or a mechanical arrangement. The body also includes inclined bracing walls 43 and a membrane support web 44 having an undulating upper surface 45, including a shallow channel 46. Chambers 47, enclosed by lower wall 42, support webs 44 and inclined bracing walls 43, may be left open to, and thus may be filled up by, wastewater in the tank, thereby reducing any tendency for the diffusers to be buoyant.

As may be seen in FIGS. 7–10, there is a flange 50 at each longitudinal edge of membrane support web 44. These flanges assist in holding membrane 55 in place. The space between the undersurface 51 of each flange 50 and the membrane support web upper surface 45 defines a slot 52. The slot has a central axis which, in this embodiment, is oriented in the same general direction as a support web upper surface 45. Slot 52 has opposing walls with a groove 53 formed in one of those walls. These components, best seen in FIG. 10, are sized so that when a marginal portion 56 of the membrane and a filler strip 54 are in place, the membrane is pressed into groove 53 by filler strip 54 which is maintained under compression by an interference fit with the under surface 51 of flange 50. Where the interference is relatively large and filler strip 54 is forced into place with the aid of lubricant, such as a soap solution which will wash away in water, the filler strip and the membrane marginal portion 56 may be placed under relatively high compression in groove 53, thereby holding the longitudinal edges of membrane 55, i.e., marginal portions 56, securely in place, and thus providing a gas-tight seal along the longitudinal edges of the membrane.

As indicated by FIGS. 7 and 8, membrane 55 is secured to body 41 by an end clamp 60. These figures only show one such end clamp, but it will be understood that such a clamp is present at each end of the body of the present embodiment. The representative end clamp which is visible in FIGS. 7 and 8 includes a lower surface 61, which follows the contour of the support web upper surface 45. Preferably, the bulge in clamp lower surface 61 and channel 46 cooperate to stretch the membrane transversely at its ends, and thereby assist in sealing it at its ends.

These end clamps also have vertical inner surfaces 62 which are in abutment with the ends of flanges 50 and filler strips 54. So that the clamps may bear down on the membrane ends at the very ends of the support web upper surfaces 45, the flanges 50 terminate a short distance from the ends of the web upper surfaces, by a distance approximately equal to the horizontal thickness of the end clamps. The clamps are held in place by any suitable securing means which, in this embodiment are hex-head self-threading screws 63 in corresponding holes in the clamps and support web 44. This provides gas-tight seals at the ends of the membrane.

In this embodiment, the flow of treating gas is from the interior 20 of gas supply conduit 4 through a series of gas exit ports 65 in the crown of the gas conduit. These are spaced apart along that conduit in registry with plural flow regulator orifices 66, the latter being positioned as shown in FIG. 9. A gas chamber forms between the membrane support web upper surface and the influent undersurface of membrane 55 when treatment gas is passing through orifices 66 and partially inflates the membrane. Gas passes from that gas chamber through perforations 26 (see FIG. 7) in a portion of the membrane which is between flanges 50. Providing plural orifices as shown, supplied from a closed conduit running lengthwise of the gas chamber, contributes to the degree of uniformity of distribution of air achieved by the diffuser.

Preferably, there are no perforations in the membrane marginal portions 56 gripped by filler strip 54 and groove 53 and no perforations in a longitudinal central band of the membrane which is in registry with orifices 66. That band acts as a check valve which inhibits entry of wastewater into the submerged diffuser and conduit system when gas flow is shut off.

In a preferred embodiment, the above-mentioned orifices 66 range in diameter from about 0.0625 to about 0.3725 inches, preferably from about 0.125 to about 0.25 inches. Preferably, plural orifices are distributed along the length of the body. The orifice density, the ratio of the number of orifices to membrane gas discharge area, is preferably about one orifice for each 72 to 240 square inches, and preferably for each 72 to 120 square inches, of membrane gas discharge area. The membrane gas discharge area is the number of square inches of membrane upper surface in which working perforations are present.

It is preferred that there be two or more orifices distributed over at least about 40%, more preferably about 50% and still more preferably about 60% of the length of the membrane support and more preferably over at least about 40%, more preferably about 50% and still more preferably about 60% of the length of the gas chamber. Thus, the distance between the first such orifice and the last such orifice along the length of the support or chamber is preferably equal to at least about 40%, more preferably about 50% and still more preferably about 60% of the length of the support or chamber.

Where there are three, four, five or more orifices, the spacing of at least the majority, preferably of at least about 75% and still more preferably of substantially all of the orifices is approximately uniform, along that portion of the length of the support or gas chamber in which they are present. However, uniformity of spacing is not essential. Any combination of amount or amounts of spacing from orifice to orifice, of plural orifices, of orifice diameter(s), of orifice distribution and of orifice density that makes an appreciable contribution of uniformity to distribution of gas along the length of the gas chamber may be employed.

FIGS. 11 and 11(a) disclose a modification of the embodiment shown in FIGS. 6–10. Here, except for the facts that a generally upright side wall 70 has been added and the flanges have been reoriented and moved from the longitudinal edges of membrane support web 44 to side wall 70, the body is essentially the same as that shown in FIGS. 6–10. A curved transition 69 and side wall 70 represent integral extensions of support web upper surface 45. The lower end of side wall 70 is attached to the outer end of an inclined bracing wall 43, having a lower angle of inclination but otherwise similar to the bracing wall of FIGS. 6–10. This embodiment also includes the components identified as a saddle-shaped wall 42, a gas supply conduit 4 and a shallow channel 46, but, for the sake of simplicity, these parts have been omitted from FIG. 11.

Reoriented flanges 71 of FIG. 11, as is true of flanges 50 of FIG. 8, assist in holding a membrane in place. Here, the membrane is identified as 82 and is of increased width so that it can reach from the upper surface around the curved transition 69 into the flanges 71. While only one such flange is shown in the figure, it will be understood that a similar flange is provided at the other side of the body.

The space between the side wall 70 and the inner surface 72 of each flange 71 defines a slot 73. The slot has a central axis which, in this embodiment, is oriented at a substantially different direction from the support web upper surface 45, e.g., generally upright. Side wall 70 and inner surface 72 represent opposing walls of the slot, and a groove 74 is formed in one of those walls, e.g., side wall 70. These components are sized in the manner discussed above in relation to FIG. 10, so that when a marginal, unperforated portion 83 of the membrane and a filler strip 75 are in place, the membrane is pressed into groove 74 by the filler strip which is maintained under compression by an interference fit with the inner surface 72 of flange 71. This provides gas tight seals along the longitudinal edges of the membrane, while clamps (not shown) similar to those depicted in FIGS. 7 and 8 provide gas-tight seals at the ends of the membrane.

FIGS. 11 and 11(a) illustrate, in compressed and uncompressed form, respectively, the filler strips 54 and 75 used in the two different embodiments just described. In each case the filler strip has sides 76 that converge from a curved back 78 to a curved nose portion 77. The nose is of shorter radius and thus smaller surface area than the gently curved, longer radius back which is of larger surface area. The uncompressed part, as shown in FIG. 11(a), is longer, nose-to-back, and narrower, side-to-side. The radius of the curved back is made longer by compression of the part.

Optionally, the filler strips 54 and 75 may be replaced with similarly shaped rigid strips. When these strips, whether resilient or rigid, are appropriately sized, the curvature of the back assists in resisting dislodgement of the filler strip when the membrane pulls on it, because the curved back of the filler strip allows it to rotate slightly when the membrane tries to pull out, causing the strip to jam more tightly into the groove and more firmly restrain the membrane.

The FIG. 11 embodiment, like that of FIGS. 6–10, provides for the flow of treating gas from the interior of a gas supply conduit through a series of gas exit ports in the crown of the gas supply conduit and through a series of flow-regulating orifices. These are arranged as discussed in connection with the previous embodiment. A gas chamber forms between the membrane support web upper surface 45 and a perforated central portion 84 of membrane 82 when treatment gas is passing through the orifices and partially inflates the membrane. Gas passes from that gas chamber through membrane portion 84 into the wastewater.

FIG. 12 is a preferred form of the embodiment found in FIGS. 6–10. It shows different ways of securing and sealing the membrane along its longitudinal edges and at its ends. This embodiment retains essentially the same features of the FIGS. 6–10 embodiment as are retained in the FIG. 11 embodiment, except that a different membrane clamping arrangement is used. Although the figure shows only one edge-securing and -sealing device on one side of the diffuser, it will be understood that a similar device will be provided on each side of the diffuser.

Among the parts of the FIG. 12 embodiment which distinguish it from the others are a side wall 87, somewhat shorter than side wall 70 of FIG. 11, having a dependent rib 88. A portion 89 of the body includes a first concave arcuate seal-engaging surface 90, having its concavity facing downward in this embodiment. Portion 89 may for example be an extension of support web upper surface 45 and preferably reaches outwardly and downwardly from that surface.

Within a portion of the body, for example within portion 89, is a first securing member, e.g., a keyway 91.

A keeper 93 includes a second securing member, for example a key 94, and a second concave arcuate seal-engaging surface 96. In this embodiment, the concavity of surface 96 faces upward and is part of a J-member 95. The second securing member is lockingly matable or otherwise cooperative with the first securing member, whereby keeper 93 and second arcuate surface 96 are held in fixed position 96 and maintain the first and second concave surfaces in opposing relationship to one another.

According to a particularly preferred embodiment, the second securing member may be present in a slot 92, and at least a portion of the keeper 93 is insertable and longitudinally slidable in slot 92. Thus, in this preferred embodiment, the keeper can be inserted, with a longitudinal sliding motion from the end of the body, into slot 92, and it is particularly preferred that the keeper run throughout the entire length of the slot.

Oppositely oriented surfaces 90 and 96 cooperate to grasp a seal, preferably a seal of complementary shape, preferably an O-ring seal 100. Seal 100 is "connected with", which includes a glued or otherwise added seal, and in its most preferred form includes an integrally formed seal, on a membrane 101.

A wide variety of different ways of sealing the ends of the membrane may be used with each of the previously described embodiments, including that of FIG. 12. However, the preferred end clamping arrangement for this embodiment is a strap 102. This strap is preferably in the form of a resilient band, e.g., of stainless steel. It may be secured to the body in any desired way, but preferably includes a hook member 103 to engage the body's dependent rib 88, which may be provided if desired with a cooperating detent (not shown). The remainder of this band extends around the side of the body and across the top of the diffuser, and may terminate with a corresponding hook member engaging a like dependent rib at the other side of the body.

FIG. 12(*a*) illustrates optional and preferred modifications of the FIG. 12 embodiment that facilitate insertion of keeper 93 into slot 92. In this embodiment, means are provided to reduce friction between any one or more surfaces of keeper 93 and one or more surfaces of slot 92 and/or of membrane seal 100. Such means may be one or more layers of low friction material present between one or more portions of the surfaces of the keeper and/or slot and/or seal that would otherwise be in sliding contact during the above described sliding motion.

Thus, for example, as shown in FIG. 12(*a*), a low friction layer 97 may be applied to the right vertical face of keeper 93 that contacts the right side of slot 92 and to the concave surface of keeper 93 that contacts the surface of seal 100 from about its 4 o'clock position to about its 9 o'clock position. This layer preferably has a lower coefficient of friction, vis-a-vis whatever portion of the slot and/or seal that it contacts during sliding motion, than the adjoining structure covered by said layer. Thus, for example, if the layer contacts only the seal during sliding motion, it need only have a lower coefficient of friction, vis-a-vis the seal, as compared to the coefficient of friction, vis-a-vis the seal, of that portion of the keeper adjoining the seal.

A variety of materials in various physical forms and states may form the low friction layer. For example, natural and synthetic polymers and non-polymers may be used, especially those of a slippery character. These materials may be applied in the form of solid webs, e.g., tape with adhesive backing, or sprayed on as thick or thin fluent film-formers, which may or may not advance from a fluent to semi-solid or solid state once they are in place. Solid, semi solid and liquid materials such as oils, waxes, soaps and natural resins, as well as particulate solid lubricants such as graphite and PTFE (polytetrafluoroethylene) powder are also contemplated.

While some of the above examples contemplate applying an adherent low friction layer to the keeper and/or slot and/or seal elements, the layer need not adhere to any of them. The layer may for example be a shaped solid member that is simply interposed between portions of two or more of these elements. For example, a thin, relatively stiff elongated member with an arcuate transverse cross-section and slippery surfaces may be interposed between the keeper and adjoining surfaces of the slot and seal.

FIG. 13 discloses yet another embodiment of the invention, similar to those described above, in that the body may be extruded. In this embodiment, the flow control orifices constitute, at least in part, apertures through a wall of a gas supply conduit.

In this particular embodiment, the body comprises two segments separately formed by any acceptable technique, such as by thermo-forming, i.e., hot bending of polymeric sheet material, but preferably by extrusion. Left body segment 106 includes a foot 107 having a lower surface 108 which is secured, for example by bonding through solvent welding or sonic welding, to a gas supply conduit 4. Foot 107 acts as a support for an optional, preferably generally upright leg 109, which supports a laterally extending membrane support shelf 110. Shelf 110 may include an optional skirt 111, which may depend from that end of shelf 110 which is furthest from the center of conduit 4. Foot 107, leg 109 (when present), shelf 110 and skirt 111 (when present) are preferably all integral parts of a single extrusion.

A like right body segment 115 with a foot 116, lower surface 117, an optional preferably generally upright leg 118 and a laterally extending membrane support shelf 119, which may or may not include an optional dependent skirt 120, is also bonded to the crown of gas supply conduit 4. Segment 115 is preferably an extruded mirror image of segment 106. These two segments are secured to the conduit, preferably near its crown, extending along opposite sides of a row of spaced apart gas orifices 21, which preferably extend along the crown of the conduit.

Shelves 110 and 119 may for example be co-planar, as shown, to provide a flat or planar support for a membrane 125. Alternatively, they may have planar surfaces arranged at a small angle to one another (not shown), or may have curved surfaces (not shown) to provide, in combination, an arcuate support for the membrane.

The unperforated side portions 127 of the membrane may be attached to the body in any suitable way. However, where skirts 111 and 120 are provided, side portions 127 may extend from the upper surfaces of the support shelves 110 and 119 over curved transition surfaces 121. Preferably side portions 127 then extend down the outer surfaces of skirts 111 and 120 to positions near their edges. The membrane side portions may, with the aid of any suitable securing means or arrangement, such as spring metal clips 128, be secured in gas-tight relation to the edges of the body, and such securing may be to the distal ends of the skirts where such are provided.

Although it is preferred to use segments 106 and 115 that are separate parts, separately formed, it is possible, according to a modification of this embodiment (not shown), to replace the two separate segments with a part, e.g., an injection molded part, or a fiberglass reinforced resin part formed by lay-up or spray-up techniques, that includes the features of both segments. In either event, provision should be made for gas-tight closure of the ends of the space between the legs 109 and 118. If separate segments 106 and 115 are used, closure may be provided by simple plug members (not shown) of appropriate shape that preferably are flush with the shelf upper surfaces and have sufficient expanse in the longitudinal direction to provide lands upon which clamps or other securing means may bear to provide gas-tight closure across the ends of the membrane. Where one part is substituted for the two separate segments, closure may be provided by end walls which are integral with that part and which bridge in a horizontal direction between legs 109 and 118.

In the embodiment of FIG. 13 and its above-described optional and alternative forms, treatment gas from conduit 4 passes through the orifices 21. In connection with these embodiments, the amount(s) of spacing from orifice to orifice, the numbers of orifices, the orifice diameter(s), the orifice distribution and the orifice density may be the same or different, and preferably are the same, as those described in connection with FIGS. 6-10. However, any combination of these parameters that makes an appreciable contribution of uniformity to distribution of gas along the length of the diffuser may be employed.

Treatment gas discharged from the orifices passes into a gas passageway 129. This passageway includes lateral space between the inner edges of the support shelves 110 and 119, and also includes the lateral space between legs 109 and 118, where such are present. The gas then, preferably with partial inflation of the membrane, passes out of the perforated central portion 126 of the membrane. Perforations may if desired be omitted from a central longitudinal band of the membrane overlying passageway 129 to assist in impeding backflow of wastewater through the membrane during interruptions in gas flow.

FIGS. 14–20

FIGS. 14–20 embody illustrative bodies and complete diffusers in which there are integral bodies and gas supply conduits. FIGS. 14 and 15, respectively, are side and perspective views of a body 133 comprising an arcuate support member 134 with ends 135. The illustration is broken in FIG. 14 to indicate that the body may be much longer than is suggested by the length to height ratio of the part as shown that figure. Grooves 136 run along each edge 137 of support member 134. The support member is formed integrally with: a gas supply conduit 138, defined by gas flow confining wall 139 of rounded cross section; inclined bracing webs 140; legs 142; and a foot 143 formed at the bottom of confining wall 139. Each side of this confining wall, along with the respective webs 140 and portions of the lower surface of support member 134 define chambers 141 which may be sealed but which are preferably left open to admit wastewater in order that they not contribute buoyancy to the diffuser. A series of orifices communicates between the interior of conduit 138 and the upper surface of support 134.

A gas supply connection which may be incorporated in the body at the time of manufacture or installation is shown in FIG. 16. This figure includes a partial section, taken in a vertical plane passing through the central axis of the body, of the support 134, confining wall 139 of gas supply conduit 138 and foot 143. In this embodiment, the gas supply connection includes a close-connection fitting 148 having barbed ridges 149 and a rounded mail connecting and which is insertable, in closely fitting relationship, with the inner surface of gas flow confining wall 139. There is a gas tight connection between fitting 148 and confining wall 139, which may be accomplished, for example, by solvent welding or sonic welding.

For an end view of the body of FIGS. 14 and 15, along with other diffuser parts, see FIG. 17. Among these additional components are an elongated rectangular membrane 151 with integral O-ring seals 152 formed along both of its longitudinal edges. The O-rings match up with the grooves 136 in support 134.

A membrane end-sealing member 153 is also provided. In this embodiment it is a pressed sheet-metal or plastic clamp of U-shaped cross-section. See FIGS. 19 and 20 for the cross section. Clamp 153 has an arcuate under-surface 154 and grooves 155 that coincide with the membrane's O-rings 152. To hold clamp 153 in-place, a strap 156 is provided, having a central arcuate portion 157 matching the arcuate profile of the clamp. End tabs on strap 156 and cooperating clamp fastening means 159 are able to force the clamp undersurface against the membrane upper surface at the end of the membrane and to compress the membrane between the clamp and the supporting member, e.g., with the aid of nuts 160 and threaded members 161.

The threaded members may be of any suitable shape and size, and preferably are rods anchored in the floor of a tank in order to support the racks 162 and the diffusers a short distance above the floor. Although only one rack appears in FIG. 17, ordinarily, a rack may be supplied at the end of each diffuser, and, where the diffuser is very long, additional racks may be provided between its ends. The diffusers are supported on the racks by legs 142 and foot 143, which stand on upper surfaces of the racks.

Any suitable type of membrane longitudinal edge sealing member may be employed to provide gas-tight seals between the membrane 151 and support 134 along the longitudinal edges of the membranes. As illustrated by other embodiments of the invention, it is not necessary to employ integral O-rings 152, since the edge sealing arrangements may use formations with different types of cross-sections than those of O-rings, and edge sealing may also be effected with membranes having no edge formations, e.g., using membranes with plain edges. However, in the present embodiment, the membrane edge sealing member is a resilient, corrosion-proof spring metal clip 166, one example of which is shown in FIG. 18, it being understood that such a clip may be provided along each of the two longitudinal edges of the membrane and its body. Clip 166 has an upper portion 169 which overlaps left edge 137 of the support member, its groove 136 and the O-ring 152 that is present in groove 136, extending around and gripping the upper inner surface of the O-ring. The end of clip 166 abuts the inner face of clamp 153 at one end of the membrane and abuts the inner face of another, similar clamp (not shown) at the other end of the membrane.

While the rack 162 of FIG. 17 was only wide enough to support a single diffuser, it is possible to provide wider racks capable of supporting plural diffusers in side-by-side arrays, as shown in FIG. 19. That figure shows a triple array of diffusers similar to those illustrated in FIGS. 14–18. Each of the three diffusers shown comprises a body 133 and membrane 151 with edge-sealing clips 166 and end-sealing clamps 153, the latter being held in-place by straps 156 on racks 174.

FIG. 20 shows how diffusers, whether mounted individually on their own supports, as in FIG. 17, or arranged in a side-by-side array on a common support, as in FIG. 19, may be connected in end-to-end series on longitudinally distributed sets of racks 162 or 174. In the figure, first and second diffusers 176 and 177 constitute a longitudinally connected string of plural diffusers which are connected to one another. Supporting rack 162 or 174 is provided at each end of the respective diffusers. Depending on the lengths of the diffusers, it may be necessary to provide additional racks or other supports intermediate the ends of the diffusers. Diffusers in strings, or not in strings, may be connected to a gas supply manifold 178, and, where applicable, to each other, through hoses 179 with the aid of hose clamps 180. Whether diffusers are not, or are, arranged in strings, the far end of the diffuser or the far end of the last diffuser in line, as the case may be, i.e., the end of the diffuser and its gas supply conduit furthest from the manifold 178, may for example be provided with a gas-tight plug, or with a connection to a liquid purge system or to a second manifold.

FIGS. 21–25

Other forms of end clamping arrangements may be used, as illustrated by FIGS. 21–23. This embodiment has a body 133 with support member 134, a membrane 151 with integral O-rings 152 and longitudinal edge sealing members (not shown), all as described in connection with FIGS. 14-20. The end clamp 184 of this embodiment, which may be of cast metal or molded plastic, is similar to the prior embodiments in having an arcuate under-surface 185 and grooves 186 to accommodate O-rings 152. This clamp has a bottom 187 and spaced-apart sides 188 that extend throughout its length. These sides 188 have between their inner faces a valley 189 interrupted at longitudinally-spaced intervals by a series of cross-members 190 containing bores 191. Threaded screws 192 extend through bores 191 and the membrane and are threaded into holes 193 in support member 134, extending where necessary into bosses 194, to secure the clamp and membrane to the body at each end of the membrane. As shown in FIG. 22, clamp bottoms 187 may be provided with ridges 195 that partially penetrate the upper surface of membrane 151, when the clamp is installed. These ridges are preferably blunt rather than sharp, to minimize their tendency to cut the membrane.

FIGS. 24 and 25 show how one or more depressions may be provided in the membrane support 134 of a diffuser, including without limitation any of the diffuser embodiments herein, to assist in startup of the diffuser. The goal of these embodiments is to assist in lifting a non-operating membrane free from its support as the flow of gas to the membrane begins, when the diffuser is first operated and/or when operation is restored after an outage. For this purpose, gas discharged from an orifice is given access to an amount of membrane gas influent surface area that substantially exceeds the cross-sectional area of the orifice. Preferably, a plurality of orifices are given such access.

To do this, one or more orifices are arranged to discharge gas into one or more depressions in a support. Thus, there may be a single orifice feeding into a single depression, plural orifices feeding into their own individual depressions, plural orifices feeding into common depressions and different combinations of the foregoing. Depressions are provided that are of limited width in at least one direction, so that a non-operating membrane can bridge across the resultant gap. Such bridging exposes to the action of pressure exerted by incoming gas an amount of membrane surface area exceeding the flow cross-section of the orifice or orifices. The diffuser is designed with a ratio of exposed surface area to orifice flow cross-section sufficient to generate enough force on the underside of the membrane to lift it free from its non-operating position on the support, against its own elasticity and the hydrostatic head of overlying liquid.

Strip diffusers, preferably those with extruded bodies having orifices distributed longitudinally in one or more longitudinal rows, whether or not there is a row located centrally between the body longitudinal edges, represent an unusually advantageous environment within which to practice this concept. One or more of these rows may be arranged to feed into a common depression or depressions, as above described.

Thus, the depression(s) may be formed by extruding or milling into the membrane support of a diffuser body a longitudinally extending channel that the membrane can bridge across, given the elasticity of the membrane and the amount of force pressing down upon it as a result of the hydrostatic head.

FIGS. 24 and 25 illustrate longitudinally extending channels as described above. In each of these embodiments the body 133 includes a support 134, a gas supply conduit 138 having gas flow confining wall 139 and a longitudinally spaced series of orifices 144 (only one being shown in each figure) that are similar to those provided in the preceding embodiments. In FIG. 24, channel 199 is substantially rectangular in its transverse cross-section. But in FIG. 25, channel 200 has a substantially arcuate transverse cross-section. These figures are merely illustrative, since any cross-section which provides access to sufficient membrane influent surface area may be used.

The integral O-rings 152 of prior embodiments, e.g. as shown in FIGS. 12, 12(a), 17, 18 and 21, are protrusions from the surfaces of membranes which can be of assistance in securing a membrane to its body and/or in providing a gas-tight seal between portions of the membrane and body. However, such protrusions may take a variety of forms in any of the various embodiments of the invention and may, in appropriate circumstances, be unnecessary. A few examples of different forms of protrusions and of diffusers which do not require such protrusions are provided in embodiments described below.

FIGS. 26–29

Figure 26:
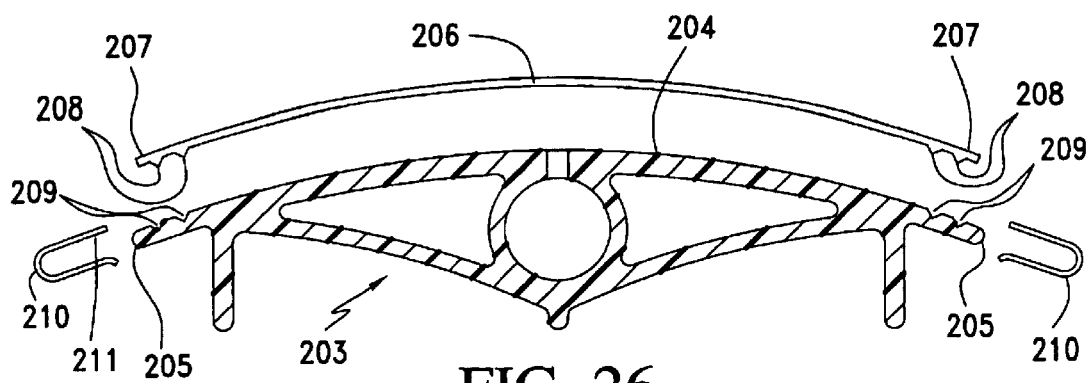
FIG. 26 is an exploded transverse cross-section of a modified form of the diffuser body of FIGS. 17–18 or 17–19, with a membrane and an alternative form of edge securing and sealing arrangement.
Figure 27:
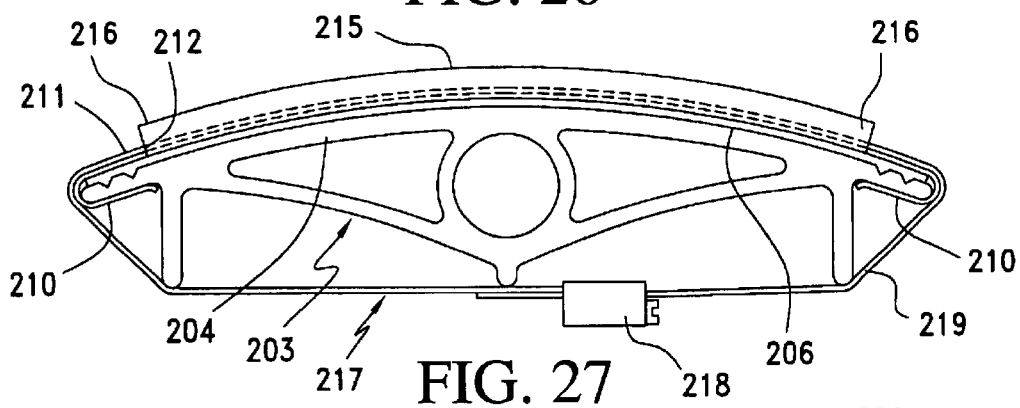
FIG. 27 is an end view of the diffuser of FIG. 26, which also shows an end clamping and sealing arrangement.

FIGS. 26 and 27 disclose an embodiment having a body 203, similar to the body of FIG. 17, having support 204 with longitudinal edges 205. An exploded view provided by FIG. 26 shows longitudinally-running protrusions 208, located a short distance inward from the longitudinal edges 207 of membrane 206. These protrusions are of any suitable number and shape. For example, there may be one or more V-shaped protrusions near each membrane edge 207. Preferably, there are two or more of such protrusions near each edge. Still more preferably there is a pair of protrusions along each longitudinal edge 207 of the membrane, and there is lateral spacing, from one another, of the protrusions within each pair.

Longitudinally-running grooves 209 are provided in the upper surface of the membrane support 204. These may be present in any suitable number and shape whereby they are compatible in number and shape, and are sealingly engagable with, whatever protrusions may be provided in the membrane. For example, e.g., one or more V-shaped grooves may be provided in support 204. The groove(s) is/are near a support edge 204 and/or near a membrane edge 207. Preferably, there are two or more grooves that are near both edges 204 and edges 207. Still more preferably there is a pair of grooves, laterally-spaced from one another, near these edges.

This embodiment includes a membrane edge-securing member, e.g., U-shaped clip 210 and membrane end-securing member 215. As shown in FIG. 27, when the exploded parts are assembled, the membrane is secured and sealingly engaged to the support 204 with the aid of these members. Member 215 may for example be a clamping member with an undersurface conforming to the shape of upper surface of the membrane when the membrane is fitted to the support. Preferably member 215 is a clamp of U-shaped cross-section having clamp ends 216.

At one end 216 of end-securing member 215, its bottom wall 212 abuts inner edge 211 of one membrane edge-securing member 210. Bottom wall 212 extends across and in compressive relationship with the upper surface of membrane 206 to a position where the other end 216 abuts the inner edge 211 of the other edge-securing member. The abutment of these parts is for the purpose of minimizing any tendency for gas to leak at the membrane ends where securing member ends 216 and inner edges 211 adjoin one another. For this same purpose, it is preferred that the material of which clips 210 are formed be of the same thickness as the bottom wall 212 of end-securing member 215.

Such abutment and the compression of the bottom wall against the upper surface of the membrane may be provided in any suitable manner. However, this is preferably accomplished with a worm-gear fastener 217 having a gear-body 218 containing the usual worm gear (not shown) and a draw-band 219 including the usual female thread pattern (not shown). Fastener 217 extends around the entire diffuser, including through the valley of the U-shaped membrane end-securing member 215 and around the outside surfaces of both the membrane edge-securing members 210. This assists in holding the edge-securing members 210 in place. While fasteners 217 are preferably provided at each end of a diffuser, they may also be provided at positions intermediate those ends, for example if there is need for additional help in keeping the securing members 210 in place.

Figure 28:
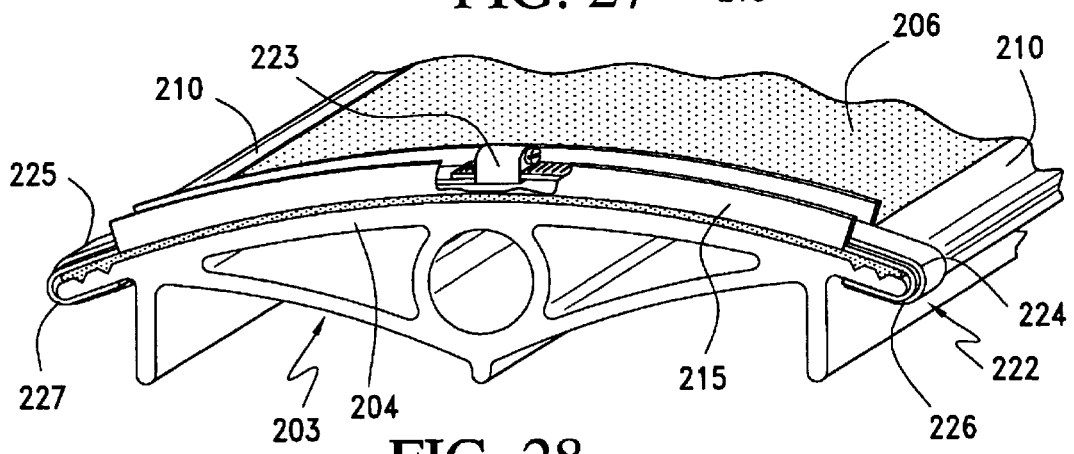
FIG. 28 is a partial perspective view of a diffuser similar to that of FIG. 27 with a modified clamping arrangement.
Figure 29:
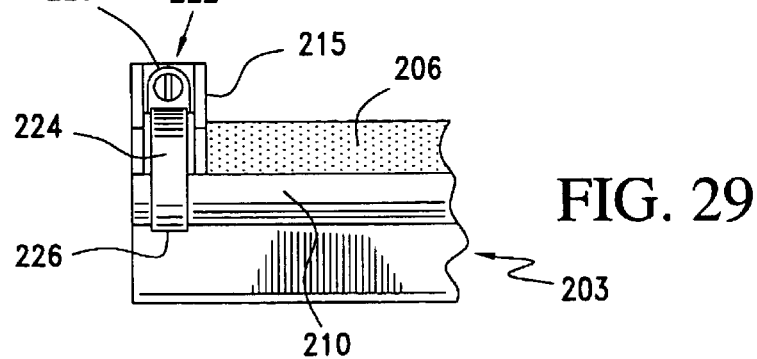
FIG. 29 is a partial side view of the diffuser of FIG. 28.

FIGS. 28 and 29 disclose a modification of the FIGS. 26–27 embodiment having an alternative form of fastener. This embodiment mirrors the previous one in having a body 203, support 204, support longitudinal edges 205, membrane 206, membrane longitudinal edges 207, protrusions 208, grooves 209, edge-securing member 210, clip 211, and end-securing member 215 with bottom wall 212 and clamp ends 216. The alternative worm-gear fastener 222 of FIGS. 28 and 29 has the usual gear body 223 and internal gear (not shown), but instead of a single draw band, has first and second band segments 224 and 225, one fixed to the gear body and the other threadedly engaged with the worm gear. These band segments have, respectively, free ends having hook members formed thereon 226 and 227. Here, instead of extending around the entire diffuser, the fastener 222 extends through the valley of the U-shaped membrane end-securing member 215 and terminates with the hook members 226 and 227. Since these hooks embrace the outside surfaces of both the membrane edge-securing members 210, this fastener also assists in keeping them in place. As in the previous embodiment, fasteners 222 can be provided at the ends of, and, if desired, at intermediate positions along, the diffusers.

FIG. 30

Another modification of the embodiment of FIG. 26 appears in FIG. 30, illustrating a body 203 and support 204. Here, the body longitudinal edge 205 of FIG. 26 is replaced with a skirt 230. This skirt is inclined downwardly, preferably by an angle of at least about 30 degrees, or more preferably at least about 45 degrees, and still more preferably at least about 60 degrees, from the upper surface of the adjoining portion of the membrane support member. This adjoining portion, in the installed diffuser, may be, and usually is, generally horizontal, meaning more nearly horizontal than vertical. The skirt may for example be generally upright, which means more nearly vertical than horizontal, and thus may be somewhat inclined or exactly vertical, as shown.

Skirt 230 is connected to the membrane support through a curved section 231, terminates in a tip 233 and has a curved transition surface 232. Surface 232 provides a smooth transition from the generally horizontal upper surface of the membrane support to the generally upright outer surface of the skirt. Longitudinally extending groove 234 is present in the outer surface of skirt 230. Membrane 235 has a curved transition section 236 overlying curved transition surface 232 of the support. A porous central section 237 of the membrane begins a short distance uphill on the support from surface 232. The remainder of the membrane, a non-porous marginal portion 238, overlies transition surface 232 and the vertical outer surface of the skirt. Between longitudinal edge 239 and membrane transition section 236 is a longitudinal protrusion 240 that is sealingly compatible with longitudinal groove 234. Longitudinally-extending clip 241 is present to assist in binding marginal portion 238 and protrusion 240 of the membrane in gas tight relationship to skirt 230. Any suitable membrane end-securing arrangement (not shown) may be utilized here.

FIGS. 31–32

An example of an inclined skirt is provided in the FIGS. 31–32 embodiment. Here, there is a body 203, support 204, curved section 231, tip 233, longitudinal groove 234, membrane 235, longitudinal edge 239, longitudinal protrusion 240 and longitudinally-extending clip 241. However, the skirt 244 of this embodiment is inclined inwardly at a relatively small angle from the vertical, for example up to about 40 degrees, preferably up to about 30 degrees and still more preferably up to about 20 degrees. The diffuser may be provided at each end, and at intermediate points if desired, with any suitable type of support, such as a stand including an elongated rack 245 similar to that shown in FIG. 17, having transverse spaced slots 246. Conventional worm gear fasteners 217 with gear bodies 218 and draw-bands 219 may be present at each end of the diffuser and, optionally, at intermediate locations. Such fasteners may act, at least in part, as end-securing means for the membrane and, whether present at the diffuser ends or elsewhere, may assist in holding clips 241 and protrusions 240 in place. In this connection, band 219 may be threaded through selected slots 246, extend beneath rack 245 and encircle the entire diffuser in such a way as to compress the exposed surface of the membrane against the support and exert laterally inward force on the membrane, through the clips, at the skirt.

FIG. 33

In this embodiment, a marginal portion of a membrane extends from a generally upward facing, generally horizontal surface of a membrane support member, around the side of the body, to a generally downwardly facing, generally horizontal surface of the body at a level below that of the support member upper surface. The membrane is pressed against this downwardly facing surface. A skirt is not necessary but, where provided, may support an additional member, e.g., a generally inwardly directed flange, which includes the downwardly facing surface.

By way of illustration and not limitation, this embodiment is similar to that of FIG. 30 in having a body 203, support 204, skirt 230, curved section 231, and smoothly curved transition surface 232. However, where the FIG. 30 embodiment had a tip 233, this embodiment has, at the lower end of its skirt, a flange 247. It is generally horizontal. Preferably, it is inclined inwardly by an angle of at least about 45 and more preferably at least about 60 degrees from the adjoining portion of the skirt, that adjoining portion, in the installed diffuser, being generally upright. Preferably the skirt is horizontal as shown.

A curved section 248 connects skirt 238 with flange 247 and has a curved transition surface 249, providing a smooth transition from the generally upright outer surface of the skirt to the generally horizontal surface of the flange. Between flange tip 250 and curved section 248 is a longitudinal groove 251 for receiving a sealingly compatible longitudinal protrusion 261 of membrane 255.

In this embodiment, the membrane has a first curved transition section 256, a second curved transition section 257, a porous central section 258 and a non-porous marginal portion 259, the latter extends from above first curved transition section 256 to the membrane longitudinal edge 260.

As in previous embodiments, any means may be employed to secure the membrane edges to flange 247, and a longitudinally-extending clip 262 may be used for this purpose. Any suitable end-securing means may also be used.

FIG. 34

In a number of prior embodiments, for example those of FIGS. 12, 13 and 30–33, a membrane at rest extends, in at least outward and downward directions, from a generally horizontal surface of a membrane support over a curved transition surface until the angle at which the membrane lower surface extends has changed substantially downward. For example the angle may change by about at least 30 degrees, more preferably at least about 45 degrees and more preferably at least about 60 degrees. The membrane may preferably extend to, or even past, a generally upright side portion of the body. This side portion may be a member whose entire surface is generally upright, or merely a generally upright portion of a member having surface portions that are and are not generally upright. The side portion may for example be a rounded edge of the membrane support itself, or of various appendages to the body, for example skirts, with or without flanges, as in FIGS. 30–33.

Consider the situation in which the membrane extends laterally across a curved transition surface, extends at least to a position at which the above-described angle change has occurred, is not secured to the body above that position, and is secured to the body at or beyond that position. In these circumstances, inflation and resultant stretching of the membrane in operation can cause the undersurface of the membrane to press against the curved transition surface. Bodies can be configured to provide the benefit of utilizing such pressing to form, or at least assist in forming, a longitudinally-extending gas-tight seal between the membrane undersurface and the transition surface. Bodies can be configured to provide the benefit of utilizing frictional engagement between these surfaces to assist in countering to some extent the tendency, if any, for the inflated membrane to pull inwardly on and try to separate itself from its longitudinal securing members. While practice of the invention does not require utilization of either of these benefits, embodiments that afford one or both of them are preferred.

Diffuser design and operating conditions can be manipulated in a variety of ways to realize these benefits. In general, respectively increasing or decreasing the radius of the curved transition surface tends to decrease or increase the sealing pressure between that surface and the undersurface of the membrane. Sealing pressure can also be increased by increasing the gas pressure beneath the membrane, and vice versa. It is of interest that although, generally speaking, increasing pressure drop across a membrane tends to intensify any tendency there might be for leaks to occur, in the embodiments under discussion, especially where the membrane has high resistance to stretch, increased pressure beneath the membrane can assist with sealing.

In general, an increase or decrease in the angular change of membrane direction along the transition surface will tend to increase or decrease the contact distance, that is, the distance in the lateral direction over which the membrane undersurface and curved transition surface are in contact. Increased contact distance tends to increase the integrity of the seal between those surfaces. It also can enhance frictional engagement between those surfaces. Moreover, interfacial contact pressure between the transition surface and the membrane undersurface can be increased or reduced by altering the membrane thickness and/or tensile modulus, thus enhancing or diminishing frictional engagement. Increased frictional engagement tends to reduce any tendency for separation of the membrane from its longitudinal edge securing means.

By incorporating either or both of the foregoing benefits into a diffuser design that includes a given type of sealing arrangement and/or a given type of membrane longitudinal edge-securing arrangement, more sealing and securing integrity may be provided where desired or needed. On the other hand, utilization of these techniques may in certain circumstances make it possible to realize adequate sealing integrity without the use of membrane protrusions and support grooves. This is illustrated in FIG. 34.

The diffuser of this illustrative embodiment may include, as in the embodiment of FIG. 30, body 203, support 204, curved section 231, curved transition surface 232 and skirt 230, having a tip 233. However this embodiment differs from that of FIG. 30 in that there is no longitudinal groove in skirt 230 and no longitudinal protrusion in its membrane 265. Membrane 265 includes central perforated portion 266, non-porous marginal edge portion 267, longitudinal edge 268 and undersurface 269.

This membrane, when not inflated, extends, in at least outward and downward directions, from the generally horizontal support surface 270 over curved transition surface 232 until the angle at which the membrane lower surface extends has changed substantially. In this embodiment, when the membrane has reached a position 271 on side portion 272, which in this case is vertical, the angle change is about 70 degrees. This change is the difference between the membrane undersurface angular orientation at its starting inclination 276 at the upper edge of transition surface 232, which is about 20 degrees down from the horizontal, and its orientation at position 271, where it is vertical. Curving of the membrane outwardly and downwardly as it travels along transition surface 232 to position 271 produces this change. Marginal edge portion 267 of membrane 265 is not secured to the body above position 271.

The membrane can be secured to the body wherever the desired angle change has occurred, e.g., at position 271, as may be seen in other embodiments. See, for example, FIGS. 37–39, 43 and 46. However, in this embodiment, the membrane extends beyond position 271 down along the generally upright side portion 272 of the body and around its tip 233. The membrane is held in place with the aid of a longitudinal securing means, in this case by resilient clamping clip 274.

Inflation of the membrane in operation, as indicated at 275, causes the undersurface 269 of membrane 265 to press against curved transition surface 232. This at least assists in forming a longitudinally-extending gas-tight seal between the membrane undersurface and the transition surface. Frictional engagement between these surfaces assists in countering to some extent the tendency, if any, for the inflated membrane to try to pull free from clip 274.

Grooves with inserts can be used to advantage to assist in securing to bodies membrane edges having no protrusions. Also, grooves of widely varying shape can be employed, with or without inserts separate from the membranes. A variety of groove shapes can be used with membranes which do and do not have protrusions.

FIG. 35

For example, FIG. 35 shows half of a symmetrical body 280 having supporting legs 281, inclined braces 282 integral gas supply conduit 283, a series of longitudinally spaced orifices 284 and a longitudinally-extending support surface 285. There is a longitudinally-extending groove 286 at each edge of support surface 285 with a mouth 287 and generally parallel, planar side walls 288 which are spaced apart by about the same distance as the width of the mouth. The membrane 289 of this diffuser has perforations (not shown) in its central portion. An unperforated marginal portion 290 is bent into a U-shape and is held in place by an insert, for example a wedge 291, which is wide enough to tightly compress the membrane against the groove side walls 288.

FIG. 36

Another example found in FIG. 36 includes a number of features similar or identical to those in FIG. 35, including body 280, legs 281, braces 282, conduit 283, orifices 284 and support surface 285. However the longitudinally-extending grooves 295, located at the edges of support surface 286, have undercut walls. Thus, the inner portions 297 of these grooves are wider than their mouths 296 and may for example be of rounded cross section. Membrane 298 of this embodiment has an unperforated marginal portion 299 which is bent into a generally O-shaped configuration. Here again, inserts 300 are provided, and they are wider than the difference between the groove mouth width and twice the thickness of the membrane. These inserts may be rounded and preferably are of circular cross-section. Either they and/or the membranes have enough combined resilience so that they both can fit through the mouths 296 or, if there is not sufficient resilience for them to be installed in this manner, the membrane may be laid upon the body and the marginal edges may first be inserted into the grooves from the sides. Then the inserts may be fed into the grooves from the end of the body. Lubricant may be used to facilitate either of these installation modes, preferably a water-based lubricant. Preferably, insert 300 is of sufficiently large cross section as to be able to cause contact between the bent marginal portion 299 of the membrane and at least the majority of the surface of the inner portion 297 of the groove.

FIG. 37

Yet another groove shape is illustrated in these figures in connection with another form of body design according to the invention. In FIG. 37 may be seen half of a symmetrical body 303 in the form of a longitudinally-extending box member. As viewed in transverse cross-section, it has rounded corners 304 which connect together a generally flat bottom wall 305, generally upright side walls 306 and a top wall which represents an arcuate support member 307. Gas supply conduit 308 and inclined bracing walls 309 are integral with top and bottom walls 307 and 305. These parts may all be fabricated as a single extrusion. In the extrusion process, longitudinally-extending grooves 311 may be formed in side walls 306. Plural orifices 310 may be formed, e.g. by drilling, at longitudinally spaced intervals along the length of top wall 307.

Grooves 311 may for example resemble in cross-section the mortises of dovetail mortise and tenon joints. These grooves have mouths 312 and inner portions 313 of trapezoidal shape which are wider than their mouths.

Membrane 317 of this embodiment has a perforated central portion 318 and unperforated marginal portions 319 which extend into and out of grooves 311, and are bent to fit the trapezoidal shapes of the grooves.

Inserts 320, for example T-shaped members, are provided. The heads of these Ts are wider than the difference obtained by subtracting from the groove mouth width twice the thickness of membrane 317. Either the insert and/or membrane are resilient enough so that the insert and membrane can fit through mouths 312 or, if there is not sufficient resilience for this mode of installation, the inserts may be fed into the grooves from the end of the body. Here again, lubricant may be used if needed. Preferably, the heads of the Ts are of sufficient width to be able to cause contact between the bent marginal portions 319 of the membrane and at least the majority of the surfaces of the inner portions 313 of grooves 311.

Those upper rounded corners 304 of body 303 which join membrane support 307 to adjacent side walls 306 may be of such radius and extent as to provide curved transitions, similar to those described with other embodiments, for examples those of FIGS. 30–34. Thus, if desired, one may provide in the present embodiment tight pressing of the membrane 317 against these curved transitions, to assist in maintaining sealing integrity and preventing pull-out of the membrane edges from grooves 311.

FIG. 38

This embodiment is the same as that of FIG. 37, except that membrane 324 includes protrusions 325 of dovetail tenon-shaped cross section. These are formed on the membrane undersurface and are positioned to fill the cross-sections of the grooves 311 without permitting development of significant transverse slack in the membrane.

FIG. 39

In this figure, the diffuser includes all parts of the body 303 of FIG. 37, of which a corner 304, a sidewall 306, the support 307, and one of the grooves 311 are shown. The figure also includes membrane 317, having a perforated central portion 318 and an unperforated marginal portion 319. However, in this embodiment insert 326 is of triangular cross-section and solid. Its base 327 is parallel to the widest wall 328 of the trapezoidal groove 311.

FIG. 40

Figure 41:
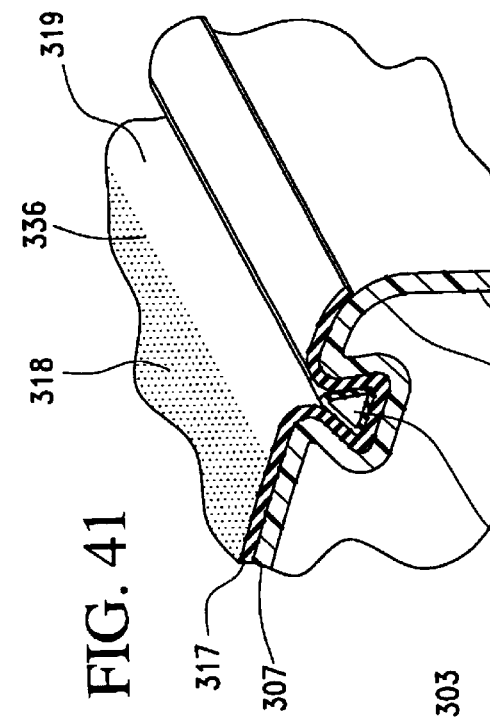
FIG. 41 is a partial perspective view of a diffuser similar to that of FIG. 40 except that the insert of the edge securing and sealing arrangement is hollow.
Figure 42:
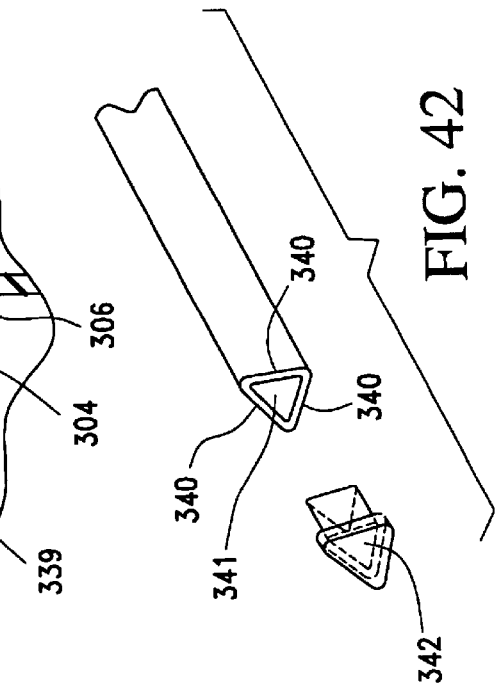
FIG. 42 is an exploded view, in perspective, of an end of the insert of FIG. 41 and an end cap for the insert.
Figure 39:
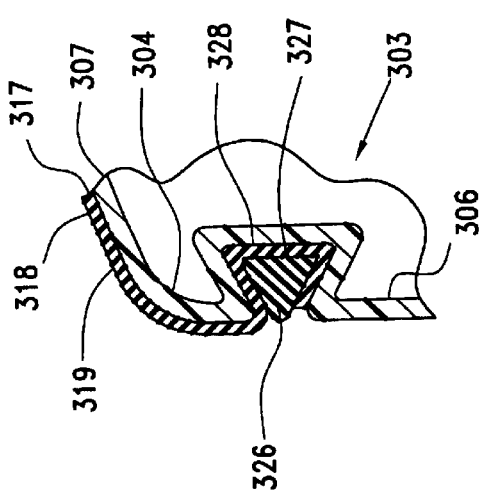
FIG. 39 is a partial transverse cross-sectional view of the diffuser of FIGS. 37 and 38 with yet another form of edge securing and sealing arrangement involving a membrane without protrusions, a dovetail-shaped groove and a solid insert of triangular cross-section.

Here, a number of the parts of the diffuser of FIG. 39 are included. Among these are body 303, having a corner 304, a sidewall 306 and a support member 307. However, in this embodiment, there is at groove 331 of any suitable cross-section, e.g., triangular, which is located in the support member surface near its edges 332 rather than in a sidewall of the body. Again, as in the previous embodiment, the base 333 of insert 326 is parallel to the widest portion 334 of the trapezoidal groove. Membrane 335 need not be as wide as membrane 317 of FIG. 39. A boundary 336 exists between the perforated and unperforated portions of membrane 335 (perforations is not shown). Boundary 336 is located a short distance up the support member surface, just as in the embodiment of FIGS. 41–42. Insert 326 is in contact with the unperforated portion of the membrane.

FIGS. 41–42

Figure 40:
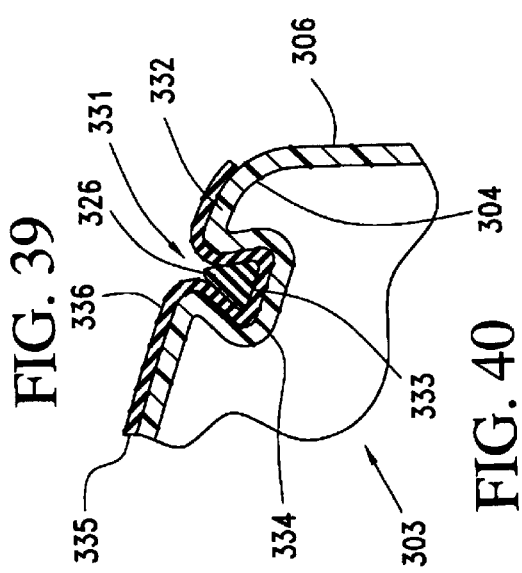
FIG. 40 is a partial transverse cross-sectional view of a diffuser generally similar to that of FIG. 39, except that the edge securing and sealing arrangement has been moved from the side of the diffuser to an upper surface thereof.

This diffuser is the same as that of FIG. 40, except that its insert 339 is hollow, having three webs 340 joined in an integral assembly which can conveniently be extruded. Central void 341, between the webs, saves on material and provides the possibility of greater flexibility for ease of insertion while still retaining adequate harsh resistance to securely hold the membrane in-place. Plugs 342 may be provided at each end of insert 339, if desired.

FIGS. 43–46

As a group, these figures disclose yet another diffuser design which includes a novel body 346. As best seen in FIG. 43, it is in the form of an extruded box having substantially square corners 347. These join, in an integral assembly, bottom wall 348, two generally upright side walls 349 and an optionally arcuate top wall representing a membrane support member 350. Inclined interior bracing webs 351 and 352 are integral with the top and bottom walls and define between themselves and those webs a gas supply conduit 353. It communicates with the membrane support member upper surface 355 through a series of longitudinally spaced orifices 354 that extend through that member. Side chambers 356 are situated between bracing webs 351,352 and the adjacent side walls 349.

The body may include any suitable membrane longitudinal edge securing arrangement 357, preferably dovetail mortise grooves similar to those provided in the embodiment of FIG. 38. Edge securing means may be present at any suitable location, including for instance in support member upper surface 355, but are preferably located in generally upright side walls 349.

These diffusers also include the molded end fixtures 361 shown in FIG. 44, each comprising a main body portion 362, central projection 363 and two adjacent outer projections 364 and 365, two channels 366 and 367, each affording a narrow space with parallel walls between the central projections and each of the outer projections. The bottoms 368, sides 369 and tops 370 of the projections and the channels are positioned and sized to fit snugly within the available space of the gas supply conduit and side chambers 356 of the body 346 with the inclined bracing webs 351,352 fitting snugly within the channels.

At bottom edges of sides 373 of end fixtures 361 are lateral flanges 374. These many be fitted with any suitable mounting arrangement, such as a mounting hole 375, to attach the diffuser to any suitable means to support and/or affix it within a treatment tank, such as on a stand or by direct attachment to the tank floor. The end fixtures optionally but preferably include some form of membrane longitudinal edge securing arrangement. Preferably the arrangement used here is in the fixture sides 373 and is an extension of that used on the body, for example dovetail mortise grooves positioned so that they will be in registry with grooves 357 when the end fixture is installed in a body 346.

End fixture upper surface 377 is designed to be flush with the membrane support surface 355 when two of these fixtures are installed in opposite ends of a body 346, as shown in FIG. 45. Fixtures 361 and body 346 may be attached to one another in any effective manner. This may be done by screwing, bolting, snap-action catches or other means, which may require provision of auxiliary seals between the body and fixtures. If the parts are bonded to one another by solvent- or sonic-welding, which is preferred, it may be unnecessary to provide auxiliary seals.

In FIG. 45, reference numeral 380 indicates the boundary between main body portion 362 of each end fixture 361 and the corresponding end of body 346. Reference numeral 381 identifies the end's of projections 363, 364 and 365.

The end fixtures and body are united in such a way as to provide a gas tight connection between each of the central projections 363 and gas supply conduit 353. This conduit has free communication via a gas tight connection through main body 362 and an opening in its closed end 379 with gas supply nipple 378. One nipple 378 of the given diffuser will be connected directly or indirectly with an air supply, and the other nipple may be connected to another diffuser or to a water purge line, or may be capped.

Any form of membrane, suitable for the membrane longitudinal edge securing arrangement that has been selected, maybe installed on the body of FIG. 45. For example, the membrane 382, illustrated in figure 46, may have protrusions (not shown) similar to those of dovetail tenon shape illustrated in FIG. 38. These are formed on the membrane undersurface and are positioned to fill the cross sections of the grooves 357 and 376 without significant transverse slack in the membrane. A wide variety of different membrane end-securing arrangements may be employed, but in this embodiment, a worm gear fastener 383 is used. Its band 384 completely encircles the ends of the membrane and of each end fixture 361 adjacent its closed end 379.

The body side chambers 356 and end fixture projections 364 and 365 which protrude into the chambers may be open or closed to the admission of gases or liquids from the environment surrounding the diffuser. These chambers may thus be empty or contain a filling material, such as a weighting or strengthening material or liquid from a tank in which the diffuser is immersed.

FIGS. 47–49

These figures show half of a symmetrical, elongated body 388, which has a transverse cross-section resembling in part that of a cake-baking pan. The body is extruded in such a way as to have integral bottom wall 389, side walls 390 and a top wall, representing a membrane support member 391. The hollow interior of this body represents an integral gas supply conduit 392 communicating through orifices 393 (only one being shown) with a gas chamber (not shown) which is formed above support member 391 when the diffuser is an operation. Near each of the two support member edges 394 (only one being shown) is a longitudinally-extending groove 395, having a mouth 396 and an inner portion 397 and an outer side surface 398. The inner portion is wider than the mouth and may for example have a rounded cross-section.

An elongated membrane 402 is provided, having a perforated central portion 403, unperforated marginal portions 404 and, in the marginal portions, dependent protrusions 405. These include narrow necks 406 and enlarged portions 407. These are, respectively, matingly-compatible in cross-section with groove mouths 396 and inner portions 397. Preferably, the protrusions are of sufficiently large cross-section so that they are able, when installed, to cause contact between themselves and at least the majority of the surfaces of the inner portions of the grooves. These protrusions are spaced from one another along the opposite longitudinal edges of membrane 402 so that the protrusions are aligned with the grooves 395 provided along each edge of the body.

Given the proper size relationships between groove mouths, inner portions, necks and enlarged portions, as well as sufficient resilience in the membrane material, the membrane may be laid on top of the body and the protrusions may be pressed downwardly into place in the grooves. Otherwise, the membrane may be installed by guiding the protrusions into the grooves from the end of the body. In either case, lubricant may be employed if needed.

These bodies may be equipped with any suitable kind of end fittings, such as molded fittings 408 that respectively include a main body 409, a projection 410, a hollow interior (not shown), which is in communication with an air entry nipple 411 through the otherwise closed end 412 of the main body, and barbs formed on the nipple, all as disclosed in FIGS. 48–49. In this embodiment, the outer surface of main body 409 preferably has an outline conforming substantially with that of body 388, while the outer surface of projection 410 has an outline conforming substantially with that of the inner surfaces of the body, to facilitate formation of gas tight seals when two such fittings are secured in opposite ends of a body. Any suitable arrangement may be employed for holding the fittings in place, such as self tapping screws, solvent cement or sonic welding.

FIG. 49 shows an end fitting, a membrane and an illustrative membrane end-securing means installed on a body. In the figure, 416 indicates the boundary between the body and the main body 409 of the end fitting. Reference numeral 417 indicates the end of projection 410.

The end securing means may be any suitable type, for example a wide worm-gear clamp 418.

FIGS. 50–53

The diffuser 422 of these figures comprises a body 423 based in part on an extruded main section 424 which appears generally rectangular when viewed from above. It has an upper wall, representing a membrane support member 425, and a lower wall 426. Between support member 425 and lower wall 426 is a series of channels 427, 428, 429, 430 and 431 arranged in side-by-side relationship. These channels are defined by the upper wall, by the lower wall, by a series of channel separating walls 434, 435, 436 and 437, and by side walls 438, all of which components are parts of a common extrusion. Center channel 429 represents a gas supply conduit. Accordingly, it includes a series of longitudinally-spaced orifices 432 extending through support member 425.

Body 423 is also based in part on molded end fixtures 441, which appeared generally semi-circular when viewed from above. Upper and lower halves 442 and 443 of one of these fixtures are shown in vertically exploded form in FIG. 52.

Each end fixture comprises a main body 444 including a central projection 445, a central gas passage 446 and two side projections 447 and 448. When the upper and lower halves of the molded end fixtures shown in FIG. 52 are properly assembled, so that they are not vertically spaced from one another, the central and side projections 446–448 will be in registry and snug fitting relationship with the interior surfaces of the ends of channels 428, 429 and 430, respectively. Solvent welding, sonic welding or any other method(s) may be used to join an end fixture to each end of a main section, thereby forming an oval diffuser body.

At least one, and optionally both of these end fixtures (only one being shown in the drawings), includes a gas supply nipple 449. Where such a nipple is provided, one or more of the projections, preferably at least the central projection 445, will be in open communication with it, within the interior (not shown) of main body 444.

The present diffuser comprises an oval membrane 452 which may be fabricated from molded half-circle end portions 453 which have been bonded to each end of an extruded, rectangular intermediate portion 454 through lapped, vulcanized or otherwise adhesively bonded joints 455. Membrane marginal edges 456 are provided with O-ring seals 457, similar to those in FIG. 17 but extending throughout the edges of membrane portions 453 and 454.

This membrane is secured to the body, in part, by longitudinal edge-securing means, e.g. clamping strips 461. These have flanges 462 which overhang the O-ring seals 457 and marginal edges 456 of the membrane, being clasped in grooves 463 in flanges 462 and in corresponding grooves 464 in the support member 425.

The membrane ends are secured to the body by half-circle end clamps 465, having radial cross-sections similar to the transverse cross sections of clamping strips 461. Like those strips, end clamps 465 have grooves (not shown) in their flanges 466. These grooves and corresponding grooves 467 in the upper walls of end fixtures 441 receive the O-rings in end portions 453 of the membrane.

Clamping strips 461 and end clamps 465 are dimensioned, and are secured in such a way to the assembled body main section 424 end fixtures 441, as to provide a gas tight seal between the periphery of the membrane and the body. Any suitable fastening arrangement, for example hex-head self-tapping screws 468, screwed into support member 425, may be used for this purpose. When the membrane is inflated by gas discharged through orifices 432, the gas influent surface of the membrane is lifted by gas pressure, as shown in FIG. 51, forming gas chamber 469 between the gas influent surface and support member 425.

Any suitable arrangement may be used to support the diffusers of this embodiment in a gas treatment tank. One convenient method is to provide dovetail-shaped tenons 472 on side walls 438 of the diffusers. Support blocks 473 have matching mortices to receive the tenons 472, and also have vertical central bores (not shown). These bores receive the upper ends of threaded support rods 474, whose lower ends are embedded in the floor (not shown) of a treatment tank (not shown). The diffusers are supported on those rods by threaded vertical adjustment wheels 475, with which the diffusers may be leveled. When it is desired to arrange diffusers of this type in side-by-side arrays, one may employ support blocks 476 with dual mortices, one on each side of the respective support blocks, and dove-tail-shaped tenons 477 on the side walls of additional diffusers, e.g., second diffuser 478, to support such arrays.

FIG. 54

Figure 54:
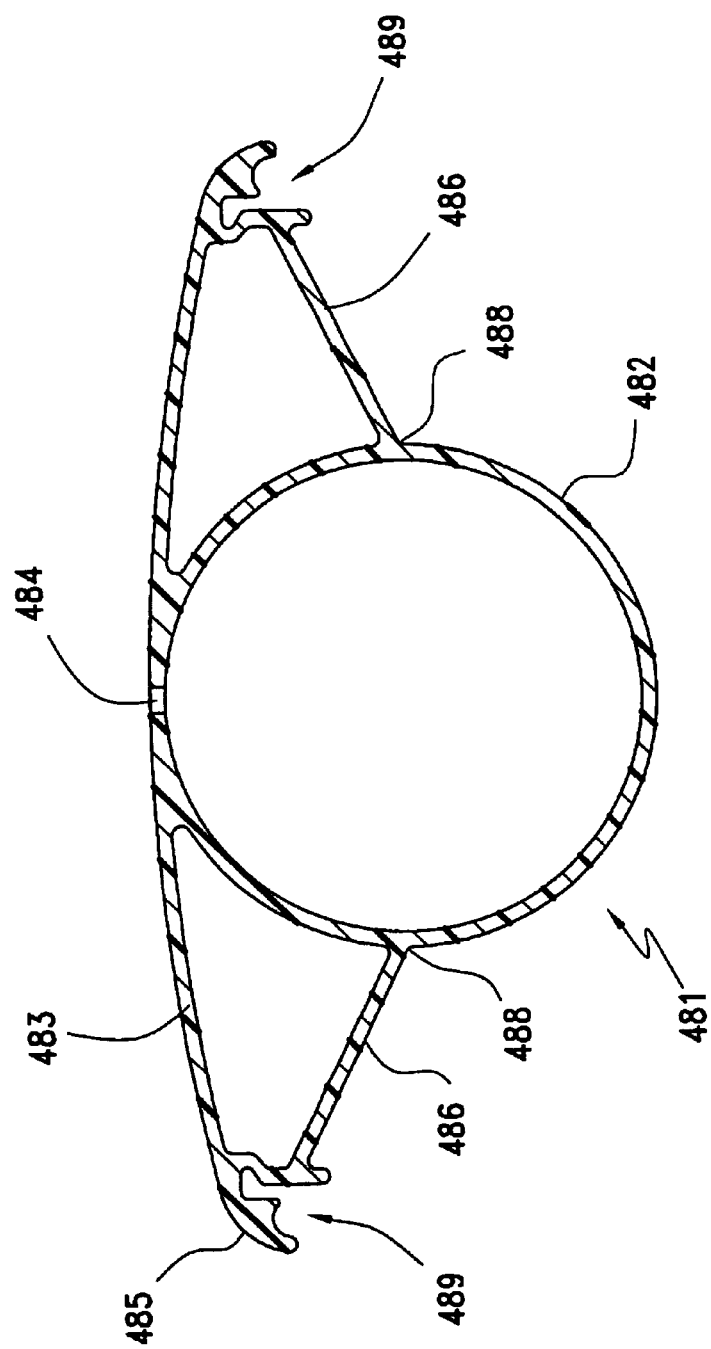
FIG. 54 is a transverse cross-section of yet another diffuser body design according to the present invention, having an edge securing and sealing arrangement like that of FIG. 12.

A particularly preferred form of body 481 is depicted in FIG. 54. It is in the form of an extruded assembly including, as integrally formed elements, a central portion 482, resembling plastic pipe of nominal 4 inch diameter, an overlying arcuate membrane support member 483 at the apex of the conduit, longitudinally spaced orifices 484 and curved transition surfaces 485 along each longitudinal edge of the support member. This support member, for example, may have a radius of approximately 18 inches and a width of approximately 10 inches overall, including the transition surfaces. The transition surfaces may for example have radii of about ¾ of an inch. Also part of the integral assembly are bracing webs 486 extending at an angle of, for example, about 64 degrees from the vertical, at each side of the pipe, extending from about its equator 488, up to a membrane edge-securing arrangement 489, similar to that of FIG. 12. The end-securing arrangement of that figure, or any other suitable end-securing arrangement, may be employed with this embodiment, and any suitable diffuser supporting arrangement may also be employed.

In any embodiment having a curved transition surface, also referred to above as a curved transition section, that surface may be smooth throughout, as shown in the various embodiments. However, in order to enhance securing and/or sealing of the membrane to the body, ridges may be formed in portions of these curved transition surfaces that are in contact with the membrane when it is inflated. Generally, it is preferred that these ridges have blunt rather than sharp edges and that they extend the entire length of the body. It is convenient to form them as integral parts when extruding the body.

FIG. 55

Figure 55:
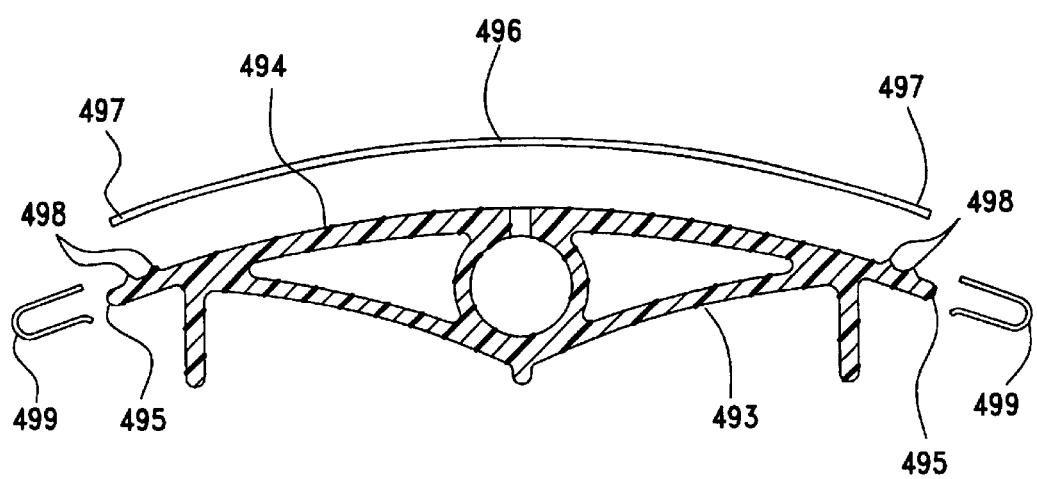
FIG. 55 is an exploded, transverse cross-section of yet another diffuser in accordance with the invention, which is a modification of that in FIG. 26.

However, as shown in FIG. 55, an exploded view, ridges can be used to similar advantage in other portions of a diffuser body. That figure discloses an embodiment having a body 493, similar to the body of FIG. 26, having support member 494 with longitudinal edges 495. FIG. 55 shows some longitudinally-running protrusions 498 in support member 494, located a short distance inward from the support member edges 497. These protrusions are of any suitable number and shape. For example, there may be one or more protrusions of inverted "U" or "V" shape, the latter preferably having blunted edges. Preferably, there are two or more of such protrusions near each edge 497. Still more preferably there is a pair of protrusions along each longitudinal edge 497, and there is lateral spacing, from one another, of the protrusions within each pair.

This embodiment includes a membrane edge-securing member, e.g., U-shaped clip 499 and a membrane end-securing member (not shown).

When the diffuser is assembled, the membrane 496 is secured and sealingly engaged to the support 494 with the aid of these securing members.

FIG. 56

Figure 56:
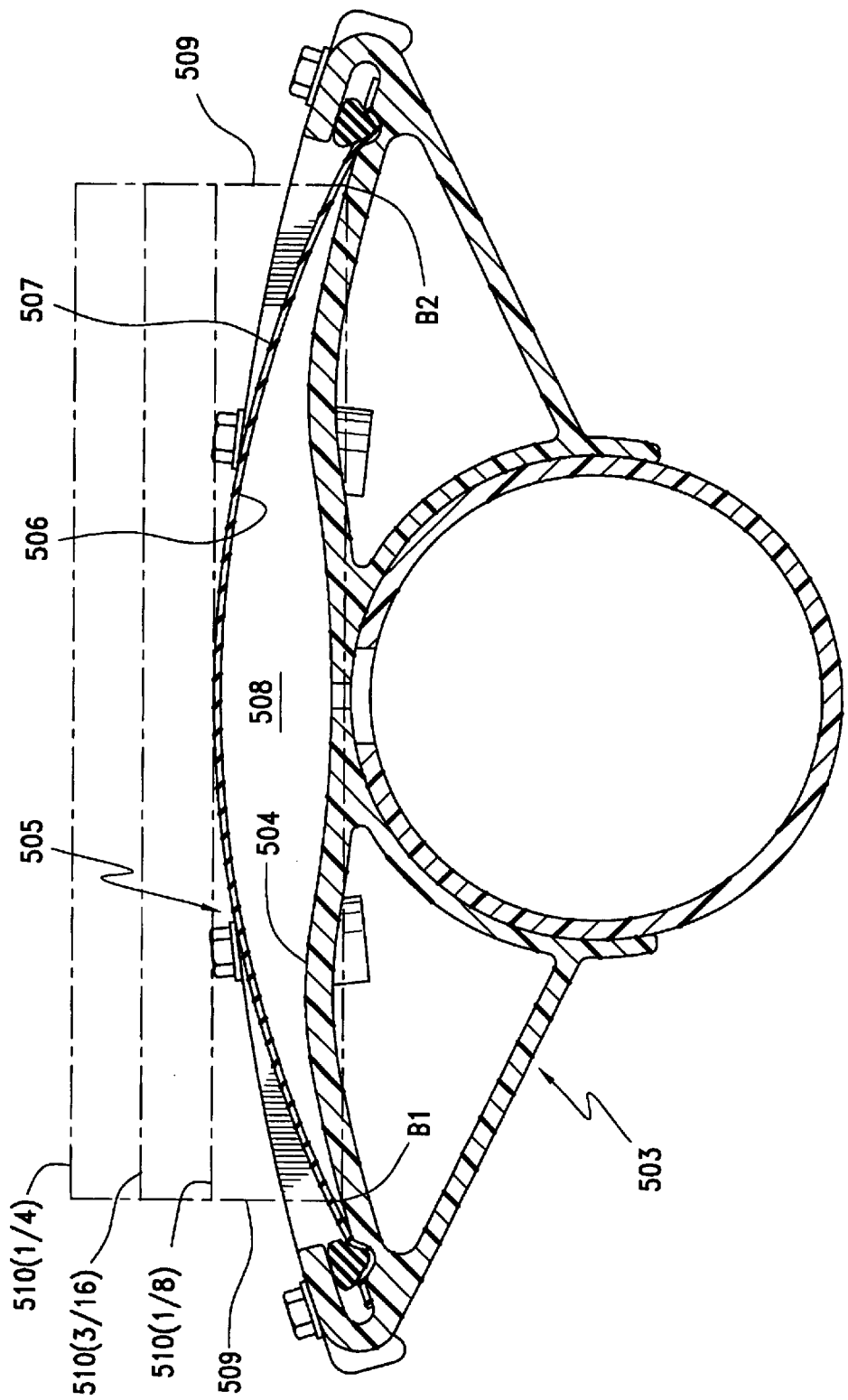
FIG. 56 is a transverse cross-section of a diffuser similar to that of FIG. 8 but in which the membrane is inflated and reference lines are supplied to show operating envelopes within which the membrane may be restrained.

According to a preferred embodiment of the invention, a body is configured and dimensioned to restrain a membrane, whatever its properties may be, within a specified operating envelope, under normal conditions of operating temperature and pressure for the membrane. This is illustrated by FIG. 56, showing diffuser body 503 with membrane support 504 and a membrane 505 having membrane gas influent surface 506 and gas discharge surface 507. FIG. 56 illustrates the principle of this embodiment using a diffuser similar to that of FIG. 8, but the principle may be readily applied to other embodiments of the invention.

According to this embodiment, when the membrane 505 is inflated, its gas discharge surface 507 is held by diffuser body 503 substantially within an envelope that, when viewed in a transverse cross-section of the body and membrane, such as in FIG. 55, has a base line that connects two points B1–B2. These are points at which the body and the gas influent surface of the membrane enter into contact with one another at the edges of a gas chamber 508 formed under the membrane. The vertical side lines 509 of the envelope are perpendicular to the base line at each of said points B1–B2. Top lines 510(⅛), 510(³⁄₁₆) and 510(¼) of three envelopes having a common base line B1–B2 respectively run parallel to, above and at a distance from the base line of about ¼ the distance, preferably about ³⁄₁₆ the distance and most preferably about ⅛ the distance, between the side lines.

Whether a given body complies with the preferred condition of being configured and dimensioned to restrain a given membrane, under normal conditions of operating temperature and pressure for the membrane, within any of the operating envelopes described above, may be determined in laboratory tests. For example, a complete diffuser, connected to a controllable air supply, may be submerged in a shallow tank with a transparent side through which the membrane may be observed. The tank may be as shallow as desired, provided there is sufficient depth to cover the apex of the membrane, when inflated, to a depth of at least about 12 inches. The elevation of the apex is measured with the membrane inflated and not inflated. The elevation of the inflated membrane apex is measured while air is supplied to the membrane at a rate, temperature and pressure drop across the membrane typical of or equivalent to ordinary operating conditions for the membrane. If the fraction resulting from dividing the difference in elevation of the apex in the inflated and uninflated states by the width of the diffuser gas chamber is within the range of up to about ¼, the diffuser body is in compliance.

A non-compliant diffuser, one for which the above-described fraction substantially exceeds ¼, may be brought into compliance by a number of measures and simple experiments which are well within the ability of one of ordinary skill in the art. For example, one may make one or more of the following adjustments and test the adjusted parts to determine whether the amount of adjustment has been sufficient or should be increased. One may increase the membrane thickness and/or modulus, increase the quantity of perforations, choose a style of perforation that discharges gas more readily, provide an inflation-limiting device or clamp the membrane into the diffuser in a pre-stretched condition.

FIGS. 57–62

A number of membrane end-sealing arrangements have already been mentioned and illustrated, for example those involving tape or metal bands, The present figures illustrate preferred end-sealing arrangements utilizing bands formed of elastomeric material, with or without the assistance of adhesive bonding. Such bands may be formed of any natural and/or synthetic elastomer that is reasonably stable in contact with the materials and other environmental factors present during operation of the diffusers.

Figure 57:
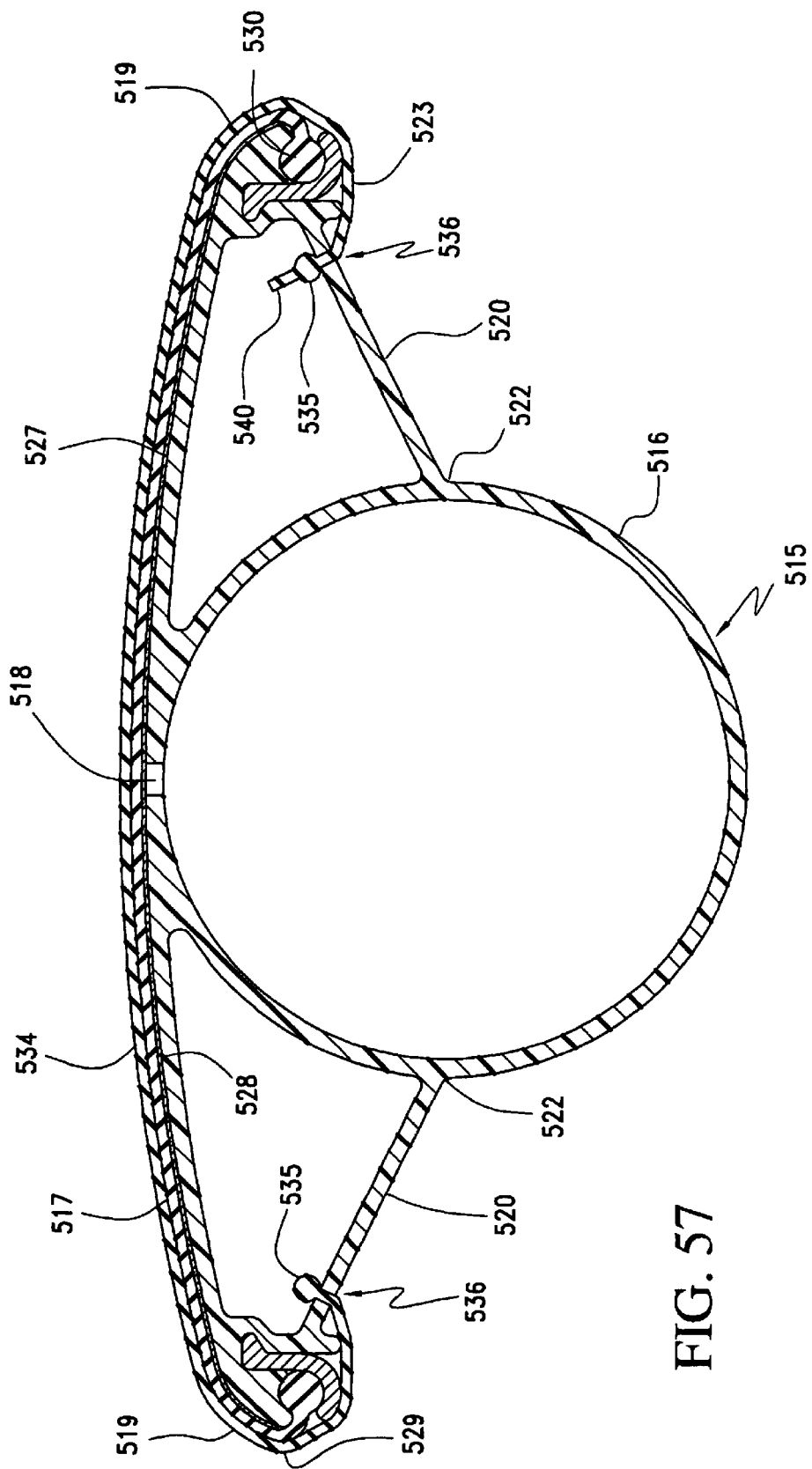
FIG. 57 is a transverse cross-section of a diffuser with a body similar to that of FIG. 54 but with a different end securing and sealing arrangement involving a rubbery strap and adhesive bonding with the aid of tape.
Figure 62:
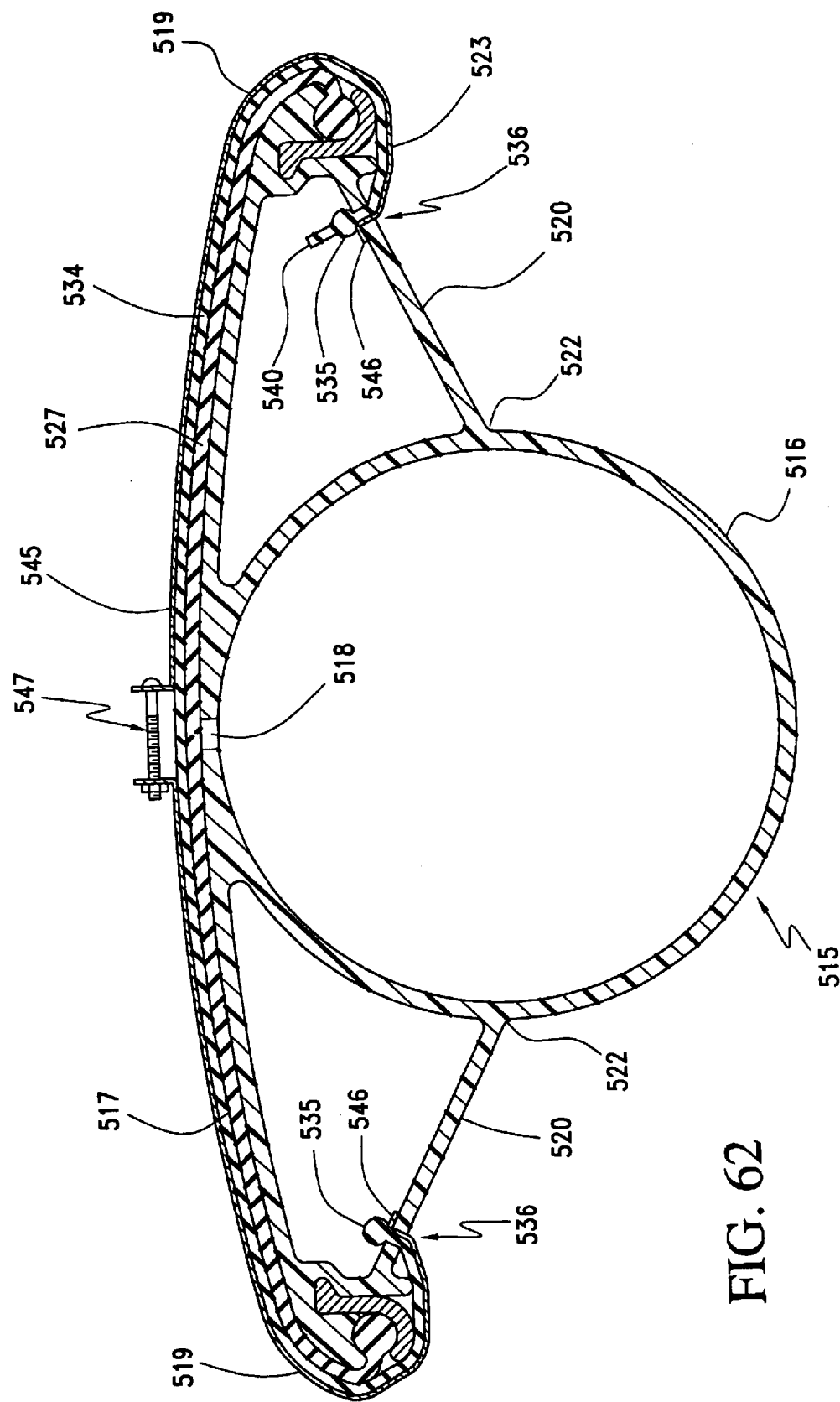
FIG. 62 is a transverse cross-section of a diffuser similar to that of FIG. 57 having yet another end securing and sealing arrangement employing a strap similar to that of FIGS. 57–61 and an auxiliary clamping means.

A particularly preferred form of this embodiment is shown in FIG. 57. It is similar to that of FIG. 54 in having an extruded body 515 with integrally formed central portion 516 resembling plastic pipe, overlying arcuate membrane support member 517, longitudinally spaced orifices 518, curved transition surfaces 519 and bracing webs 520 extending from the pipe at about its equator 522 up to a membrane edge-securing arrangement 523, similar to that of FIG. 12. The end-securing arrangement of this embodiment includes adhesive bonding and an elastomeric band.

Such bonding may be provided by one or more layers of adhesive applied to an end portion or portions of the support upper surface and/or the membrane underside. However, in the present embodiment, such bonding is provided by an elongated member, for example of flexible polymeric tape 528 having very high strength adhesive present on each of its major surfaces, preferably throughout said surfaces. This member extends transversely of the membrane 527 at an end thereof, between the upper surface of the support and the underside of the membrane, to adhesively bond the membrane to the support. The tape preferably extends from one lower tip 529 of left transition surface 519 over the entire expanses of that transition surface, of the support member 517, and of the opposite transition surface 519 to its lower tip 530.

Although some adhesive tapes, e.g., 5900 Series 3M double-sided VHB (very high bond) adhesive closed-cell foam tape, may provide sufficient bond strength to hold the membrane in place without other end-sealing aids, it is preferred, and a feature of this embodiment, to supplement the holding power of the tape with an elastomeric band, e.g., the rubbery strap 534 depicted in this figure and in FIGS. 58–61. As will be explained further below, the ends of this strap have fastening means 535 secured in slots 536, each provided in one of the webs 520.

FIGS. 58–61

Elastomeric strap 534 is formed of any suitable elastomer, preferably of EPDM rubber having a Shore hardness of about 60–70 and in any suitable shape. As shown, the strap is rectangular in the plan view of FIG. 58 and may for example be about one inch wide and about 12½ inches long. The fastening means 535 may for example be portions of the strap that are of enlarged but compressible cross section, e.g., elements of cylindrical cross-section, at each end of the strap. These elements may have a radius of for example about ¼ inch and one of them may be spaced inwardly from one end of the strap to provide a lead-in tab 540 of about 1 inch in length.

As shown in FIG. 57, strap 534 is stretched in longitudinal tension across the upper surface of membrane 527 at its ends, the strap fastening means 535 being secured to the body 515, e.g., in apertures, such as slots 536, located for example in the underside of the body, preferably in webs 520. The widths of slots 536, for example about ⅜ inches in this embodiment, are established to permit fastening means 535, when compressed, to enter the slots and to hold the re-expanded securing means in place once inserted. Lead-in tab 540 can assist in effecting insertion of its adjacent securing means after the other securing means is inserted and while the strap is under tension.

The ends of the membrane 527 and/or of the support 515 may if desired have complementary protrusions (not shown) formed in their respective lower and upper surfaces, e.g., protrusions in saw-tooth patterns that have the tooth ridges set transverse to the length of the membrane and/or the support. Then, the strap 534 may optionally have in its undersurface an array of complementary protrusions 541, as shown in FIGS. 59-61. If properly positioned relative to the saw-tooth patterns on the membrane and/or support, protrusions 541 can assist in maintaining the position and sealing of the membrane relative to the support.

FIG. 62

Another preferred embodiment, shown in this figure, is identical to that of FIG. 57, except that the tape 528 has been omitted and a supplementary metal band 545 has been added. It extends across the entire top surface of the elastomeric strap 534. The metal band may extend around the entire diffuser (not shown). Preferably, the metal band terminates in ends 546 fixed to the underside of the diffuser body. For example, the metal band ends may be of any appropriate shape, e.g., bent, to confine them within apertures formed in the underside of the diffuser body, preferably the same apertures 536 which are used to confine the ends of the polymeric strap 534. To accommodate the metal strap ends, apertures 536 may need to be slightly wider than those of the preceding embodiment. Tensioning means, such as a bolt and nut 547 or worm gear (not shown), may be included in the metal band to tighten it against the upper surface of the polymeric strap.

Persons skilled in the art will ready recognize that the foregoing are but a few illustrative examples of many different forms in which the present inventors' contribution to the art may be practiced. Thus, the invention should be construed to include all embodiments falling within the scope of the appended claims and all equivalents thereof.

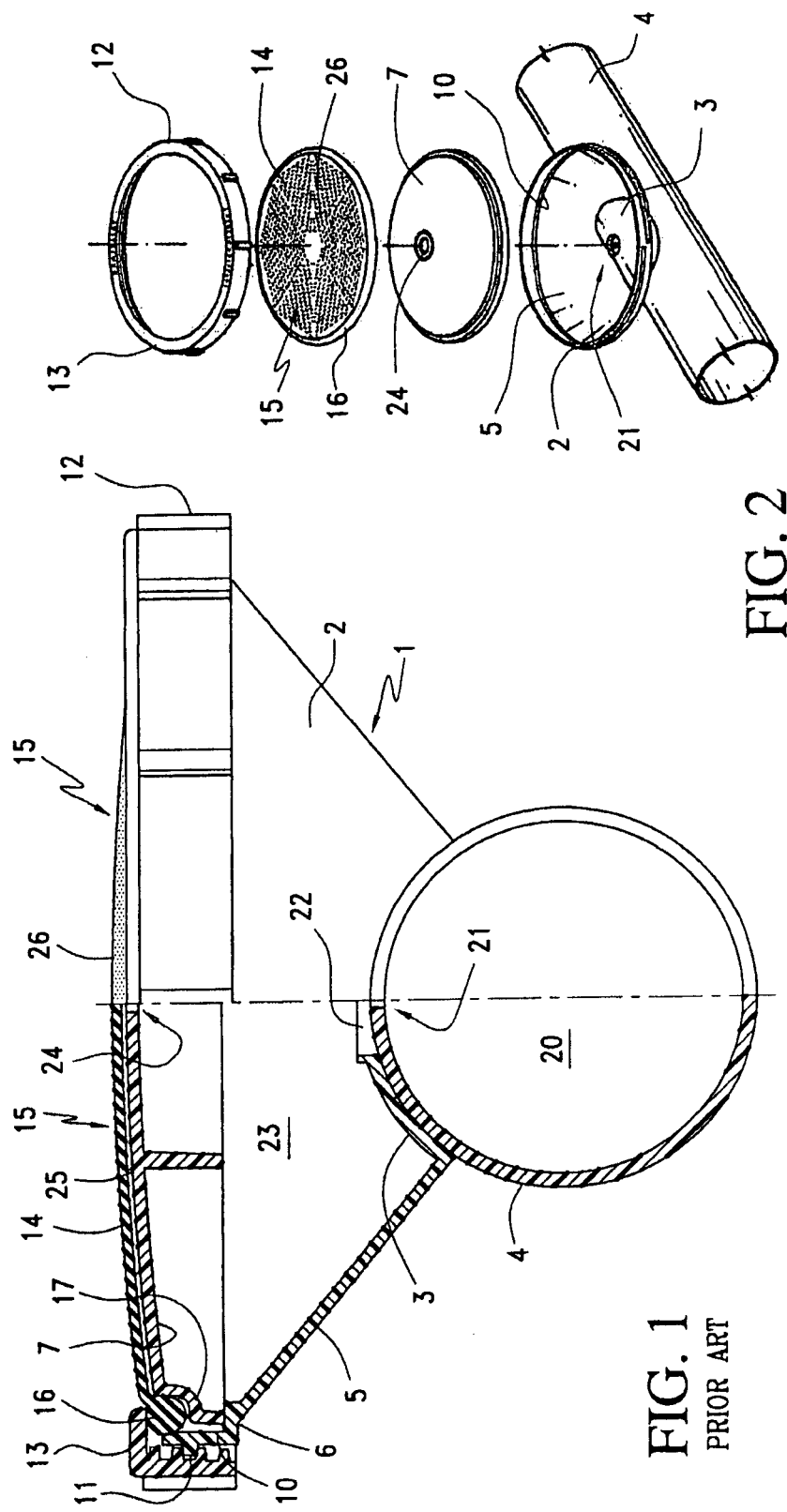

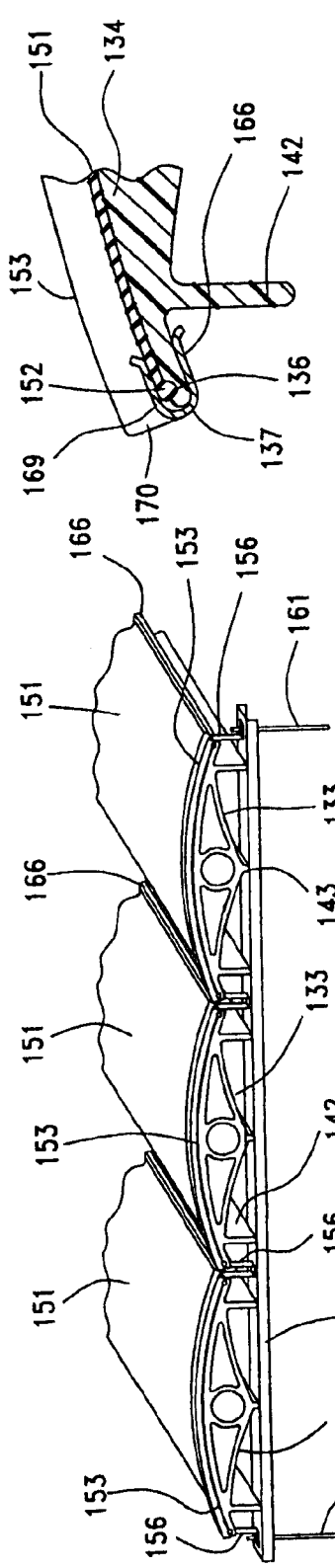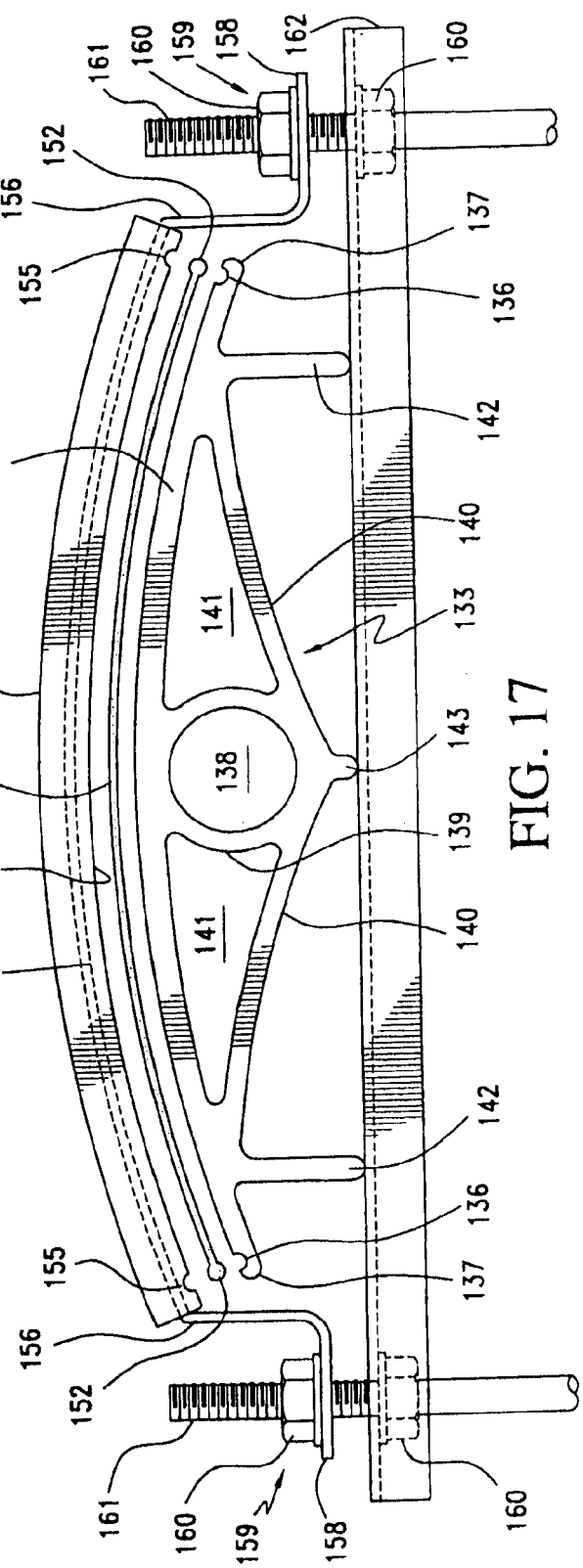

What is claimed is:

1. A strip diffuser comprising:
   A. a flexible membrane having
      (1) a length to width ratio of at least about 4, more preferably at least about 6, still more preferably at least about 8, and most preferably at least about 10,
      (2) gas influent and gas discharge surfaces, and
      (3) gas discharge pores extending from said gas influent surface through said membrane and through said gas effluent surface across at least a portion of said gas discharge surface,
   B. a diffuser body including a longitudinally-extending membrane support member with a length to width ratio of at least about 4, more preferably at least about 6, still more preferably at least about 8, and most preferably at least about 10,
   C. a longitudinally-extending gas supply channel that, when viewed in transverse cross-section, comprises circumferentially closed gas flow confining wall means
      (1) at least a portion of which wall means extends beneath and provides structural bracing for the support member along at least a major portion of the length of the support member, and
      (2) which wall means comprises one or more walls in addition to the support member,
   D. the respective lengths of the membrane, support member and channel extending in the same general direction, and
   E. the support member and the membrane, at least when the diffuser is operating, defining a longitudinally-extending gas chamber between them.

2. A diffuser according to claim 1 comprising a plurality of gas-injection passages, spaced longitudinally along the gas supply channel and extending from the interior of the gas supply channel through the membrane support member.

3. A diffuser according to claim 2 wherein said gas-injection passages are of sufficiently small flow cross-section to generate, during operation of said diffuser, sufficient pressure drop across said passages to contribute measurably to enhanced uniformity of distribution of gas flow among the respective passages, thus constituting flow regulating orifices.

4. A diffuser according to claim 1 wherein the membrane has a gas discharge surface that, when the membrane is operating, is held by the diffuser body substantially within an envelope that, when viewed in a transverse cross-section of the body and membrane, has
   A. a base line that connects two points at which the gas chamber is widest horizontally,
   B. vertical side lines perpendicular to the base line at each of said points, and
   C. a top line, running parallel to, above and at a distance from the base line of about ¼, more preferably about 3⁄16 and still more preferably about ⅛, of the distance between the side lines.

5. A diffuser according to claim 4 wherein the base line connects two points at which the support member and a gas influent surface of the membrane contact one another at the edges of the gas chamber.

6. A diffuser according to claim 1 comprising a flexible membrane of sheet material having sides and ends with longitudinal edges along its sides and wherein the gas discharge pores extend from said gas influent surface through said sheet.

7. A diffuser according to claim 1 wherein the support member is substantially wider, preferably at least about 1.5, more preferably at least about 2 and still more preferably at least about 2.5 times wider, than the gas supply channel, when both are viewed in transverse cross-section.

8. A diffuser according to claim 1 wherein the body is of extruded material.

9. A diffuser according to claim 1 wherein the gas supply channel comprises longitudinally extending confining wall means in addition to but integral with the membrane support member.

10. A diffuser according to claim 1 wherein the gas supply channel comprises longitudinally extending confining wall means formed separately from but secured directly or indirectly to the membrane support member.

11. A strip diffuser comprising:
  A. a flexible membrane of sheet material having
    (1) gas influent and gas discharge surfaces,
    (2) sides and ends with longitudinal edges along its sides,
    (3) a length to width ratio of at least about 4, more preferably at least about 6, still more preferably at least about 8, and most preferably at least about 10, and
    (4) gas discharge pores in at least a portion of its gas discharge surface,
  B. a diffuser body of extruded material including a longitudinally-extending membrane support member with a length to width ratio of at least about 4, more preferably at least about 6, still more preferably at least about 8, and most preferably at least about 10,
  C. a longitudinally-extending, circumferentially closed gas supply channel
    (1) at least a portion of which extends beneath and provides structural bracing for the support member along at least a major portion of the length of the support member, and
    (2) which comprises, as viewed in transverse cross-section, wall means in addition to the support member,
  D. the respective lengths of the membrane, support member and channel extending in the same general direction,
  E. the support member and the membrane, at least when the diffuser is operating, defining a gas chamber between them,
  F. a plurality of gas-injection passages, spaced longitudinally along the gas supply channel and extending from the interior of the gas supply channel through the membrane support member, said gas-injection passages being of sufficiently small flow cross-section to generate, during operation of said diffuser, sufficient pressure drop across said passages to contribute measurably to enhanced uniformity of distribution of gas flow among the respective passages, thus constituting flow regulating orifices, and
  G. said membrane gas discharge surface, when the membrane is operating, being held by the diffuser body substantially within an envelope that, when viewed in a transverse cross-section of the body and membrane, has
    (1) a base line that connects two points at which the gas chamber is widest horizontally,
    (2) vertical side lines perpendicular to the base line at each of said points, and
    (3) a top line, running parallel to, above and at a distance from the base line of about ¼, more preferably about 3/16 and still more preferably about ⅛, of the distance between the side lines.

12. A diffuser according to claim 11 wherein the gas supply channel comprises longitudinally extending confining wall means in addition to but integral with the membrane support member.

13. A diffuser according to claim 11 wherein the gas supply channel comprises longitudinally extending confining wall means formed separately from but secured directly or indirectly to the membrane support member.

14. A diffuser according to claim 1 wherein
  A. the diffuser body has
    (1) first and second longitudinal sides, and, at each of said sides, a fixed, first longitudinally-extending concave seal-engaging surface,
    (2) within a portion of the body adjacent each of said sides, a longitudinally-extending first, female securing member that appears as walls surrounding an open portion in the transverse cross-section of the body,
    (3) a second, male securing member comprising
      a. a second longitudinally-extending concave seal-engaging surface, and
      b. said second securing member further including a portion which
        1. is insertable into the first securing member, and
        2. has a shape adapted to cooperate with the shape of the first securing member, when inserted therein, to hold the first and second concave surfaces in fixed positions,
    (4) said first and second longitudinally-extending concave seal-engaging surfaces facing one another when the second securing member is inserted in the first securing member, and
  B. the membrane includes, along each of its longitudinal edges, a sealing member having a shape and size adapted to sealingly engage with said first and second concave seal-engaging surfaces.

15. A diffuser according to claim 14 wherein the first and second longitudinally-extending concave seal-engaging surfaces respectively face downward and upward.

16. A diffuser according to claim 14 wherein the support member has an upper surface and the first longitudinally-extending concave seal-engaging surface is in a portion of the body that includes an extension of the support member upper surface and reaches outwardly and downwardly from that upper surface.

17. A diffuser according to claim 14 wherein the second securing member, when viewed in transverse cross-section, resembles, at least in part, the shape of the letter "J".

18. A diffuser according to claim 14 wherein the first securing member comprises a slot extending longitudinally in the body, and the second securing member includes a portion that is insertable by longitudinal sliding motion into said slot.

19. A diffuser according to claim 18 wherein the second securing member extends through substantially the entire length of the slot.

20. A diffuser according to claim 14 wherein the first and second longitudinally-extending concave seal-engaging surfaces are arcuate surfaces and the sealing members of the membrane include O-ring seals extending along longitudinal edges of the membrane.

21. A diffuser according to claim 1 wherein
A. a plurality of gas-injection passages are spaced longitudinally along the gas supply channel and extend from the interior of the gas supply channel through the membrane support member,
B. the membrane support member has an upper surface for supporting the gas influent surface of the membrane when the diffuser is not in operation,
C. a depression extends longitudinally in said upper surface, and
D. at least a portion of the gas-injection passages have outlets positioned to communicate with the interior of said depression.

22. A diffuser according to claim 21 wherein a plurality of said outlets open into said depression.

23. A diffuser according to claim 21 wherein the depression, as viewed in transverse cross-section, comprises rectilinear surfaces.

24. A diffuser according to claim 21 wherein the depression, as viewed in transverse cross-section, comprises an arcuate surface.

25. A diffuser according to claim 21 wherein
A. the depression is sufficiently narrow in the transverse direction and the membrane is sufficiently resistant to stretching in the transverse direction, so that the membrane does not collapse against such outlets when the gas effluent surface of the installed diffuser is under hydrostatic pressure but the diffuser is not in operation,
B. whereby the gas influent surface of the membrane does not block said outlets during startup of the diffuser.

26. A diffuser according to claim 21 wherein
A. a depression extends longitudinally in the upper surface of the support member,
B. membrane end-sealing and securing members are positioned at the ends of the membranes, and
C. the membrane end-sealing and securing members include convex portions which, as viewed in transverse cross-section, are sufficiently compatible in profile to the depression for exerting downward pressure on the membranes within the depression,
D. thereby inducing transverse tension in the membrane at said ends for assisting in sealing the membrane at its ends.

27. A diffuser according to claim 1 comprising membrane end-sealing and securing members positioned at the ends of the membranes.

28. A diffuser according to claim 1 comprising
A. longitudinal membrane edge-sealing and securing members extending lengthwise of said support members and membranes, and
B. membrane end-sealing and securing members positioned at the ends of the membranes.

29. A diffuser according to claim 1 comprising
A. longitudinal membrane edge-sealing and securing members extending lengthwise of said support members and membranes, and having
(1) first surfaces in contact with said membrane and
(2) second surfaces not in contact with said membrane, and
B. membrane end-sealing and securing members positioned at the ends of the membranes,
C. at least portions of said end-sealing and securing members bearing against the second surfaces of the edge-sealing and securing members.

30. A diffuser according to claim 29 wherein said end-sealing and securing members bear against the edge-sealing and securing members in a direction toward the membrane support member upper surface.

31. A diffuser according to claim 29 wherein said end-sealing and securing members, in the installed diffuser, bear at least in part downwardly against said edge-sealing and securing members.

32. A diffuser according to claim 1 wherein there are protrusions from one or more surfaces of the membrane at its longitudinal edges that extend along the length of the membrane, there are grooves having transverse cross-section complementary to the protrusions on a surface that is part of the support member or an extension thereof, and said protrusions and grooves cooperate to at least assist in securing and/or sealing the membrane to said surface of the support member or extension thereof.

33. A diffuser according to claim 1 wherein the membrane support member has longitudinal edges and there are protrusions from a surface of the support member or of an extension thereof, said protrusions extending along the length of said support member or extension, and the protrusions contact and compress the membrane in the vicinity of such contact to at least assist in securing or sealing the membrane to a surface of the support member or extension thereof.

34. A diffuser according to claim 1 wherein the membrane support member comprises
A. an upper surface and
B. extensions in the form of longitudinally extending skirts that depend from the sides of said upper surface,
C. these skirts respectively having membrane-contacting surfaces that are inclined downwardly from portions of the upper surface which they adjoin, preferably by an angle of at least about 30 degrees, more preferably at least about 45 degrees, and still more preferably at least about 60 degrees.

35. A diffuser according to claim 34 wherein the membrane support member has an upper surface portion adjoining the skirt which, in the installed diffuser, is generally horizontal.

36. A diffuser according to claim 34 wherein the skirt, in the installed diffuser, is generally upright.

37. A diffuser according to claim 34 wherein the membrane support member has an upper surface portion adjoining the skirt which, in the installed diffuser, is generally horizontal, and the skirt, in the installed diffuser, is generally upright.

38. A diffuser according to claim 34 wherein said upper surface and the membrane-contacting surfaces of the skirts are connected with one another through transition surfaces that, as viewed in transverse cross-section, provide gradual change in direction between the connected surfaces.

39. A diffuser according to claim 38 wherein the transition surfaces are generally curved.

40. A diffuser according to claim 34 in which
A. the skirts have outer membrane-contacting surfaces, and
B. the membrane support members comprise further extensions in the form of longitudinally running flanges attached to the skirts, which flanges, as viewed in transverse cross-section,
(1) have undersurfaces that are angled relative to the membrane-contacting surfaces of the skirts, and
(2) are positioned below that portion of the membrane support member in which the support member upper surface is located.

41. A gas diffusion system for distributing gas in the form of bubbles into a liquid comprising:
A. a tank having a bottom and upwardly extending sides for holding the liquid,
B. a pipe grid, located substantially below the intended level of the surface of the liquid in the tank, said grid including
  (1) one or more manifolds and
  (2) one or more branch conduits that
    a. are in communication with the manifold(s) to receive flowing gas therefrom,
    b. that have circumferentially closed wall means to receive, confine and convey said flowing gas, and
C. plural diffusers respectively comprising
  (1) extruded diffuser bodies
    a. respectively including longitudinally-extending membrane support members having a length to width ratio of at least about 4, more preferably at least about 6, still more preferably at least about 8, and most preferably at least about 10,
    b. having the long dimensions of the respective support members oriented in the same general direction as the lengths of the branch conduits, and
    c. having longitudinally-extending gas-confining wall means in addition to the membrane support members
  (2) flexible membranes secured to the diffuser bodies and respectively having
    a. gas influent and gas discharge surfaces,
    b. sides and ends with longitudinal edges along its sides,
    C. a length to width ratio of at least about 4, more preferably at least about 6, still more preferably at least about 8, and most preferably at least about 10, and
    d. gas discharge pores in at least a portion of its gas discharge surface,
  (3) the support members and membranes forming, at least when the diffusers are in operation, longitudinally-extending gas chambers that
    a. represent gas spaces in addition to the spaces in the interiors of the branch conduits and
    b. provide gas to the gas discharge pores, and
D. plural gas-injection passages (1) at longitudinally spaced positions along the branch conduits,
  (2) through the wall means of the branch conduits
  (3) providing communication between the interiors of the branch conduits and the gas chambers, and
  (4) wherein a plurality of gas chambers are each served by a plurality of said passages spaced along the lengths of those chambers.

42. A gas diffusion system for distributing gas according to claim 41 wherein said liquid is wastewater, which may contain suspended solids, said gas is oxygen-containing gas and said tank is an aeration tank of a wastewater treatment plant.

43. A gas diffusion system for distributing gas according to claim 41 comprising a plurality of branch conduits connected to one or more manifolds, and a plurality of said branch conduits each including a plurality of said diffusers, wherein the longitudinally-extending gas-confining wall means represent portions of the branch conduits of the pipe grid.

44. A gas diffusion system for distributing gas according to claim 41 wherein branch conduits constitute gas supply conduits of the diffuser bodies to supply flowing gas to the diffusers and throughout a substantial portion of their respective lengths, the membrane supports and the supply conduits have a connective relation such that the membrane supports either may be integral with the supply conduits or may be formed separately from but are joined with the supply conduits in any suitable manner.

45. A diffuser according to claim 14 wherein means are provided to reduce friction during sliding motion between: (a) any one or more surfaces of the second securing member and (b) any one or more areas of the first securing member and/or of the sealing member.

46. A diffuser according to claim 45 wherein said means to reduce friction comprises one or more layers of low friction material interposed between adjoining portions of said surfaces and of said areas and that may optionally be adherent to portions of said surfaces or areas.

47. A diffuser according to claim 27 comprising an end sealing arrangement including a band of elastomeric material, extending across the membrane at its end.

48. A diffuser according to claim 27 comprising an end sealing arrangement including adhesive bonding of the underside of the membrane to the upper surface of the support.

49. A diffuser according to claim 47 comprising an end sealing arrangement including a supplemental band installed across the upper surface of the elastomeric band.

50. A diffuser according to claim 32 wherein said protrusions and grooves are of dove-tail cross-section.

51. A diffuser according to claim 1 wherein the diffuser body length to width ratio is at least about 6.

52. A diffuser according to claim 51 wherein the membrane length to width ratio is at least about 6.

53. A diffuser according to claim 1 wherein the diffuser body length to width ratio is at least about 8.

54. A diffuser according to claim 53 wherein the membrane length to width ratio is at least about 8.

55. A diffuser according to claim 1 wherein the diffuser body length to width ratio is at least about 10.

56. A diffuser according to claim 53 wherein the membrane length to width ratio is at least about 10.

57. A diffuser according to claim 1 wherein, in addition to the structural bracing provided to the support member by the wall means of the gas supply channel, further structural bracing is provided to the support member by web members included in the diffuser body.

58. A diffuser according to claim 1 wherein the membrane support member comprises
  A. a first region connected with the gas supply channel along at least a major portion of the lengths of the support member and gas supply channel respectively, and
  B. second and third regions that extend longitudinally along the length of the support member and, when viewed in transverse cross-section with the diffuser in its installed orientation, are to the left and right of the first region and extend into space beyond the connection between the support member and the gas supply channel.

59. A diffuser according to claim 1 wherein the support member has longitudinal edges and the membrane support comprises
  A. a first region that represents a longitudinally extending central portion of the support member through which the support member is integrally formed with an underlying upper portion of the gas supply channel along substantially the entire lengths of the support member and gas supply channel, and
  B. second and third regions that extend longitudinally along the length of the support member, that comprise the longitudinal edges of the support member and that, when viewed in transverse cross-section with the diffuser in its installed orientation, are to the left and right of the first region and extend into space beyond the connection between the support member and the gas supply channel.

60. A diffuser according to claim 59 wherein the second and third regions are, with the diffuser is in its installed orientation, substantially horizontal.

61. A diffuser according to claim 59 wherein the diffuser body length to width ratio is at least about 8.

62. A diffuser according to claim 59 wherein the diffuser body length to width ratio is at least about 8, the diffuser body comprises a plurality of gas-injection passages, spaced longitudinally along the gas supply channel, that extend from the interior of the gas supply channel through the membrane support member and that are of sufficiently small flow cross-section to generate, during operation of said diffuser, sufficient pressure drop across said passages to contribute measurably to enhanced uniformity of distribution of gas flow among the respective passages, thus constituting flow regulating orifices.

63. A diffuser according to claim 1 wherein marginal portions of the membrane are secured in gas-tight relationship with the diffuser body by longitudinally-extending securing members in longitudinally-extending slots or grooves provided in that body.

64. A diffuser according to claim 63 wherein the membrane marginal portions, where secured in the diffuser body, comprise U-shaped portions.

65. A diffuser according to claim 63 wherein the securing members are longitudinally-extending strips inserted into said slots or grooves with the membrane marginal portions.

66. A diffuser according to claim 63 wherein the securing members comprise wedge-shaped surfaces.

67. A diffuser according to claim 63 wherein the securing members comprise outer surfaces that engage and exert compression on surfaces of the membrane marginal portions.

68. A diffuser according to claim 63 wherein the membrane marginal portions, where secured in the diffuser body, comprise U-shaped portions and the securing members comprise outer surfaces that engage and exert compression on interior surfaces of the U-shaped membrane marginal portions.

69. A diffuser according to claim 63 wherein the slots or grooves, as viewed in transverse cross-section, comprise mouths and walls, the membrane marginal portions, where secured in the diffuser body, comprise U-shaped portions, and the securing members comprise wedge- shaped surfaces that engage and compress the secured U-shaped portions against the walls of the slots or grooves.

70. A diffuser. according to claim 63 wherein the slots or grooves, as viewed in transverse cross-section, are below the support member upper surface and the marginal portions of the membrane pass downwardly from each side of the upper surface of the support member and then into the slots or grooves.

71. A diffuser according to claim 70 wherein the marginal portions of the membrane pass laterally and downwardly from each side of the upper surface of the support member over curved surfaces at the sides of the support member and then into the slots or grooves.

72. A diffuser according to claim 63 wherein the slots or grooves are provided in side walls of the diffuser body.

73. A diffuser according to claim 1 wherein

A. marginal portions of membrane, as viewed in transverse cross- section, pass laterally and downwardly from each side of the upper surface of the support member over curved surfaces at the sides of the support member, B. the marginal portions of the membrane comprise portions secured in gas-tight relationship with the diffuser body by longitudinally- extending securing members that have nose portions that engage and exert compression against the secured membrane marginal portions along the length thereof, C. the securing member nose portions exert their compression upon the membrane in receptacles in the form of longitudinally-extending slots or grooves provided in the diffuser body below the support member upper surface.

74. A diffuser according to claim 73 wherein the diffuser body and membrane length to width ratios are at least about 10.

75. A diffuser according to claim 4 wherein the top line runs at a distance from the base line of about 3/16 of the distance between the side lines.

76. A diffuser according to claim 4 wherein the top line runs at a distance from the base line of about 1/8 of the distance between the side lines.

77. A diffuser according to claim 1 wherein the support member is at least about 1.5 times wider than the gas supply channel, when both are viewed in transverse cross-section.

78. A diffuser according to claim 1 wherein the support member is at least about 2 times wider than the gas supply channel, when both are viewed in transverse cross-section.

79. A diffuser according to claim 1 wherein the support member is at least about 2.5 times wider than the gas supply channel, when both are viewed in transverse cross-section.

80. A diffuser according to claim 41 wherein the diffuser body length to width ratio is at least about 8.

81. A diffuser according to claim 80 wherein the membrane length to width ratio is at least about 8.

82. A diffuser according to claim 41 wherein the diffuser body length to width ratio is at least about 10.

83. A diffuser according to claim 82 wherein the membrane length to width ratio is at least about 10.

84. A diffuser according to claim 41 wherein, in addition to the structural bracing provided to the support members by the wall means of the gas supply channels, further structural support is provided to the support members by web members included in the diffuser bodies.

85. A diffuser according to claim 41 wherein the membrane support member comprises A. a first region connected with the gas supply channel along at least a major portion of the lengths of the support member and gas supply channel respectively, and B. second and third regions that extend longitudinally along the length of the support member and, when viewed in transverse cross-section with the diffuser in its installed orientation, are to the left and right of the first region and extend into space beyond the connection between the support member and the gas supply channel.

86. A diffuser according to claim 41 wherein the support member has longitudinal edges and the membrane support comprises A. a first region that represents a longitudinally extending central portion of the support member through which the support member is integrally formed with an underlying upper portion of the gas supply channel along substantially the entire lengths of the support member and gas supply channel, and B. second and third regions that extend longitudinally along the length of the support member, that comprise the longitudinal edges of the support member and that, when viewed in transverse cross-section with the diffuser in its installed orientation, are to the left and right of the first region and extend into space beyond the connection between the support member and the gas supply channel.

87. A diffuser according to claim 86 wherein, with the diffuser in its installed orientation, the second and third regions are substantially horizontal.

88. A diffuser according to claim 86 wherein the diffuser body length to width ratio is at least about 8, the diffuser body comprises a plurality of gas-injection passages, spaced longitudinally along the gas supply channel, that extend from the interior of the gas supply channel through the membrane support member and that are of sufficiently small flow cross-section to generate, during operation of said diffuser, sufficient pressure drop across said passages to contribute measurably to enhanced uniformity of distribution of gas flow among the respective passages, thus constituting flow regulating orifices.

89. A diffuser according to claim 86 wherein the diffuser body and membrane have length to width ratios of at least about 10.

90. A diffuser according to claim 34 wherein the skirt membrane-contacting surfaces are inclined downwardly, from portions of the upper surface which they adjoin, by an angle of at least about 30 degrees.

91. A diffuser according to claim 34 wherein the skirt membrane-contacting surfaces are inclined downwardly, from portions of the upper surface which they adjoin, by an angle of at least about 45 degrees.

92. A diffuser according to claim 34 wherein the skirt membrane-contacting surfaces are inclined downwardly, from portions of the upper surface which they adjoin, by an angle of at least about 60 degrees.

93. A gas diffusion system for distributing gas in the form of bubbles into a liquid comprising:
   A. a tank having a bottom and upwardly extending sides for holding the liquid,
   B. a pipe grid, located substantially below the intended level of the surface of the liquid in the tank, said grid including
      1. one or more manifolds, and
      2. one or more branch conduits that
         a. are in communication with the manifold(s) to receive flowing gas therefrom,
         b. have peripherally closed wall means to receive, confine and convey said flowing gas, and
         c. Are held in fixed position in the tank,
   C. plural diffusers respectively comprising
      1. extruded diffuser bodies supported in a fixed, stationary position relative to the tank bottom,
         a. respectively including longitudinally-extending membrane support members that have generally horizontal upper surfaces, parallel sides and length to width ratio of at least about 6,
         b. having the long dimensions of the respective support members oriented in the same general direction as the lengths of the branch conduits,
         c. having longitudinally-extending gas-confining wall means in addition to the membrane support members, and
         d. being generally rectangular in appearance when viewed from above,
      2. flexible membranes secured to the diffuser bodies and respectively having
         a. gas influent and gas discharge surfaces,
         b. sides and ends, with parallel longitudinal edges along their sides,
         c. a length to width ratio of at least about 6, and
         d. gas discharge pores in at least portions of their gas discharge surfaces,
      3. the support members and membranes forming, at least when the diffusers are in operation, longitudinally-extending gas chambers that
         a. represent gas spaces in addition to the spaces in the interiors of the branch conduits, and
         b. provide gas to the gas discharge pores, and
   D. plural gas-injection passages
      1. at longitudinally spaced positions along the branch conduits,
      2. through the wall means of the branch conduits,
      3. providing communication between the interiors of the branch conduits and the gas chambers, and
      4. wherein a plurality of gas chambers are each served by a plurality of said passages spaced along the lengths of those chambers.

94. A gas diffusion system according to claim 93 wherein the membrane support members have longitudinal edges and comprise respectively
   A. first regions that represent longitudinally extending central portions of the support members through which the support members are integrally formed with underlying upper portions of the branch conduits along substantially the entire lengths of the support members and branch conduits, and
   B. second and third regions that extend longitudinally along the lengths of the support members, that comprise the longitudinal edges of the support members and that, when viewed in transverse cross-section with the diffuser in its installed orientation, are to the left and right of the first region and extend into space beyond the connection between the support member and the gas supply channel, and
   C. marginal portions of the membranes are secured in gas-tight relationship with the diffuser bodies by longitudinally-extending securing members in longitudinally-extending slots or grooves provided in said bodies.

95. A gas diffusion system according to claim 94 wherein the securing members are present with marginal portions of the membranes in the slots or grooves.

* * * * *

UNITED STATES PATENT AND TRADEMARK OFFICE
CERTIFICATE OF CORRECTION

PATENT NO. : 7,255,333 B2
APPLICATION NO. : 10/639774
DATED : August 14, 2007
INVENTOR(S) : Thomas J. Casper et al.

It is certified that error appears in the above-identified patent and that said Letters Patent is hereby corrected as shown below:

In the drawings:
Sheet 1 of 22: In FIG. 1, reference number 11, its lead line and reference number 10 on the left of the drawing (bottom of the sheet) were inadvertently partially cut off.
Sheet 8 of 22: In FIG. 19, reference number 156 and its lead line on the left of the drawing (bottom of the sheet) were inadvertently partially cut off. In FIG. 17, reference numbers 159 and 158 on the left of the drawing (bottom of the sheet) were inadvertently partially cut off.

In column 2:
Line 23: delete "to".
Line 26: add -- in FIG. 3 -- after "shown".
Line 54: delete "provides" and substitute -- provide -- therefor.

In column 3:
Line 61: delete "one" and substitute -- a first -- therefor.
Line 62: delete "comprising" and substitute -- for use within a liquid tank having a bottom and upwardly extending sides. The diffuser comprises -- therefor.

In column 4:
Line 1: delete "effluent" and substitute -- discharge -- therefor.
Lines 9-10: delete "circumferentially" and substitute -- peripherally -- therefor.
Line 19: add -- The diffuser is supported in a fixed, stationary position relative to the tank bottom. -- after "them.".
Line 63: add -- the -- before "gas".

Signed and Sealed this

Twenty-fourth Day of August, 2010

David J. Kappos
*Director of the United States Patent and Trademark Office*

In column 5:
Between Lines 2 and 3: add
-- The first aspect of the invention also includes embodiments wherein, in addition to the structural bracing provided to the support member by the wall means of the gas supply channel, further structural bracing is provided to the support member by web members included in the diffuser body.

In other embodiments, the membrane support member comprises a first region connected with the gas supply channel along at least a major portion of the lengths of the support member and gas supply channel respectively. Second and third regions extend longitudinally along the length of the support member. When these are viewed in transverse cross-section with the diffuser in its installed orientation, they are to the left and right of the first region and extend into space beyond the connection between the support member and the gas supply channel.

There are also embodiments in which the support member has longitudinal edges and the membrane support comprises a first region that represents a longitudinally extending central portion of the support member. Through this region the support member is integrally formed with an underlying upper portion of the gas supply channel along substantially the entire lengths of the support member and gas supply channel. Second and third regions are also present. They extend longitudinally along the length of the support member. Also, they comprise the longitudinal edges of the support member. When viewed in transverse cross-section with the diffuser in its installed orientation, they are to the left and right of the first region and extend into space beyond the connection between the support member and the gas supply channel.

The foregoing embodiment in which the support member first region is integrally formed with an underlying upper portion of a gas supply channel has a number of optional additional features. According to one such option, with the diffuser in its installed orientation, the second and third regions are substantially horizontal. According to another such option, the diffuser body length to width ratio is at least about 8. In another option the diffuser body length to width ratio is again at least about 8, and the diffuser body comprises a plurality of gas-injection passages, spaced longitudinally along the gas supply channel, that extend from the interior of the gas supply channel through the membrane support member and that are of sufficiently small flow cross-section to generate, during operation of said diffuser, sufficient pressure drop across said passages to contribute measurably to enhanced uniformity of distribution of gas flow among the respective passages, thus constituting flow regulating orifices.

In yet another embodiment of the first aspect of the invention, marginal portions of the membrane are secured in gas-tight relationship with the diffuser body by longitudinally-extending securing members in longitudinally-extending slots or grooves provided in that body. Optionally, membrane marginal portions, where secured in the diffuser body, may comprise U-shaped portions. The securing members optionally may be longitudinally-extending strips inserted into said slots or grooves with the membrane marginal portions, or may comprise wedge-shaped surfaces or may comprise outer surfaces that engage and exert compression on surfaces of the membrane marginal portions. Also, the membrane marginal portions, where secured in the diffuser body, may comprise U-shaped portions and the securing members may comprise outer surfaces that engage and exert compression on interior surfaces of the U-shaped membrane marginal portions. In yet another optional form of the present embodiment having longitudinally-extending securing members in longitudinally-extending slots or grooves, the slots or grooves, as viewed in transverse cross-section, comprise mouths and walls, the membrane marginal portions, where secured in the diffuser body, comprise U-shaped portions, and the securing members comprise wedge-shaped surfaces that engage and compress the secured U-shaped portions against the walls of the slots or grooves. According to another option, the slots or grooves are provided in side walls of the diffuser body. In still another option, the slots or grooves, as viewed in transverse cross-section, are below the support member upper surface and the marginal portions of the membrane pass downwardly from each side of the upper surface of the support member and then into the slots or grooves. In practicing the last-mentioned option, the marginal portions of the membrane may pass laterally and downwardly from each side of the upper surface of the support member over curved surfaces at the sides of the support member and then into the slots or grooves.

The first aspect of the invention also includes embodiments in which: marginal portions of membrane, as viewed in transverse cross-section, pass laterally and downwardly from each side of the upper surface of the support member over curved surfaces at the sides of the support member; the marginal portions of the membrane comprise portions secured in gas-tight relationship with the diffuser body by longitudinally-extending securing members that have nose portions that engage and exert compression against the inner portions of the secured membrane marginal portions along the length thereof; and the securing member nose portions exert their compression upon the membrane in receptacles in the form of longitudinally-extending slots or grooves provided in the diffuser body below the support member upper surface. Optionally, in these embodiments, the diffuser body and membrane length to width ratios are at least about 10. -- after "member.".

Line 3: delete "another" and substitute -- a -- therefor.
    Lines 3 and 4: delete "representing a" and substitute -- referred to as the -- therefor.
    Line 4: add -- is for use within a liquid tank having a bottom and upwardly extending sides. The diffuser -- after "diffuser".
    Line 16: delete "circumferentially" and substitute -- peripherally -- therefor.
    Line 43: add -- The diffuser is supported in a fixed, stationary position relative to the tank bottom. -- after "lines.".

In column 7:
Line 10: delete "are".
Line 39: delete "membranes, and have" and substitute -- membranes and having -- therefor.
    Line 41: add -- further comprise -- before "membrane end-sealing".
    Line 60: delete "cross-section" and substitute -- cross-sections -- therefor.

In column 8:
Line 44: delete "invention" and substitute -- invention, referred to as the third aspect, -- therefor.
    Line 47: add -- and -- after "liquid,".
    Line 52: delete "circumferentially" and substitute -- peripherally -- therefor.
    Line 63: delete "members," and substitute -- members. These diffusers are supported in a fixed, stationary position relative to the tank bottom. -- therefor.
    Line 64: delete "in" and substitute -- In -- therefor.

In column 9:
Line 7: delete "its" and substitute -- their -- therefor.
Line 10: delete "its" and substitute -- their -- therefor.
    Line 11: delete "surface" and substitute -- surfaces -- therefor.

Between lines 22 and 23: add
-- The third aspect of the invention may also be practiced in ways wherein, in addition to the structural bracing provided to the support members by the wall means of the gas supply channels, further structural bracing is provided to the support members by web members included in the diffuser bodies.

In other embodiments of the third aspect, the membrane support member comprises a first region connected with the gas supply channel along at least a major portion of the lengths of the support member and gas supply channel respectively. Second and third regions extend longitudinally along the length of the support member. When these are viewed in transverse cross-section with the diffuser in its installed orientation, they are to the left and right of the first region and extend into space beyond the connection between the support member and the gas supply channel.

There are also embodiments of the third aspect in which the support member has longitudinal edges and the membrane support comprises a first region that represents a longitudinally extending central portion of the support member. Through this region the support member is integrally formed with an underlying upper portion of the gas supply channel along substantially the entire lengths of the support member and gas supply channel. Second and third regions are also present. They extend longitudinally along the length of the support member. Also, they comprise the longitudinal edges of the support member. When viewed in transverse cross-section with the diffuser in its installed orientation, they are to the left and right of the first region and extend into space beyond the connection between the support member and the gas supply channel.

Optionally, in the embodiments of the preceding paragraph, with the diffuser in its installed orientation, the second and third regions are substantially horizontal. In another optional form of the embodiments of the preceding paragraph, the diffuser body length to width ratio is at least about 8, the diffuser body comprises a plurality of gas-injection passages, spaced longitudinally along the gas supply channel, that extend from the interior of the gas supply channel through the membrane support member and that are of sufficiently small flow cross-section to generate, during operation of said diffuser, sufficient pressure drop across said passages to contribute measurably to enhanced uniformity of distribution of gas flow among the respective passages, thus constituting flow regulating orifices. Optionally, the embodiments of the preceding paragraph may have diffuser body and membrane length to width ratios of at least about 10. --.

Between lines 46 and 47: add
-- Yet another aspect of the invention, referred to as the fourth aspect, may be described as a gas diffusion system for distributing gas in the form of bubbles into a liquid. It comprises a tank having a bottom and upwardly extending sides for holding the liquid, and a pipe grid, located substantially below the intended level of the surface of the liquid in the tank. This grid includes one or more manifolds and one or more branch conduits that are in communication with the manifold(s) to receive flowing gas therefrom, have peripherally closed wall means to receive, confine and convey said flowing gas, and are held in fixed position in the tank. The system also has plural diffusers respectively comprising extruded diffuser bodies supported in a fixed, stationary position relative to the tank bottom. These diffusers respectively include longitudinally-extending membrane support members that have generally horizontal upper surfaces, parallel sides and length to width ratio of at least about 6, have the long dimensions of the respective support members oriented in the same general direction as the lengths of the branch conduits, have longitudinally-extending gas-confining wall means in addition to the membrane support members, and are generally rectangular in appearance when viewed from above. Flexible membranes are secured to the diffuser bodies and respectively have gas influent and gas discharge surfaces, sides and ends, with parallel longitudinal edges along their sides, a length to width ratio of at least about 6, and gas discharge pores in at least portions of their gas discharge surfaces. The support members and membranes form, at least when the diffusers are in operation, longitudinally-extending gas chambers that represent gas spaces in addition to the spaces in the interiors of the branch conduits, and provide gas to the gas discharge pores. Plural gas-injection passages are present at longitudinally spaced positions along the branch conduits, through the wall means of the branch conduits. These passages provide communication between the interiors of the branch conduits and the gas chambers. A plurality of gas chambers are each served by a plurality of the passages spaced along the lengths of those chambers.

In a particularized embodiment of the foregoing fourth aspect, the membrane support members have longitudinal edges and comprise respectively first, second and third regions. The first regions represent longitudinally extending central portions of the support members through which the support members are integrally formed with underlying upper portions of the branch conduits along substantially the entire lengths of the support members and branch conduits. The second and third regions extend longitudinally along the lengths of the support members, comprise the longitudinal edges of the support members and, when viewed in transverse cross-section with the diffuser in its installed orientation, are to the left and right of the first region and extend into space beyond the connection between the support member and the gas supply channel. Marginal portions of the membranes are secured in gas-tight relationship with the diffuser bodies by longitudinally-extending securing members in longitudinally-extending slots or grooves provided in said bodies.

In another particularized embodiment of the fourth aspect, the securing members of the diffusers are present, with marginal portions of the membranes, in the slots or grooves. --.
Line 62: delete "conduit" and substitute -- conduits -- therefor.

In column 16:
Line 4: delete "perpendicular" and substitute -- parallel -- therefor.

In column 19:
Line 52: delete "conduit" and substitute -- conduits -- therefor.

In column 21:
Line 38: add -- be -- after "may".

In column 22:
Line 41: delete "I550 psi" and substitute -- 1550 psi -- therefor.

In column 31:
Line 32: add -- in -- before "that".
Line 52: delete "mail" and substitute -- male connector -- therefor.

In column 34:
Line 47: delete "e.g.".
Line 60: add -- the -- after "of".

In column 37:
Line 11: delete "259, the" and substitute -- 259. The -- therefor.

In column 39:
Line 10: delete "282" and substitute -- 282, -- therefor.

In column 40:
Line 56: delete "at" and substitute -- a -- therefor.

In column 41:
Line 45: delete "many" and substitute -- may -- therefor.

In column 42:
Line 2: delete "end's" and substitute -- ends -- therefor.
Line 14: delete "maybe" and substitute -- may be -- therefor.
Line 44: delete "an" and substitute -- in -- therefor.

In column 43:
Line 44: delete "appeared" and substitute -- appears -- therefor.

In column 46:
Line 36: delete "bands," and substitute -- bands. -- therefor.

In column 48:
Line 8: add -- for use within a liquid tank having a bottom and upwardly extending sides, said diffuser -- after "diffuser".
Lines 10 to 12: delete "more preferably at least about 6, still more preferably at least about 8, and most preferably at least about 10,".
Line 15: delete "effluent" and substitute -- discharge -- therefor.
Lines 20 to 22: delete "more preferably at least about 6, still more preferably at least about 8, and most preferably at least about 10,".
Line 25: delete "circumferentially" and substitute -- peripherally -- therefor.
Line 34: delete "and".
Line 37: delete "them." and substitute -- them, and
F. the diffuser being supported in a fixed, stationary position relative to the tank bottom. -- therefor.
Lines 59 and 60: delete ", more preferably about 3/16 and still more preferably about 1/8,".

In column 49:
Lines 5 to 7: delete ", preferably at least about 1.5, more preferably at least about 2 and still more preferably at least about 2.5 times wider,".
Line 19: add -- for use within a liquid tank having a bottom and upwardly extending sides, said diffuser -- after "diffuser".
Lines 24 and 25: delete "4, more preferably at least about".
Lines 25 and 26: delete "still more preferably at least about 8, and most preferably at least about 10,".
Lines 32 and 33: delete "4, more preferably at least about".
Lines 33 and 34: delete "still more preferably at least about 8, and most preferably at least about 10,".
Line 35: delete "circumferentially" and substitute -- peripherally -- therefor.
Line 60: delete "and".

In column 50:
Lines 4 and 5: delete ", more preferably about 3/16 and still more preferably about 1/8,".
Line 6: delete "lines." and substitute -- lines and,
H. the diffuser being supported in a fixed, stationary position relative to the tank bottom. -- therefor.

In column 51:
Line 37: delete "and".
Line 42: add -- and -- after "depression,".

In column 52:
Lines 34 to 37: delete ", preferably by an angle of at least about 30 degrees, more preferably at least about 45 degrees, and still more preferably at least about 60 degrees".

In column 53:
Line 11: add -- and -- after "therefrom,".
Line 12: delete "circumferentially" and substitute -- peripherally -- therefor.
Lines 18 and 19: delete "4, more preferably at least about".
Lines 19 and 20: delete "still more preferably at least about 8, and most preferably at least about 10,".
Line 23: delete "and".
Line 26: add -- , and
d. the diffusers being supported in a fixed, stationary position relative to the tank bottom, -- after "members".
Line 30: delete "its" and substitute -- their -- therefor.
Line 32: delete "C." and substitute -- c. -- therefor.
Line 32: delete "4, more".
Line 33: delete "preferably at least about".
Lines 33 and 34: delete "still more preferably at least about 8, and most preferably at least about 10,".
Line 36: delete "its" and substitute -- their -- therefor.
Line 37: delete "surface," and substitute -- surfaces, -- therefor.
Line 46: delete "conduits" and substitute -- conduits, -- therefor.

In column 55:
Line 52: delete "diffuser." and substitute -- diffuser -- therefor.

In column 56:
Lines 33, 35, 37, 39, 41, 46 and 59: delete "A diffuser" and substitute -- A gas diffusion system -- therefor.

In column 57:
Lines 9, 12 and 23: delete "A diffuser" and substitute -- A gas diffusion system -- therefor.
Line 52: delete "Are" and substitute -- are -- therefor.